United States Patent
Mancevski et al.

(10) Patent No.: US 6,955,078 B2
(45) Date of Patent: Oct. 18, 2005

(54) CALIPER METHOD, SYSTEM, AND APPARATUS

(75) Inventors: Vladimir Mancevski, Austin, TX (US); Paul McClure, Austin, TX (US)

(73) Assignee: Xidex Corporation, Austin, TX (US)

(*) Notice: Subject to any disclaimer, the term of this patent is extended or adjusted under 35 U.S.C. 154(b) by 45 days.

(21) Appl. No.: 10/115,274

(22) Filed: Apr. 1, 2002

(65) Prior Publication Data

US 2002/0189330 A1 Dec. 19, 2002

Related U.S. Application Data

(60) Provisional application No. 60/280,193, filed on Mar. 30, 2001, and provisional application No. 60/287,822, filed on May 1, 2001.

(51) Int. Cl.[7] .......................... G01B 21/30; G01B 11/30
(52) U.S. Cl. ....................................................... 73/105
(58) Field of Search ........... 73/105, 1.79; 250/306–307

(56) References Cited

U.S. PATENT DOCUMENTS

| | | | | |
|---|---|---|---|---|
| 5,047,633 A | * | 9/1991 | Finlan et al. ............... 250/306 |
| 5,239,863 A | * | 8/1993 | Kado et al. .................... 73/105 |
| 5,382,795 A | * | 1/1995 | Bayer et al. .............. 73/105 X |
| 5,461,907 A | * | 10/1995 | Tench et al. ................... 73/105 |
| 5,540,958 A | * | 7/1996 | Bothra et al. ................ 427/535 |
| 6,002,131 A | * | 12/1999 | Manalis et al. ............. 250/306 |
| 6,545,273 B1 | * | 4/2003 | Singh et al. .............. 73/105 X |
| 6,612,160 B2 | * | 9/2003 | Massie et al. ................ 73/105 |
| 6,862,921 B2 | * | 3/2005 | Chand et al. .................. 73/105 |
| 6,884,999 B1 | * | 4/2005 | Yedur et al. ................ 250/306 |
| 2003/0033863 A1 | * | 2/2003 | Ashby et al. .................. 73/105 |
| 2003/0200798 A1 | * | 10/2003 | Lendig et al. ................ 73/105 |

OTHER PUBLICATIONS

U.S. Appl. No. 60/242,650.*
SPIE 2002 Presentation by Vladimir Mancevski, "Dual-Probe Caliper CD–AFM." pp. 1–17 by Jul. 2002.
Manuscript discussing content of SPIE 2002 Presentation by Vladimir Mancevski, "Development of a dual–probe Caliper CD–AFM for near model–independent nanometrology." p pages by Jul. 2002.

* cited by examiner

Primary Examiner—Thomas P. Noland

(57) ABSTRACT

A caliper atomic force microscope (AFM) comprises two AFM probes (each comprised of an oscillator and an attached tip) that operate on a sample in a coordinated manner. The coordinated operation of the AFM probes may be spatially or temporally coordinated. The result of the coordinated operation may be an image of the sample or a dimensional measurement of an unknown sample. The probes of the caliper AFM may be tilted, or the tips may be tilted at a non-orthogonal angle with respect to the probes, so as to enable the tips to access vertical sample surfaces or to enable the tips to touch each other. The tip shapes may include conical, boot-shaped, cylindrical, or spherical and materials from which the tips are fabricated may include silicon or carbon nanotubes. The oscillators may be beveled to allow the tips to operate in close proximity or in contact without interference of the oscillators. The disclosure of the present invention is discussed in terms of an atomic force (van der Waalls) interaction. Other interaction forces are contemplated, such as electrostatic force, magnetic force, and tunneling current. The caliper AFM may be calibrated with the help of a sample with known dimensions or by touching the probe tips. The tip-to-tip calibration enables absolute measurements without the need for a reference artifact, and it enables in-line calibration that may be performed during the measurement process.

27 Claims, 46 Drawing Sheets

EMBODIMENT OF THE PRESENT INVENTION

EMBODIMENT OF THE PRESENT INVENTION

Figure 3 - A Scanned Stage System with Stationary Calipers

CALIPER METHOD, SYSTEM, AND APPARATUS

CROSS-REFERENCE TO RELATED APPLICATIONS

This application claims the benefit of the following U.S. Provisional Applications, all of which are hereby incorporated by reference:

| COMMONLY OWNED AND PREVIOUSLY FILED U.S. PROVISIONAL PATENT APPLICATIONS | | | |
|---|---|---|---|
| Atty. Dkt. # | Ser. No. | Title | Filing Date |
| 500929.000024 | 60/280,193 | Caliper AFM for near-model-independent nanometrology | Mar. 30, 2001 |
| 500929.000030 | 60/287,822 | Multiple head caliper atomic force microscope | May 1, 2001 |

The benefit of 35 U.S.C. § 120 is claimed for all of the above referenced commonly owned applications. The contents of the applications referenced in the table above are not necessarily identical to the contents of this application.

All references cited hereafter are incorporated by reference to the maximum extent allowable by law. To the extent a reference may not be fully incorporated herein, it is incorporated by reference for background purposes and indicative of the knowledge of one of ordinary skill in the art.

BACKGROUND OF THE INVENTION

1. Field of the Invention

The present invention relates generally to atomic force microscopes (AFMs) and in particular to a Caliper AFM for nanometer-scale length measurements.

2. Description of Related Art

Conventional atomic force microscope (AFM) probes have been developed to perform nanometer-scale measurements on test surfaces, but while those solved many problems, significant problems remained. For example, calibration of such probes is difficult. Great effort must be expended to characterize probe shape in the presence of tip wear, estimate the tip-surface force profile in the presence of surface contamination and variable material composition, and calibrate the scanning stages and other electro-optical sensors and actuators in the presence of manufacturing defects and environmental noise.

In other countries, the only similar caliper work that we are aware of is at the Physikalische Technische Bundesantstalt (PTB), the counterpart of NIST in Germany. This work involves caliper type measurement on a much larger scale. Two opposed scanning tunneling probes are being used to measure the lengths of gauge blocks. One alternative way of obtaining CD measurements with substantial probe modeling is to section the wafer and obtain a cross-section SEM image. However, even on thinned sections the edge resolution of SEMs is limited by the beam-sample interaction. A second and related approach is to manufacture thinned wafer sections that can be measured in a transmission electron microscope. The edge resolution of this approach is extremely good. However, the scale calibration of TEM relies on comparison of the measured images with calibrated artifacts, such as atomic lattice spacings, under nearly identical imaging conditions and is difficult to carry out with high precision. Furthermore, both of these techniques are destructive and involve off-line measurements in vacuum.

BRIEF SUMMARY OF THE INVENTION

In accordance with an embodiment of the invention, a caliper atomic force microscope (AFM) includes a first AFM probe having a first tip, and a second AFM probe having a second tip. The caliper AFM is configured such that the first tip and the second tip can measure a test sample in a coordinated manner.

Optionally, the caliper AFM may be configured so that the first tip can move and the second tip can move. The moves may be coordinated. The moves may be relative to a test sample. The coordination may be touch-probing. The move of the first tip may occur relative to the test sample. The first tip may move, the second tip may move, and the test sample may be stationary. The first tip may move, the second tip may stationary, and the test sample may move. The first tip may be stationary, the second tip may be stationary, and the test sample may move. The first tip and the second tip may be stationary relative to each other, and the test sample may move. The first tip and the second tip may be stationary relative to each other, and the test sample may be stationary. The first tip may move, the second tip may move, and the test sample may move. The first tip may move in only one dimension. The first AFM probe may be configured to tilt on a first axis to enable the first tip to move close to the second tip. The shape of the first tip may be boot-shaped, cylindrical shaped, carbon nanotube, or spherical, and the shape of the second tip may be boot-shaped, cylindrical shaped, carbon nanotube, or spherical. The first AFM probe may not be configured to tilt, and the first tip may be tilted to enable the first tip to move close to the second tip. The first AFM probe may include a first oscillator on which the first tip is mounted and the first oscillator may be beveled to allow the first tip to move close to the second tip without contacting the second AFM probe. The first AFM probe may include a first multiresonant oscillator on which the first tip is mounted; and the second AFM probe may include a second multiresonant oscillator on which the second tip is mounted. A caliper AFM system, may comprise a plurality of caliper AFMs. The plurality of caliper AFMs comprising a caliper AFM system may be configured to measure the test sample in a coordinated manner.

According to another embodiment of the invention, a method of test sample measurement using a caliper that has a first tip of a first AFM probe and a second tip of a second AFM probe includes positioning the first tip on a first surface of the test sample, positioning the second tip on a second surface of the test sample, creating a first data set by measuring the test sample with the first tip, and creating a second data set by measuring the test sample with the second tip and the first tip and the second tip are operably coordinated.

Optionally, the creating a first data set may include creating a first data set by measuring the test sample with the first tip in reference to the second tip and the creating a second data set may include creating a second data set by measuring the test sample with the second tip in reference to the first tip. The first data set may include a first relatively referenced data set and the second data set may include a second relatively referenced data set. The first relatively referenced data set and the second relatively referenced data set may be the same. The creating a first data set may include creating a first data set by measuring the test sample with the first tip in reference to a global coordinate system, and the creating a second data set may include creating a second data set by measuring the test sample with the second tip in reference to the first tip. The first data set may include a first globally referenced data set and the second data set may include a second relatively referenced data set. The creating a first data set may include creating a first data set by measuring the test sample with the first tip in reference to a global coordinate system and the creating a second data set may include creating a second data set by measuring the test sample with the second tip in reference to the global coordinate system. The first data set may include a first globally referenced data set and the second data set may include a second globally referenced data set. The method of test sample measurement may include a plurality of measurements. The plurality of measurements may be at least part of a transverse scan. The plurality of measurements may be at least part of a longitudinal scan. The tips may not touch the test sample between measurings nor during measurings. The tips may touch the test sample between measurings and during measurings. The tips may not touch the test sample between measurings; and the tips may touch the test sample during measurings. Measuring the test sample with the first tip may occur at approximately the same time as the measuring the test sample with the second tip. Measuring the test sample with the first tip may not occur at approximately the same time as the measuring the test sample with the second tip. The first tip and the second tip may be positioned so that at least one of their coordinates is approximately equal.

According to another embodiment of the invention, a method of calibrating a caliper that has a first tip of a first AFM probe and a second tip of a second AFM probe includes taking a measurement of an artifact having a known dimension; and adjusting the caliper based on the difference between the measurement and the known dimension.

Optionally, the taking the measurement may include taking a measurement of an artifact having a known dimension while the tips are in contact with the artifact. The taking the measurement may include taking a measurement of an artifact having a known dimension, using the extreme lateral points of the tips, while the tips are in contact with the artifact. The taking the measurement may include taking a measurement of an artifact having a known dimension, using the extreme vertical points of the tips, while the tips are in contact with the artifact. The taking the measurement may include taking a measurement of an artifact having a known dimension, while the tips are not in contact with the artifact. The taking the measurement may include taking a measurement of an artifact having a known dimension, using the extreme lateral points of the tips, while the tips are not in contact with the artifact. The taking the measurement may include taking a measurement of an artifact having a known dimension, using the extreme vertical points of the tips, while the tips are not in contact with the artifact. The first tip may have a first apex, the second tip may a second apex, and the taking the measurement may include characterizing the apexes using an artifact having a known dimension.

According to another embodiment of the invention, a method of calibrating a caliper that has a first tip of a first AFM probe and a second tip of a second AFM probe includes positioning the tips such that they are at a known tip-to-tip distance for which they have an known interaction, measuring a measured interaction of the tips; and adjusting the caliper based on the difference between known interaction and measured interaction.

Optionally, the positioning may include positioning the tips such that their extreme lateral points are at a known tip-to-tip distance for which they have a known interaction; and the measuring may include measuring a measured interaction of the extreme lateral points of the tips. The measuring may include characterizing the each apex with the other apex.

According to another embodiment of the invention, a method of calibrating a caliper AFM that has a first tip of a first AFM probe and a second tip of a second AFM probe, wherein the first AFM probe can move, and wherein the second AFM probe can move, such that the first tip and the second tip coordinate in a caliper manner, includes at least one calibrating the tips, and at least one measuring the test sample with the caliper AFM. The calibrating a caliper AFM may include in-line calibration. The calibrating a caliper AFM may include controlling the operation of the method by a logic circuit. The controlling the operation of the method by a logic circuit may include controlling the operation of the method by a logic circuit responsively to the results of past operations of the method.

According to another embodiment of the invention, a method of traceably measuring a test sample using a caliper that has a first tip of a first AFM probe and a second tip of a second AFM probe, includes traceably calibrating the caliper AFM, traceably positioning the first tip on a first surface of a test sample, traceably positioning the second tip on a second surface of the test sample, creating a first traceable data set by measuring the test sample with the first tip, and creating a second traceable data set by measuring the test sample with the second tip.

Optionally, the traceably calibrating may include taking a measurement of an artifact having a traceable known dimension, and adjusting the caliper based on the difference between the measurement and the known dimension. The traceably calibrating may include positioning the tips such that they are at a known tip-to-tip distance for which they have a known interaction, measuring a measured interaction of the tips, and adjusting the caliper based on the difference between known interaction and measured interaction.

In accordance with yet another embodiment of the invention, a measuring system includes a first AFM probe having a first tip and a first reflective surface. The system also includes a control circuit adapted to cause the first AFM probe to move the first tip relative to a test sample and a collimated laser source configured to produce a collimated laser, wherein the collimated laser is directed so that the first reflective surface falls within the collimated laser, whereby the first reflective surface produces a first reflection. The system would further include a first mirror, configured to receive the first reflection, whereby the first mirror produces a first further reflection, a position sensitive detector (PSD) configured to receive the first further reflection, and a measurement circuit adapted to ascertain, based on the PSD's output, a first point on the test sample.

The system might also include a second AFM probe with a tip and reflective surface and a second mirror, wherein the control circuit is adapted to cause the second AFM probe to move the second tip relative to the test sample, the collimated laser is directed so that the second reflective surface falls within the collimated laser, whereby the second reflective surface produces a second reflection, wherein the second mirror is configured to receive the second reflection, whereby the second mirror produces a second further reflection, wherein the PSD is configured to receive the second further reflection, and wherein the measurement circuit is adapted to ascertain, based on the PSD's output, a second point on the test sample. The first reflective surface might have a first fiducial and the second reflective surface might have a second fiducial. The first AFM probe might include a first cantilever, to which the first tip is attached, and the first reflective surface might include all of at least one face of the first cantilever, wherein the first AFM probe includes a second cantilever, to which the second tip is attached, and the second reflective surface includes all of at least one face of the second cantilever. The PSD's output includes an AC signal and a DC signal, wherein the measurement circuit is configured to simultaneously process the AC signal and the DC signal in ascertaining the first point on the test sample and the second point on the test sample. The first AFM probe might have a first mounting chip with a bevel and a first cantilever with a first end and a second end, wherein the first end is attached to the first mounting chip and the first tip is attached to the second end, wherein the first reflective surface is located on the bevel. The first AFM probe might have a first mounting chip and a first cantilever having a first end and a second end, wherein the first end is attached to the first mounting chip, and wherein the first tip is attached to the second end, wherein the first reflective surface comprises a fiducial located on the first mounting chip.

In accordance with a still further embodiment of the present invention, a method of measuring a test sample includes ascertaining a first plurality of points on a first sidewall of the test sample with a first AFM probe, wherein the first plurality of points is included in a first line roughness (LR).

The first LR of the method might include a transverse LR or a longitudinal LR. If the LR is measured along an edge of the first sidewall, it would be a line edge roughness (LER). Sidewall roughness (SWR) could be measured by combining LR measurements. The method might include ascertaining a second plurality of points on a second sidewall of the test sample with a second AFM probe, wherein the second plurality of points is included in a second LR, the first AFM probe and the second AFM probe coordinate in a caliper manner, the second LR is positionally approximately opposite the first LR, and a linewidth roughness (LWR), comprising the first LR and the second LR, is measured. Three-dimensional linewidth roughness (3DLWR) could be made by combining LWR measurements.

In accordance with another embodiment of the invention, a method of measuring a test sample includes measuring a line roughness (LR) using a probe and determining spatial frequency data based on the LR using Fourier Transform (FT).

The LR might comprise fractals or wavelets. The probe might be an AFM, SEM, or reflectometry probe.

In accordance with another embodiment of the invention, a MEMS caliper apparatus includes a first AFM oscillator having a first tip, a second AFM oscillator having a second tip, wherein the first AFM oscillator and the second AFM oscillator are configured so as to be able to move with respect to each other in three dimensions, a control circuit that controls the movement of the first AFM oscillator and the movement of the second AFM oscillator, and a sensing circuit that measures a test sample based on the first AFM oscillator's output and the second AFM oscillator's output.

The control circuit and the sensing circuit may be integrated. The apparatus may include a substrate, an arm, from which the first AFM oscillator and the second AFM oscillator extend, a flex link, wherein the arm is attached to the substrate by the flex link, which allows three degrees of freedom, and wherein the substrate, the flex link, the arm, the first AFM oscillator, the second AFM oscillator, the first tip, and the second tip are included in a single measuring structure. The first and second tips might each include a vertical tip having a first end and a horizontal tip attached to the first end, opposite which the horizontal tip has an apex, wherein the apexes can touch. The first tip may have a first apex, wherein the first tip is tilted such that the part of the first tip closest to the second tip is the first apex, the second tip has a second apex, the second tip is tilted such that the part of the second tip closest to the first tip is the second apex, and the apexes can touch.

In accordance with another embodiment of the invention, a method of detecting extreme lateral tip points includes bringing a first tip and a second tip into lateral proximity, wherein the first tip has a first extreme lateral point and is included in a first AFM probe, and wherein the second tip has a second extreme lateral point and is included in a second AFM probe; scanning in two dimensions of a plane approximately orthogonal to an imaginary line between the first tip and the second tip; and wherein maximum tip distance indicates that the first extreme lateral point is touching the second extreme lateral point.

BRIEF DESCRIPTION OF THE DRAWINGS

The following drawings form part of the present specification and are included to further demonstrate certain aspects of the present invention. The figures are not necessarily drawn to scale. The invention may be better understood by reference to one or more of these drawings in combination with the detailed description of specific embodiments presented herein.

[FIG. 2-B shows a calibration of a prior art AFM]

DETAILED DESCRIPTION OF PREFERRED EMBODIMENTS

Figure 1:
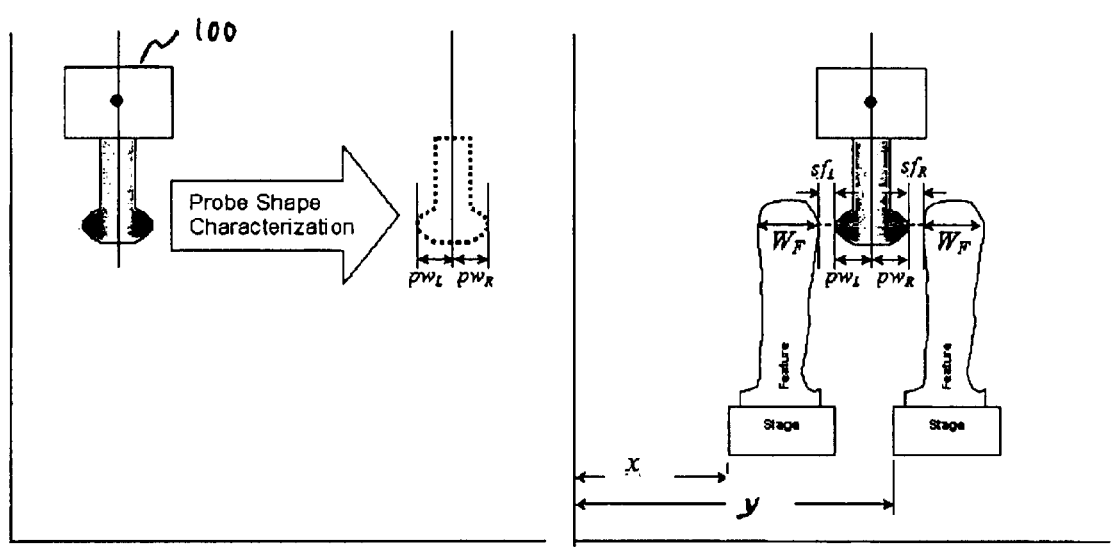
FIG. 1 shows a boot-shaped probe making a conventional linewidth measurement, in accordance with prior art.

Throughout this description, primed reference characters correspond to unprimed reference characters. For example, reference character 1' would correspond to the reference character 1.

The Problem Solved by the Present Invention

The main disadvantage of scanning-probe measurement tools is their dependence on a priori knowledge of the probe's shape and its interaction with the test sample to reconstruct the dimensions of the test sample from raw measurement data. In the case of a conventional atomic force microscope (AFM), great effort must be expended to characterize probe tip shape in the presence of tip wear, estimate the tip-surface force profile in the presence of surface contamination and variable material composition, and calibrate the scanning stages and other electro-optical sensors and actuators in the presence of manufacturing defects and environmental noise.

Model dependence refers to reliance on such a priori information about operation of a measurement tool that must be removed from raw data to extract a quantity of interest. Calibration is the process of determining the required a priori information by measuring some known quantity and adjusting the output of the measurement tool so that it provides the correct reading. The larger, more complex, and more variable its model dependence, the more difficult it is to calibrate a measurement tool.

There are two approaches for dealing with model dependence. One approach is to accept the conventional architecture of the measurement tool for what it is and attempt to determine all of the a priori information required to calibrate it. The alternative approach adopted in the present invention rejects conventional AFM design in favor of an entirely new dual-scanning-probe caliper architecture that is virtually model-independent. Taken together, removal of the three major sources of uncertainty in scanning probe tools provides an exciting opportunity to demonstrate a revolutionary new breed of AFM metrology tool that paves the way for scanning probe measurements that are both precise (i.e., highly repeatable) and accurate (i.e., traceable to reference artifacts).

The semiconductor industry represents an important example illustrating the utility of the present invention. Critical dimension metrology of features involved in semiconductor manufacturing relies on extensive modeling of measurement tool-induced uncertainties, and on the repeatability of measurements to keep the manufacturing process under control. This conventional approach is rapidly nearing the end of its usefulness as feature sizes shrink to the level where measurement tool uncertainties dominate the measurement process. Therefore, a new approach for length metrology is required.

The Problem of Tip Shape Uncertainty

Recording the motion of the tip of a scanning probe measurement tool with respect to a sample surface provides an image of the surface that is convolved with the shape of the probe tip. The shape of the tip must be deconvolved from the scanned image to generate the true topography the sample. For pitch and height measurements this may not be a critical limitation, since two respective points on the feature surface can be measured by the same point on the tip. Pitch and height measurements can therefore be recovered with acceptable uncertainty even in the presence of poor knowledge about the tip shape. For feature width measurements, however, uncertainty in the tip shape translates directly into measurement uncertainty whenever different points on a single probe tip are used to make measurements at. Conventional single-tip scanning probe tools are inherently limited by the need to perform frequent, extensive characterization of tip shape.

Referring to FIG. 1 The problem of tip shape uncertainty is illustrated by comparing a linewidth measurement made with a conventional AFM having a single boot-shaped tip 100 and a linewidth measurement with a dual-probe caliper AFM. The linewidth measurement $w_{boot}$ obtained with a single boot-shaped tip is:

$$w_{boot}=(y-pw_R-sf_R)-(x+pw_L+sf_L)$$

$$w_{boot}=(y-x)-(pw_R+pw_L)-(sf_R+sf_L)$$

$$w_{boot}=(y-x)-pw-sf \quad (1)$$

$$w_{boot}=(y-x)-pw \quad (2)$$

where x and y are the respective left and right stage positions as recorded by the sensing system of the scanning stage, $pw_R$ and $pw_L$ are the respective right and left probe widths, pw is the total probe width, $sf_R$ and $sf_L$ are the respective right and left tip-surface distances, and sf is the total combined tip-surface distance of the measurement. As can be seen from Equation 1, the linewidth $w_{boot}$ depends on the probe width pw and the tip-surface distance sf. Assuming that the mode of scanning is contact, the linewidth $W_{boot}$ is still a function of the probe width pw, as can be seen from Equation 2.

Figure 2:
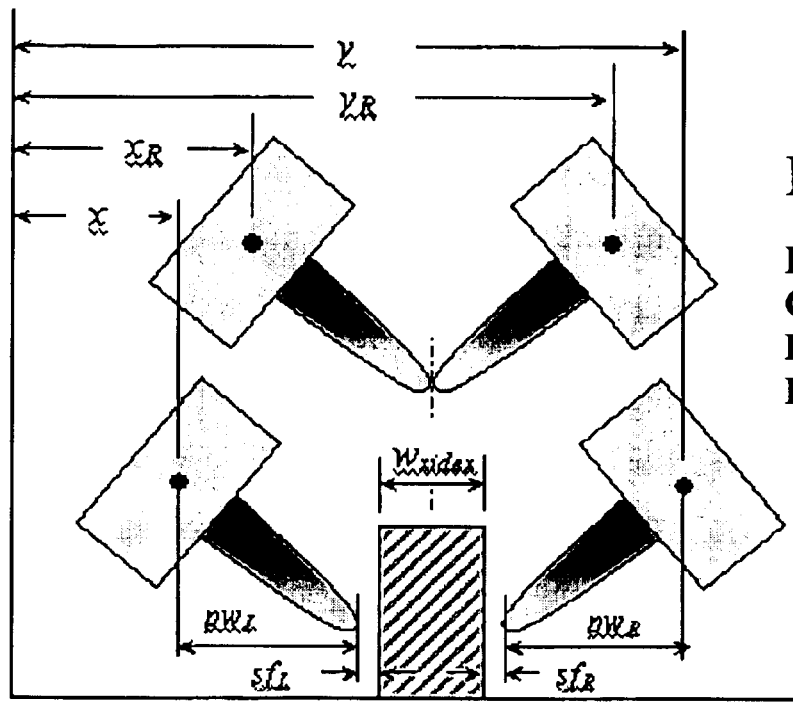
FIG. 2-A shows a calibration of a caliper AFM, in accordance with an embodiment of the present invention.
Figure 2:
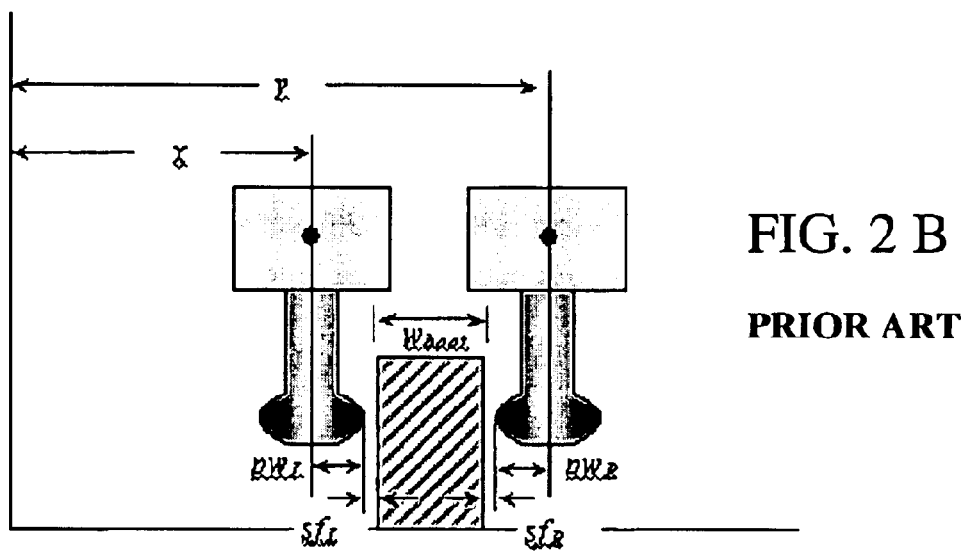

Referring to FIG. 2, The present invention solves this problem by using dual scanning probes, 200 and 201, that operate in coordinated fashion as a caliper, instead of reliance on a single probe tip. This allows different regions on the surface of a convex or concave feature to be measured by points on the surfaces of two different probe tips. The equivalent linewidth measurement $w_{caliper}$ obtained by the caliper AFM with two tips would be:

$$w_{caliper}=[(y-pw_R-sf_R)-(x+pw_L+sf_L)]-[(y_R-pw_R-sf_R')-(x_R+pw_L+sf_L')]$$

$$w_{caliper}=[(y-x)-(pw_R+pw_L)-(sf_R+sf_L)]-[(y_R-x_R)-(pw_R+pw_L)-(sf_R'+sf_L')]$$

$$w_{caliper}=[(y-x)-pw-sf]-[(y_R-x_R)-pw-sf']$$

$$w_{caliper}=(y-x)-(y_R-x_R)-(sf-sf')-pw+pw$$

$$w_{caliper}=(y-x)-(y_R-x_R)-(sf-sf') \quad (3)$$

$$w_{caliper}=(y-x)-(y_R-x_R) \quad (4)$$

$$w_{caliper}=\Delta-\Delta_R \quad (5)$$

where x and y are the respective left and right stage positions as recorded by the sensing system of the scanning stage, and $x_R$ and $y_R$ are the respective reference stage positions as recorded by the sensing system of the scanning stage at the moment when the two tips are touching each other to establish a known reference. In this illustration, the known reference is a zero reference. The effective probe width pw and tip-surface distance sf are defined the same way as for the single probe measurement.

The left side of a convex feature can be measured by a left caliper tip and the right side of a convex feature can be measured by a right caliper tip. In the case of a concave feature, the situation is reversed with the left side of the feature being measured by a right caliper tip and the right side of the feature being measured by a left caliper tip. A zero reference point can be established by bringing the left and right caliper tips together into a known reference configuration, for example, with the tips touching at their respective lateral extreme points. This zero referencing procedure provides the required calibration for measurements of extension, such as line width and hole diameter. Alternatively, a reference artifact with a finite, known dimension can be used to calibrate the measurement tool. Use of dual scanning probes that operate together as a caliper virtually eliminates model-dependent uncertainties associated with probe tip shape for nanometer-scale measurements of extension, such as line width and hole diameter.

The Problem of Tip-To-Surface Interaction Uncertainty

Another major source of modeling uncertainty for a conventional scanning probe tool is the tip-surface interaction. Tapping mode and non-contact mode of operation are the two methods most commonly used with conventional, single-probe AFMs. Tapping mode is the more stable of the two and is nearly independent of surface contamination effects. However, it relies on nonconservative energy dissipation of the tip in the atomic force region of the surface to maintain the tip-surface gap constant. This mode of sensing requires an amplitude of oscillation of the probe of 10s of nanometers and hence a comparable uncertainty in its position. Non-contact mode depends on the long-range conservative surface forces that can strongly depend on surface contamination and can vary with the material composition of the sample. This dependence makes the non-contact mode of operation also prone to variations and therefore greater uncertainties. Therefore, there is a modeling related uncertainty associated with both the short range, nonconservative forces (e.g., dissipation upon impact, surface contamination) and the long range conservative forces (e.g., van der Waals profile). Contact mode relies on short-range (subnanometer) attractive surface forces and requires no modeling of the tip-surface attractive interaction. However, scanning in contact mode can rapidly degrade both the tip and the sample.

Figure 3A:
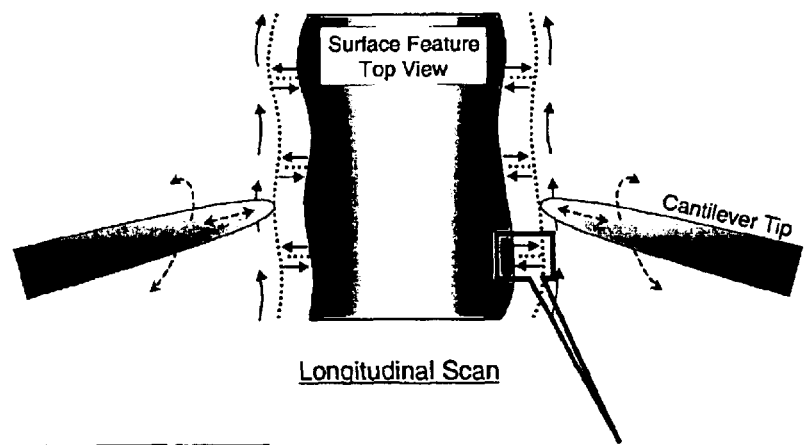
FIGS. 3-A and 3-B show scan paths of caliper AFM tips, in accordance with an embodiment of the present invention.
Figure 3B:
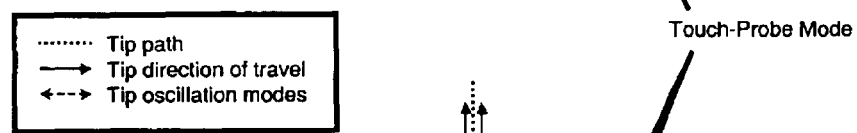
Figure 3B:
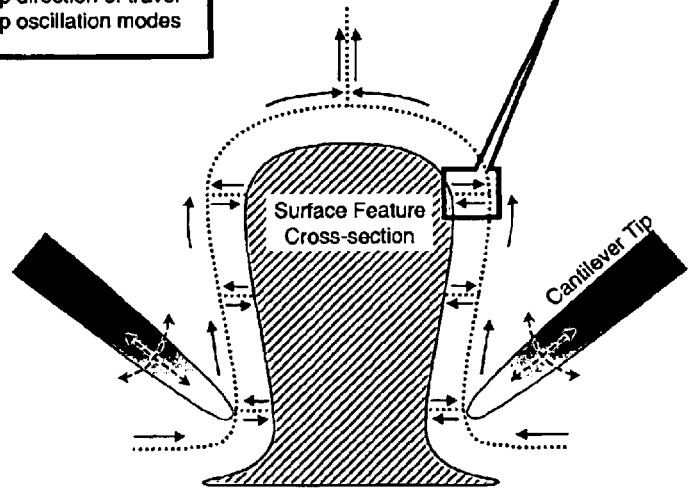

Referring to FIGS. 3-A and 3-B, the present invention solves this problem by combined use of two sensing modes; non-contact mode scanning for local navigation of the probes with respect to the sample alternating with independent touch-probing of the two scanning probe tips with respect to the sample to obtain the required dimensional measurement. Taking measurements during touch-probing, while the tip is momentarily in contact with the sample surface, removes model-dependent uncertainties associated with tip-surface interaction from the measurement data.

In general the tip-to-tip distance sf' during a non-contact type interaction is different from the tip-surface distance sf Nevertheless, the two distances cancel each other to minimize the effect of the tip-surface distance on the linewidth measurement (Equation 6), and, in the preferred way, it is null for a touch-probe contact mode of operation (Equation 7). As can be seen from Equation 3, the probe width pw does not enter into the computation of the linewidth $w_{caliper}$, and the effect of the tip-surface distance is minimized even for non-contact mode of operation. For touch-probe contact mode of operation, the linewidth $w_{caliper}$ is presented by Equation 4.

$(sf-sf') < sf$ for non-contact mode of operation      (6)

$(sf-sf') = 0$ for touch-probe contact mode of operation      (7)

The Problem of Mechanical Loop Uncertainty

Another source of modeling uncertainties in scanning probe tools is associated with mechanical loops in the system. The tip-sample loop via the structure is an illustration of one such mechanical loop, where the mechanical chain extends from the tip to the sample through the oscillator, the base of the oscillator, the clamping fixtures, the scanning stage, and the tool frame. Each of the mechanical structures in the chain of the loop is subject to vibration, thermal expansion, and stress, as sources of uncertainty. Uncertainties due to mechanical loops can be reduced by proper design, selection of temperature-stable materials, and use of components with similar mechanical properties, but nevertheless impose severe limitations the achievable measurement precision and accuracy when nanometer-scale feature dimensions are involved.

Figure 4:
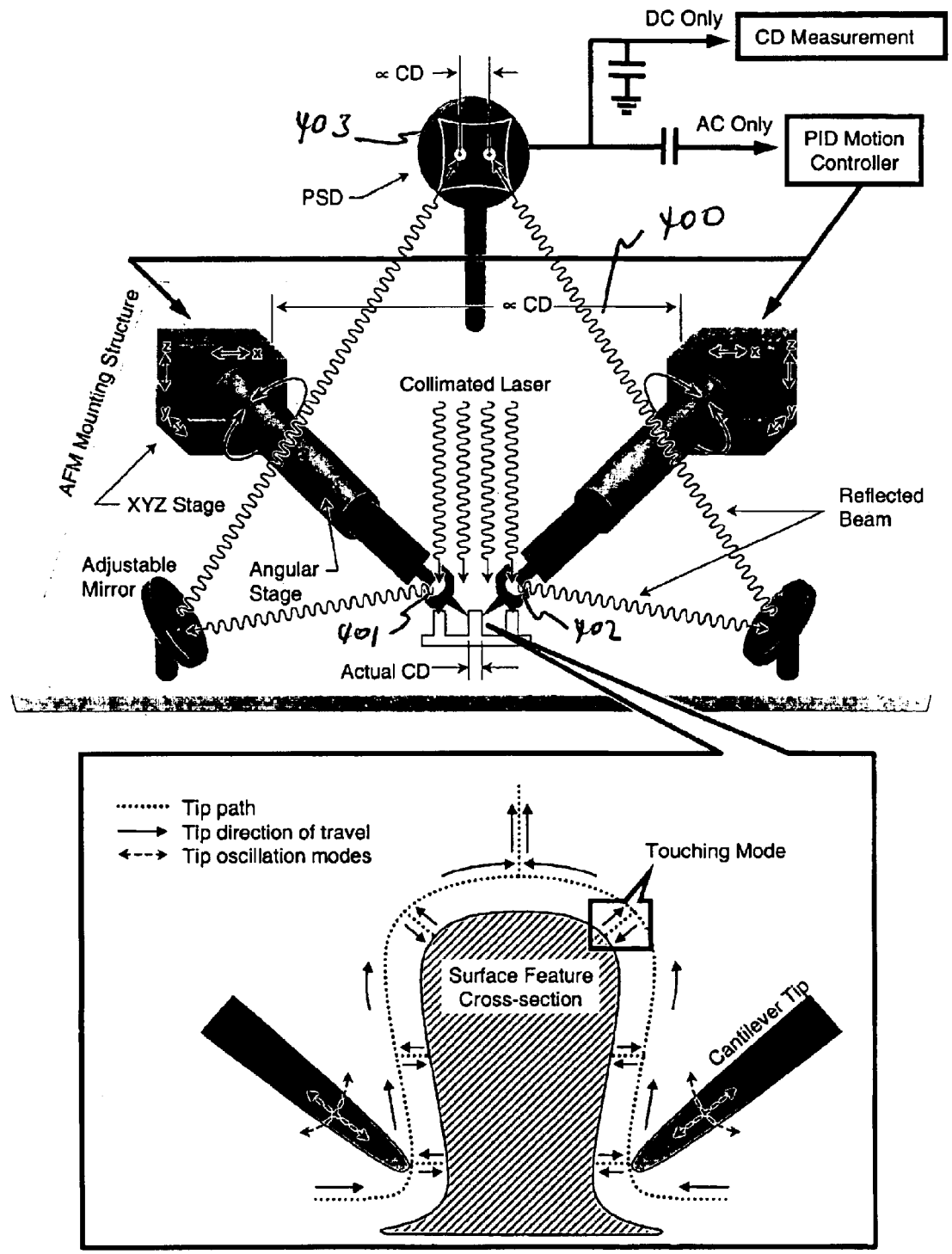
FIG. 4 shows a caliper AFM system, in accordance with an embodiment of the present invention.

Referring to FIG. 4, the present invention solves this problem of reducing measurement uncertainty introduced by mechanical loops by using a sensing system in conjunction with use of dual scanning probes that makes a measurement involving the shortest possible mechanical loop from the right caliper tip to the left caliper tip. One way to accomplish this is to measure the left-scan-stage-to-right-scan stage relative distance directly. Each scanning stage can be calibrated accurately with existing methods that are traceable (i.e., relatable to an absolute length standard, such as a particular wavelength of light). The stage position can be measured precisely (i.e., with high repeatability) with the help of interferometric sensors or capacitive sensors that have been calibrated with an interferometer. Two such calibrated scanning stages will determine the relative stage-to-stage distance, 400, and therefore the relative tip-to-tip distance. The relative tip-to-tip distance provides the measurement of extension, such as line width and hole diameter. Alternatively, the relative probe-to-probe distance, and therefore the relative tip-to-tip distance, can be directly measured by using fiducial dots, 401 and 402, on the surfaces of the probes as reflective markers and a single continuous position sensitive detector, 403, configured electronically to measure (through reflected light beams) the fiducials' positions and their relative distance. The relative fiducial-to-fiducial distance and its projection on the aperture of the continuous position sensitive detector provides a scaled measurement of extension, such as line width and hole diameter. This procedure is equivalent to directly measuring the respective difference terms, $(y-x)$, and $(y_R-x_R)$ in Equation 4 rather than measuring x and y separately, taking the difference to get $(y-x)$, measuring $x_R$ and $y_R$ separately, and taking the difference to get $(y_R-x_R)$. The preferred procedure results in an overall reduction of measurement uncertainty because it enables four typically large errors associated with conventional stage-based measurements x, y, $x_R$ and $y_R$ to be replaced with two relatively small errors associated with direct measurement of the difference terms, $(y-x)$, and $(y_R-x_R)$.

Description of the Caliper AFM

Figure 5:
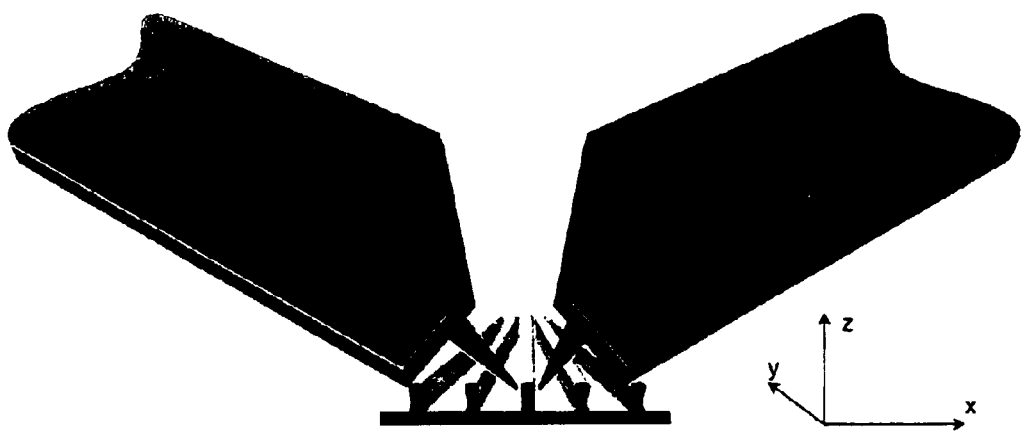
FIG. 5 shows two probes coordinating as a caliper, in accordance with an embodiment of the present invention.

In the basic embodiment of the present invention the Caliper AFM, illustrated in FIG. 5, comprises two atomic force microscope (AFM) probes that operate on a test sample in a coordinated manner. The result of operating on a test sample can, for example, be to generate an image of the test sample, to make a dimensional measurement of an unknown test sample, or to calibrate the caliper AFM based on measurement of a sample with known dimensions.

The functioning of a single AFM probe is well known to those skilled in the art. Coordination means that the probes are capable of working together in a common operation, for example, to produce an image or a measurement of the test sample. An example of coordination is the imaging of a resist line on a semiconductor circuit where each probe images one side of the resist line and where the combination of the two images will produce the image of the entire resist line. Another example is the measurement of a polysilicon line on a semiconductor circuit where each probe measures the distance between a common reference and a respective side of a polysilicon line, where the combination of the two distances will produce the linewidth of the polysilicon line. The details of imaging a resist line and measurement of a polysilicon line, are known to those skilled in the art. Other examples of coordinating the operation of the probes of a caliper AFM include coordination for the purpose of measuring a line edge roughness spectrum or a line width roughness spectrum, coordination for the purpose of executing maneuvers necessary for transverse or longitudinal scanning, coordination for the purpose of achieving clearance between the probe structures and coordination for the purpose of achieving clearance between both probes and the sample.

Parallel operation on an array of AFMs, each of them operating independently (i.e., not working together) and not towards a common operation, is not an example of coordination of AFM probes as described in the disclosed invention. The operation of micro-sized or nano-sized tweezers that work together towards a common operation of grasping an object is also not an example of coordination of AFM probes, as described in the disclosed invention, because the tweezers' probes do not have AFM capabilities and cannot produce an image nor a measurement.

Another characteristic of the basic embodiment of the Caliper AFM is that the probes are capable of working together in a common operation in more than one manner. For example, the operation of each probe can be spatially or temporally coordinated. In a spatially coordinated operation the probes can operate on the same test sample feature or they can operate on different sample features somewhat removed from each other but still within the range of motion of both the probes. In a spatially coordinated operation on the same test sample feature the probes can be aligned in any two of the tool-fixed XYZ coordinates or they can be aligned in any one of the XYZ coordinates, or not be aligned at all. In temporally coordinated operation, the probes can operate simultaneously, with some time lag, or one after another. In one representative example, two spatially and temporally coordinated probes can image a polysilicon line on a semiconductor circuit in such a manner that that the probes are aligned in the Y raster direction and their height is kept the same in the Z direction while the probes simultaneously scan in the X direction and obtain an image in the XZ plane. Several alternative caliper AFM embodiments that take advantage of different spatial and temporal coordination are described later in this disclosure.

Figure 6:
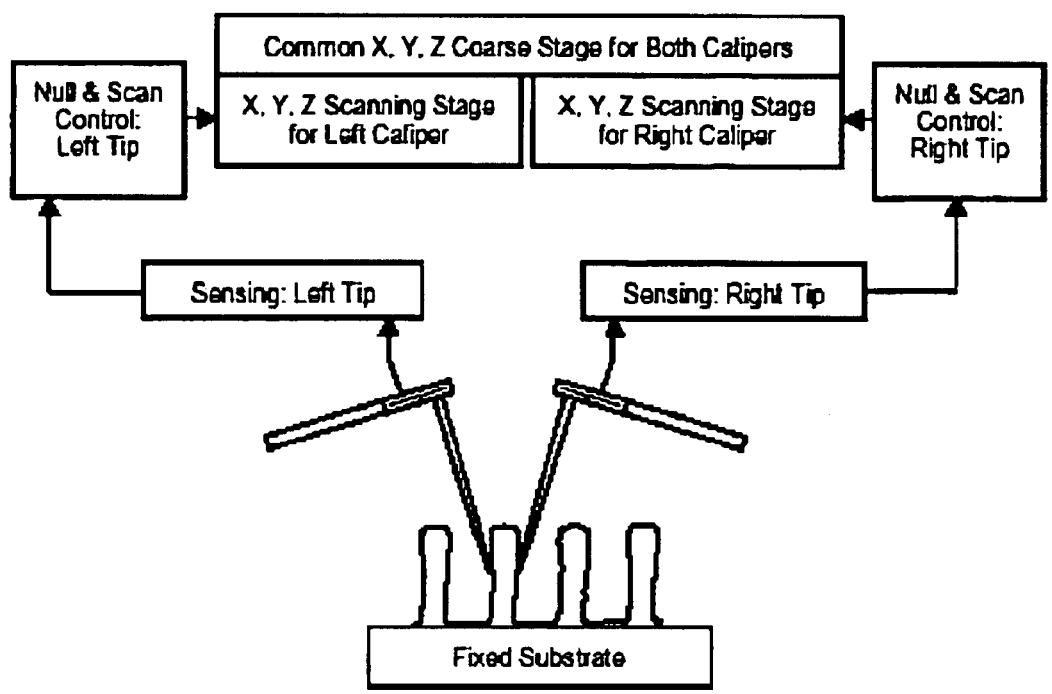
FIG. 6 shows a caliper AFM configuration with scanned probes and a stationary test sample, in accordance with an embodiment of the present invention.
Figure 7:
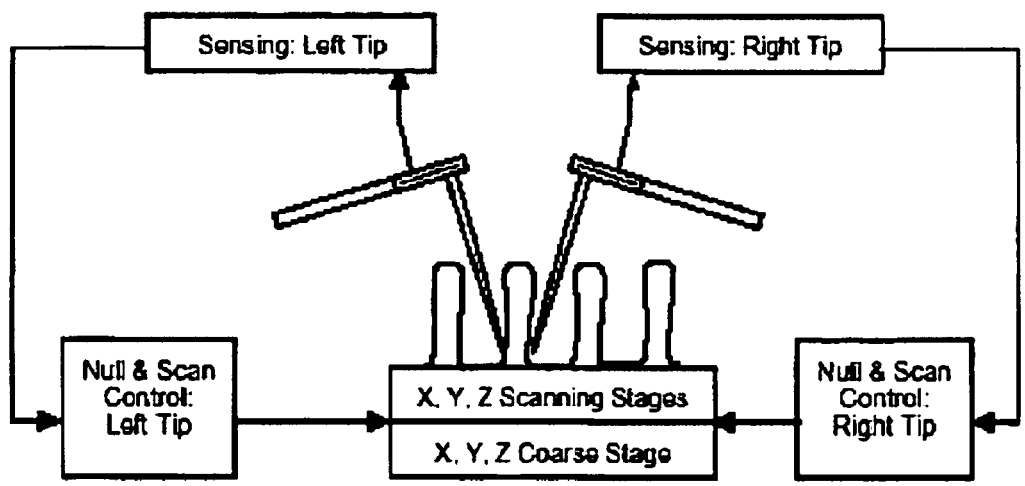
FIG. 7 shows a caliper AFM configuration with stationary probes and a scanned test sample, in accordance with an embodiment of the present invention.

In another example of a common operation in more than one manner, the probes and the sample stage can be arranged so that, during an operation, the probes and the sample stage are either fixed, stationary (e.g., temporarily fixed), or moving (e.g., scanning), in any combination with respect to each other and in respect to any degree of freedom of motion. In one example, illustrated in FIG. 6, the two probes are moving over a fixed sample stage, and in another example, illustrated in FIG. 7, the stationary probes are above the moving stage. In this disclosure the first arrangement is described as scanned-head Caliper AFM, and the second arrangement is described as the fixed-head Caliper AFM with scanned sample stage. Several specific alternative Caliper AFM embodiments that take advantage of different probes and sample stage arrangements will be described later in this disclosure.

Although the disclosure of the present invention is discussed in terms of an atomic force (e.g., the van der Waals force), other interaction forces commonly used in scanning probe microscopy may also be applicable. Examples of such other interactions include electrostatic force, magnetic force, and tunneling current.

Use of Tilted Probes

Tilted probes for use in a Caliper AFM are described. Use of tilted probes raises issues related to clearance and positioning of the oscillators to allow their tips to be in proximity of each other or touch each other as the oscillators are tilted and brought laterally next to each other. The issues related to probe tilting are discussed for the more restrictive case of tip-to-tip touching.

It is known to those skilled in the art that each AFM probe consists of an oscillator that acts as a force sensor, a tip whose apex is engaged in interacting with the surface, and an oscillator mounting chip that carries the oscillator and facilitates its attachment to a motion stage. Conventional AFMs and their conventional oscillator mounting chips, oscillators, and tips have been designed to operate on a relatively flat horizontal surface and are not best suited for use as a Caliper AFM as described in the disclosed invention.

Figure 8:
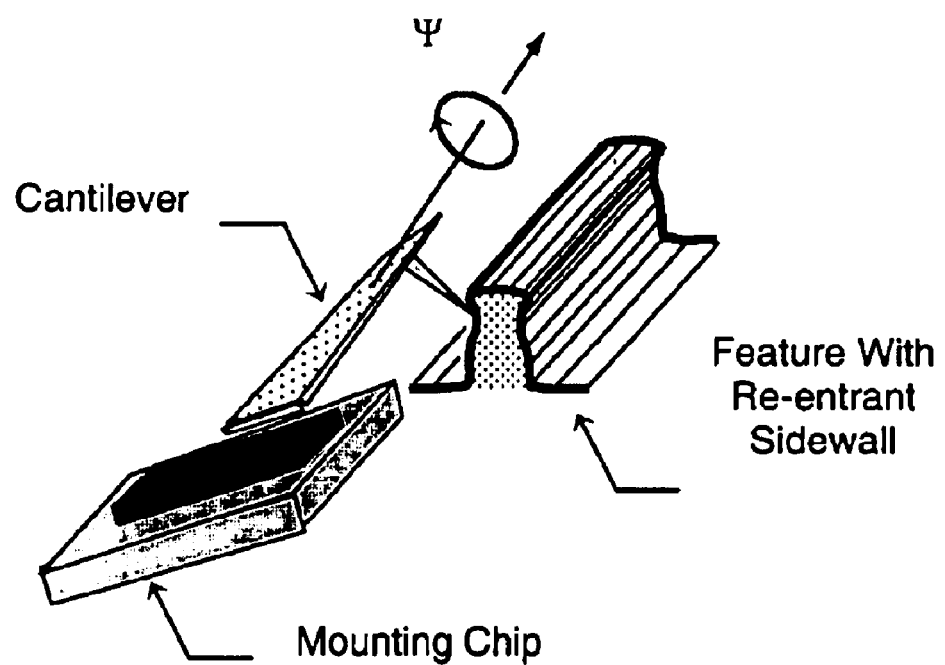
FIG. 8 shows a tilted probe in accordance with an embodiment of the present invention.

A conventional vertically oriented AFM probe with sharp conical tip could not interact with (for example, image or measure) a vertical or re-entrant sidewall of a sample with its apex. A conventional AFM operating over a vertical surface will completely miss any near vertical sidewall surfaces in which the half-cone angle of the tip is larger than the slope of the sidewall. For a vertical sidewall the half-cone angle of the tip is always larger than the slope of the sidewall. Reentrant sidewalls are also inaccessible by vertically oriented probes with sharp conical tips In another embodiment of the Caliper AFM at least one probe is tilted around an axis to enable better access of the tip to a vertical or re-entrant sidewall of a sample, as illustrated in FIG. 8. It is implied that the tip apex, and not the entire tip, needs to access the sample. Tilting the probe in more than one axis may enable better access of the tip to the sample. Tilting of both probes may be desirable.

Similarly, two conventional vertically oriented probes with sharp conical tips could not image or measure the same nanometer sized sample feature at about the same time. It is implied that the tip apexes, and not the entire tips, are engaged in operating on the sample. The width of the oscillators would prevent the probes from working in proximity to each other since the oscillators would collide before the tips are in sufficient proximity to operate on the same nanometer sized feature at about the same time. In practice, the sample features in the current generation of semiconductor circuits are less than 250 nm wide, requiring that the tips also be less than 250 nm apart.

In another embodiment of the Caliper AFM at least one probe is tilted around an axis to enable better access of the two tips to the same nanometer sized sample feature at about the same time. Tilting the probe in more than one axis may enable better access of the two tips to the sample. Tilting of both probes may be desirable.

In an extreme case, two conventional vertically oriented probes with sharp conical tips could not touch each other to implement a zero-reference calibration procedure that is described elsewhere in this disclosure of the invention. However, the width of the oscillators would prevent the probes from touch each other since the oscillators would collide before the tips are in sufficient proximity to touch.

In another embodiment of the Caliper AFM at least one probe is tilted around an axis to enable the two tips to touch each other. Tilting the probe in more than one axis may enables better access of the two tips to the sample. Tilting of both probes may be desirable.

Oscillator Clearance

Figure 9:
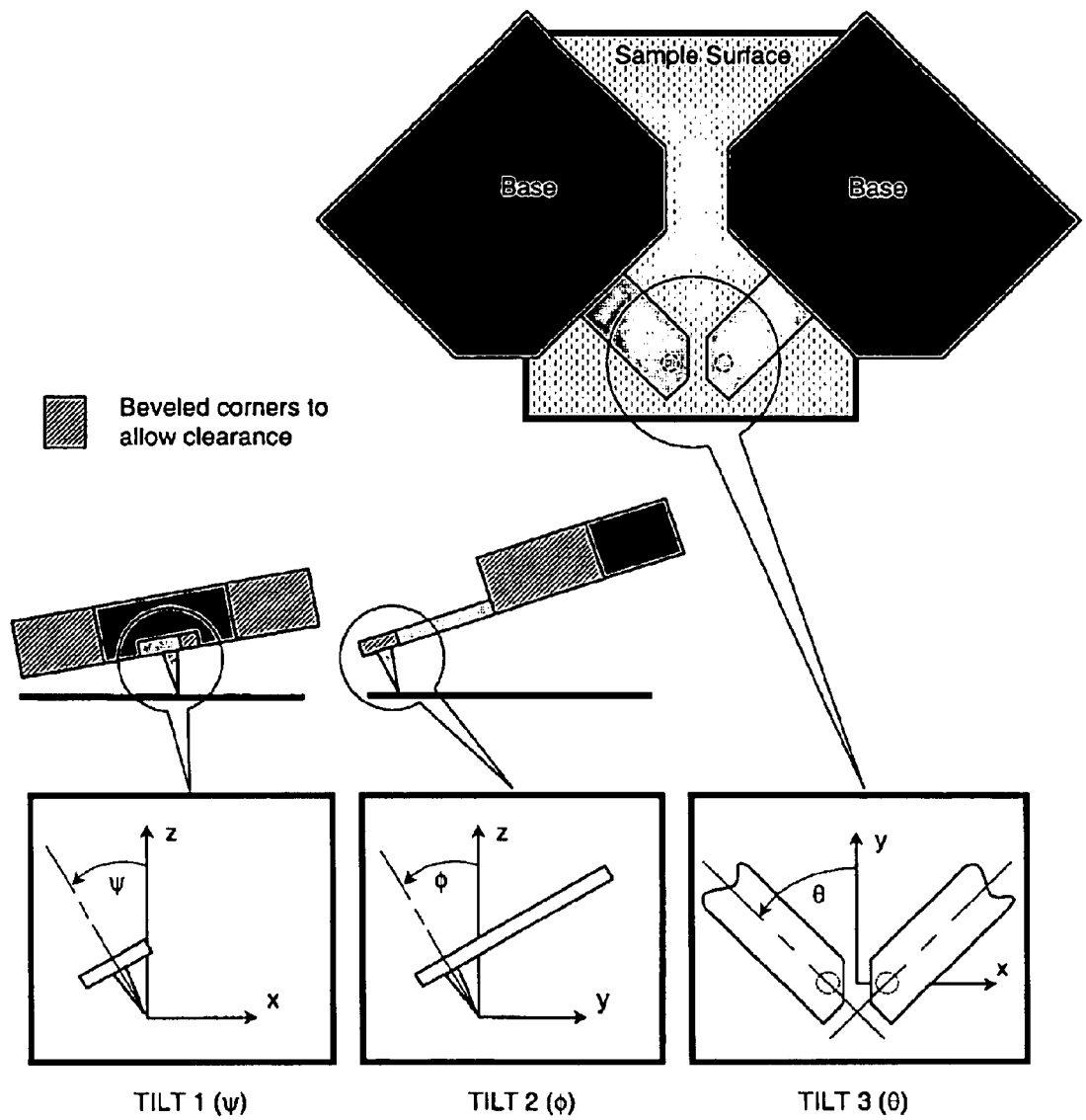
FIG. 9 shows two tilting probes coordinating as a caliper, in accordance with an embodiment of the present invention.

For the best result, three tilts may be combined to enable the required clearance, as illustrated in FIG. 9. Lowering of the oscillator tip down with respect to its base (Tilt 2) is typical with commercial AFMs and is intended to provide clearance for clamping of the base of the oscillator. One-sided oscillator clamping can eliminate the need for Tilt 2. Rotating each oscillator around its long axis (Tilt 1) enables access to the feature sidewalls. Clearance with respect to the sample is required to avoid crashing of the oscillator's edges into the sample. Oscillator and base width, together with tip length, control the degree of Tilt 1. It is desirable that the Tilt 1 is larger than the half-cone angle of the tip. Experimental results have shown that acceptable Tilt 1 is about 10 degrees for a half-cone tip angle of 10 degrees. Pivoting each oscillator around its tip axis (Tilt 3) and pivoting their bases away from each other allows for side-to-side oscillator proximity without crashing the edges of the oscillator with respect to each other. Relocation of the position of the tip with respect to the oscillator and beveling of the oscillator's ends enable Tilt 3.

Oscillator Tilt Adjustment

In one embodiment of the caliper AFM, all three oscillator tilts can be fixed at set-up. In another embodiment, to enable access to a range of vertical and reentrant sidewalls with a standard conical sharp tip, Tilt 1 is adjust at set-up with the help of an angular stage, while Tilt 2 and Tilt 3 are fixed. However, the adjustable tilt, Tilt 1, remains fixed during scanning. Adjustable Tilt 1 is particularly needed for imaging and measurement of dense lines with high aspect ratio and reentrant sidewalls, where Tilt 1 has to be have a certain value to reach the bottom of the features and access the sidewalls.

Compact Angular Stage Embodiment

Figure 10:
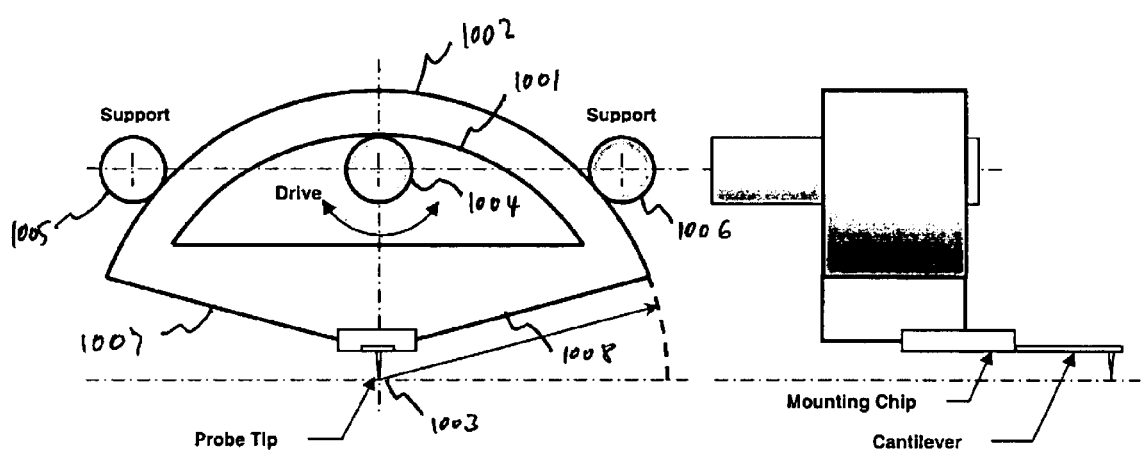
FIG. 10 shows a mechanism for tilting AFM probe, in accordance with an embodiment of the present invention.

The preferred embodiment of a new compact angular stage design is described. Referring to FIG. 10, the circular arc bearings 1001 and 1002 are concentric with a point at the probe tip apex, 1003. An actuator, illustrated as a drive wheel, 1004, is provided to rotate the angular stage. Support elements, illustrated as rollers, 1005 and 1006, maintain the circular arcs in a concentric relationship with the probe tip apex before, during and after rotation. The smoothness and eccentricity of the inner and outer arcs will be critical for achieving tilts with very high precision. Also of concern are dimensional tolerances for the concentric arcs and support bearings, and the effect of structural deformation under loading by the bearings. This embodiment maintains the probe tip apex at a specified location while rotating the probe and its support structure through a specified angle. Clearance with respect to the sample is required to avoid crashing of the oscillator's edges into the sample. The preferred embodiment achieves clearance by having beveled left and right bottom surfaces 1007 and 1008, to provide clearance with respect to the sample as the oscillator is tilted.

Reduction of the pitch angle of the angular stage with respect to the sample is desired because it increases the available tilt range. Preferably, the angular stage has zero pitch angle, in which case the long axis the AFM cantilever is parallel to the sample plane. Attachment of the cantilever to the base of the angular stage may take into account that an excitation PZT needs to be mounted between the bottom of the stage and the oscillator base.

An embodiment of the angular tilt stage can be manufactured to be millimeters in size and be able to tilt through angles on the order of ±10° as may be required to enable the probe tip to access undercuts of dense high aspect-ratio features. An embodiment of the angular stage can be mounted on a PZT-based XYZ scanning stage.

The preferred embodiment has an integrated tilt sensor to provide feedback for controlling the tilt. One embodiment uses external PZT drives with integrated sensors to precisely actuate the angular stage and sense the amount of tilt. With this approach, the tilt is translated into linear displacement through levers. Another embodiment uses a fiducial mark on the oscillator surface to read out its tilt. In this embodiment, the reflection off the fiducial is read with a PSD detector.

For some applications, it may be necessary to decouple angular motion of the tilt stage from linear translation of an XYZ stage on which it is mounted. This can be accomplished by providing feedback from the tilt sensor to both the XYZ stage and the tilt stage so as to maintain the apex of the tip at a fixed position. The feedback loop can provide dynamic response in case high angular accelerations are required for tilting as well as means for fine tuning of the rotation axis to compensate for tip wear.

Tips for Use with Caliper AFM

Each probe includes a tip. The choice for a probe tip for a caliper AFM can depend on the application. In an embodiment for a Caliper AFM for measuring and imaging of isolated features, tip requirements are minimal. A common conical silicon tip with height of a few microns, full-cone angle up to 20°, and tip radius of 10 nm is sufficient. These approximate tip dimensions enable access to the sidewalls of the feature with tilted tips.

In another embodiment of a Caliper AFM for measuring and imaging of more demanding applications, such as linewidth measurement of dense, high aspect ratio lines with reentrant sidewalls, a sharp tip may be used to enable accessing the bottoms of the trenches and the undercuts of the sidewalls. Such a tip may have full cone angles of 3 to 6 degrees to access dense features down to 100 nm size with corresponding trenches of 100 nm that actually limit the tip access. The tip length can be high, 10 microns or more, to allow oscillator tilts through large angles, ±25°. Using sharp 1-D silicon tips to access vertical and highly reentrant sidewalls to take CD measurements is feasible. Commercially available sharp tips that are ion milled down to a full cone angle of 10 degrees can be used, for example.

Carbon Nanotube Tips

In another embodiment of a Caliper AFM, carbon nanotube tips can be used for linewidth measurements of features that are less than 100 nm. The advantage of carbon nanotube tips is that that they are small and slender.

Polystyrene Bead Tips

One important aspect of tips is their apex radius. It may be beneficial for the tips to be approximately identical to each other so as to provide symmetry during the zero reference calibration process in which the tips touch each other at their apexes. In another embodiment for a Caliper AFM, polystyrene beads may be attached to the apexes of the tips. Polystyrene beads are perfectly symmetrical spheres with diameters of less than 1 micron. Use of spherically terminated tips may tend to eliminate tip uncertainties.

Scanning Along Vertical Sidewalls

For linewidth measurement of features in semiconductor circuits it is desirable that an AFM be able to image and measure vertical and reentrant sidewalls. One limitation of conventional AFMs is their inability to scan along vertical surface walls, mainly due to limitations of the force sensor, including the cantilever. Other limitations are due to the tip shape. Conventional AFMs use only the main cantilever (first bending) resonant mode and are therefore able to respond to tip-surface forces from a horizontal surface. This implies that conventional AFMs scan only in the horizontal direction. One prior art AFM used for critical dimension measurements has a boot-shaped tip that allows access to vertical and reentrant sidewalls and it dithers its cantilever in the lateral direction (frequency modulated on top of the main cantilever resonant mode) to enable it to respond to tip-surface forces from a vertical surface and therefore scan in the vertical direction. One of the shortcomings of the lateral dither is that it is not a resonant cantilever mode and therefore provides force sensor sensitivities that are not adequate. Another shortcoming is that the dither is dependently coupled to the bending mode to deliver force sensing.

A more suitable solution for a Caliper AFM is the use of probe tilting to enable tip access to vertical and reentrant sidewalls and use of multiresonant oscillators with superior force sensitivity for tip-surface forces due to both, horizontal and vertical surfaces.

Multiresonant Oscillator

The multiresonant oscillator is a new type of AFM cantilever with greatly enhanced lateral force sensitivity. It can be called a multiresonant oscillator, instead of a cantilever, because it is designed to respond in two or three resonant modes that produce tip motions that are orthogonal to each other. Each resonant mode is primarily sensitive to a different component of the surface force gradient acting on the vibrating tip. Vertical force sensitivity allows scanning in the horizontal direction (classical AFM mode) and lateral force sensitivity allows scanning in the vertical direction. Design of the oscillator's shape, thickness, and width promote the desired frequency signature of the respective resonant modes. By tuning the oscillator design one can achieve vertical and lateral force sensitivities that are comparable to each other. Therefore, tip control is superior in both scan directions. The inputs to a feedback controller are the shifts in the two selected resonant frequencies of the oscillator in response to a surface force gradient component in the corresponding direction. The outputs of the feedback controller provide signals to the scanning stage, which it uses to keep the tip-to-sample distance fixed (measured along an effective tip-to-surface normal).

Touch Probing

It is clear from Equations (1) and (3) that linewidth uncertainties can be reduced or eliminated by taking away the effect of the tip-surface interaction. One way to remove the effect of the tip-surface interaction is to operate the AFM in a contact mode of operation. Contact mode relies on short-range (sub-nanometer) attractive surface forces and requires no modeling of the tip-surface attractive interaction. However, scanning in contact mode can rapidly degrade both the tip and the sample. Non-contact mode depends on the long-range conservative surface forces that can strongly depend on surface contamination and can vary with the material composition of the sample. This dependence makes the non-contact mode of operation also prone to variations and therefore greater uncertainties.

A method of tip-surface interaction that is disclosed in this invention is a touch-probing method of operation. Touch-probing is defined as a special kind of a repulsive (contact) mode of tip-surface interaction. It has to be noted that during the touch-probing process there is no scanning (zero scan velocity), therefore, this is can be a gentle process that will not cause tip or sample degradation. In a conventional contact mode of scanning, the tip can be dragged along the surface (non zero scan velocity) while in contact with the surface, possibly causing unwanted damage to itself and the sample. The touch-probing method is suitable for a conventional AFM operation and a Caliper AFM operation.

Alternating Scanning Mode

A better way of operating a Caliper AFM is the combined use of two different scanning modes, non-contact mode scanning, for local navigation of the probes with respect to the sample, and touch-probing of the two tips with respect to the sample to obtain the required dimensional measurement. The combined use of two different scanning modes is referred as alternate scanning mode, implying that the two different modes are used in alternating manner.

The combined use of non-contact mode scanning and touch probing is best utilized if it is integrated with other technological advances such as scanning along vertical sidewalls and a logic and feedback controller.

Another embodiment of the Caliper AFM uses an alternating scanning mode. During non-contact mode of scanning, in both the horizontal and vertical directions, the tip can be held at an operational nanometer-scale distance from the sample, consistent with the long range of the attractive van der Waals forces. In some implementations, the amplitude of vibration of oscillator and tip in non-contact mode may be about 1 nm in the two orthogonal directions. Constant phase or amplitude may be used to keep the tip-to-surface distance at its operational point. After climbing the tip to a desired feature height, the non-contact mode of operation in vertical scanning may alternate with a touch-probe (contact) mode of operation. There may be two ways to do the mode switching. In the first switching mode, while the system is in a non-contact mode of operation, the reference point of the controller may be biased to set the tip-surface distance to a sub-nanometer distance and therefore drive the tip into the repulsive surface force region. This action will cause snapping of the tip to the surface. While in contact the tip will still vibrate. At this point the vibration excitation may be ceased in order to determine the DC position of the tip with respect to the sample. After the measurement has been taken, the procedure may be reversed in the same order to resume non-contact scanning. In the second switching mode, while the system is in non-contact mode of operation, the vibration excitation may be ceased fist, followed by a DC approach of the tip to the sample, until contact is established. There may be some settling time after the vibration is ceased for the oscillator to be settled and before the tip approach is applied. Again, there may be snapping just before the tip and the surface are in contact. After the measurement has been taken the procedure may be reversed in the same order to resume non-contact scanning. Restarting the vibration and going back to the original reference point of the controller, to set the tip-surface distance to be compatible for non-contact mode of operation, may cause some overshooting of the tip-sample distance, which could settle out fast depending on the feedback control. After the overshooting has been stabilized the non-contact scanning may resume. The first method of switching provides dynamic mode alternation while the second mode of switching provides quasi-static mode of alternation.

Other issues that may arise during the mode switching are elastic interaction between the tip and the surface, snapping of the tip to the surface that may cause static bending and torsional deflections, settling times during switching, simultaneity of the switching between the two tips, and the repeatability of the switching back to non-contact mode In one embodiment, after clearing the top of the sample, the two tips touch each other again to establish the zero reference point. The same switching technique may be employed here to go from non-contact to touch-probing mode of operation.

Transverse Mode of Scanning

Figure 11:
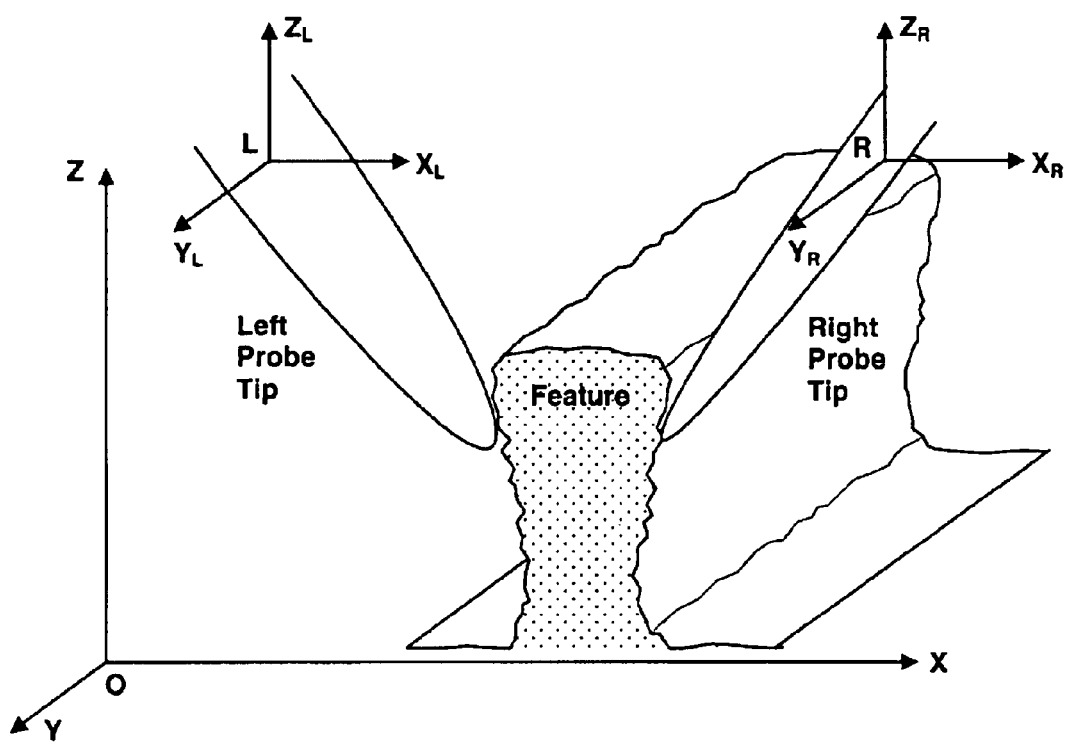
FIG. 11—Measurement using a caliper AFM

Referring to FIGS. 11–14 in one Caliper AFM embodiment a transverse mode of scanning is the preferred mode of scanning. In such embodiment, two sharp silicon tips and the AFM probes supporting them are rotated in space with up to three degrees of freedom, as illustrated in FIG. 11, so as provide adequate clearance and feature access during the subsequent measurement sequence. The tips are then commanded to engage the direct contact, touch probe mode and then translated in a way that allows them to touch each other at their respective lateral extreme points, thereby establishing a zero-lateral-distance reference. This is the pre-measurement calibration step performed in one dimension, i.e., the lateral direction. The caliper tips are then opened to accommodate the feature and positioned at its right and left sides. The tips are then caused to approach the base of the feature, using non-contact mode scanning for local navigation. The tips encounter the lower corners of the feature and then start to climb the sidewalls, which may be vertical or even highly reentrant. Multiple resonances of the oscillator and a special sensing system may be used to achieve the 2-D force sensing needed to scan the tips horizontally as well as vertically. During the non-contact mode of scanning in both horizontal and vertical directions, the tip is kept at a constant nanometer-scale distance from the sample, consistent with the long acting range of the attractive van der Waals forces. At desired heights of the feature the vertical scanning is halted, the non-contact mode of operation is turned off, and the repulsive, contact mode of operation, with zero scan velocity, is turned on. Once the tips touch the sample the linewidth measurement is made. The lateral positions of the two probes and their relative distance are recorded by the sensing system to establish the feature profile and the linewidth measurement. After the linewidth measurement is obtained, the touch-probing mode of operation is turned off and the non-contact mode of operation is turned on. The tips resume non-contact mode scanning and navigate to the next measurement point. After they clear the top of the sample the tips again are operated in touch probe mode and are moved to touch each other at their respective lateral extreme points to reconfirm the zero reference.

Longitudinal Mode of Scanning

Figure 12:
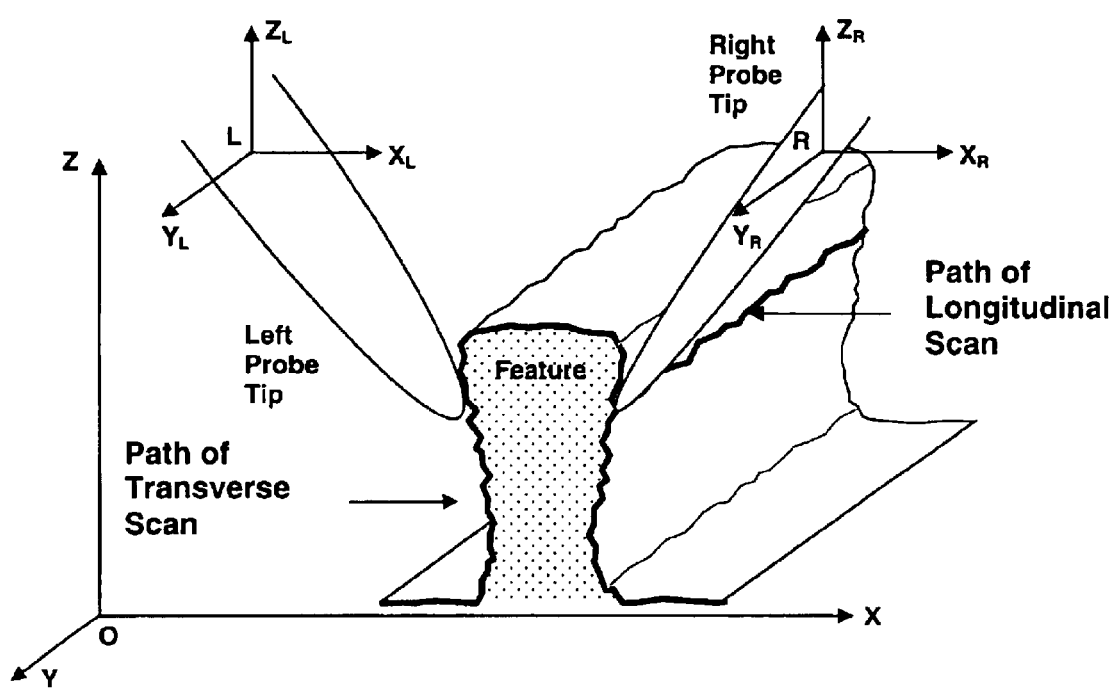
FIG. 12—An illustration showing paths of transverse and longitudinal scans
Figure 13:
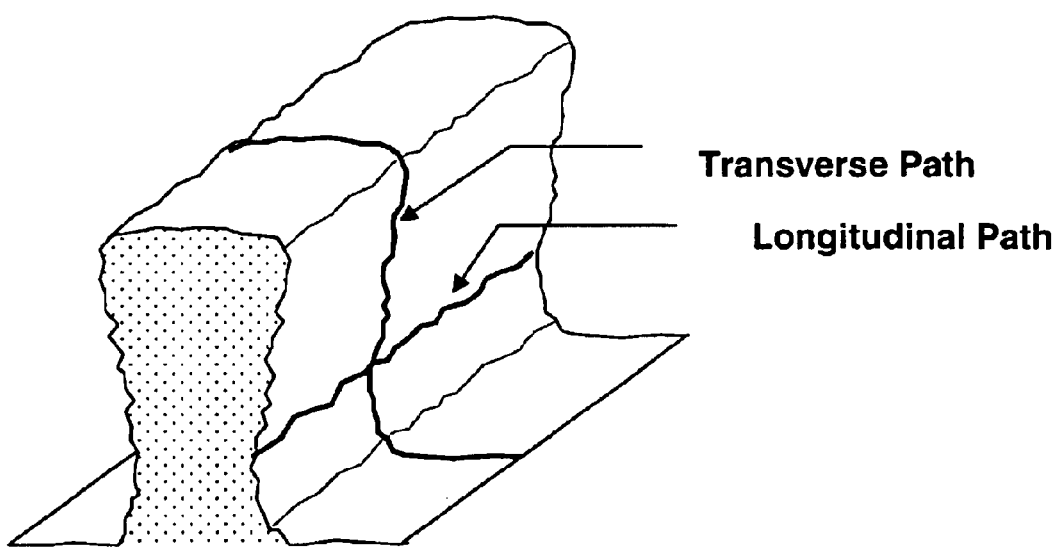
FIG. 13—Line roughness (LR) measurements along a transverse and a longitudinal path on the surface of a feature FIG. 14—Illustration of a Y raster scan
Figure 14:
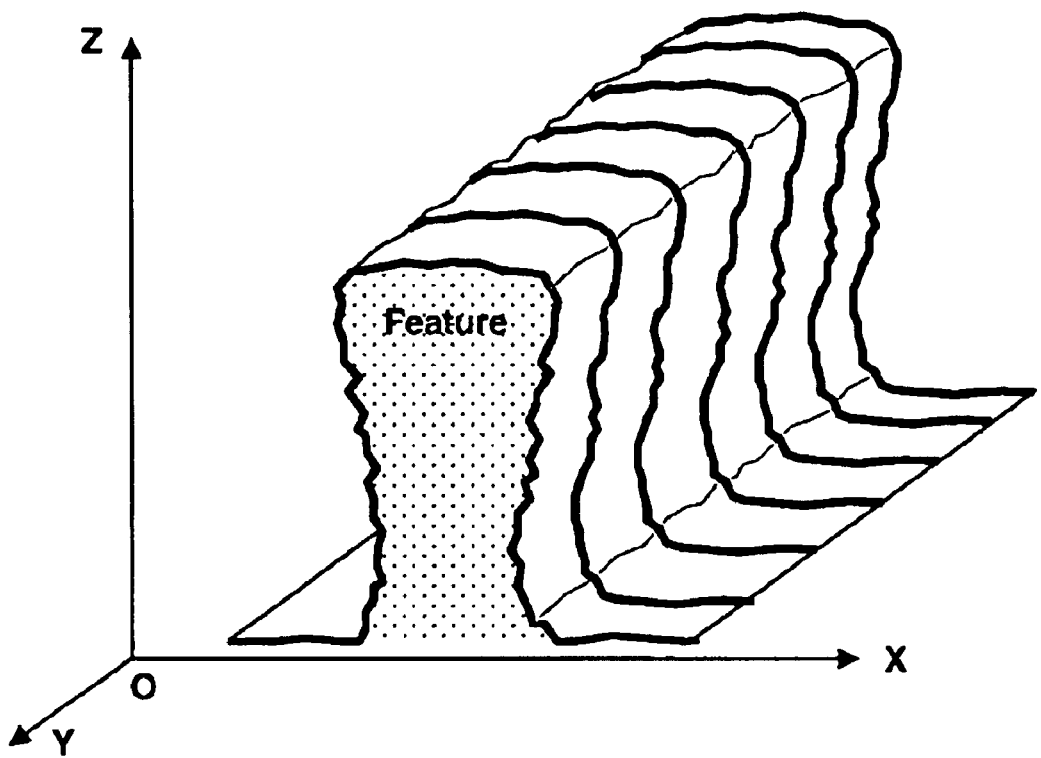

In an alternative mode of scanning, the tips may be scanned in the longitudinal direction, at fixed feature height, along the length of the feature, as illustrated in FIGS. 12, and 13. The principle of operation of this longitudinal scanning is same as that for transverse scanning described above, except for the direction of scanning. The advantage of longitudinal scanning is that the scanning speed can be significantly improved since the tips do not have to switch scan directions all the time.

Via and Contact Hole Scanning

In another alternative mode of scanning an embodiment of the caliper AFM can be used to image vias and measure their width. This is, in fact, a negative linewidth measurement. Because of the clearance issues, for this type of scanning the tips may need to be inserted into the via one by one. As with any scanning mode, the zero reference point can be established by touching the tips with respect to each other.

Sensing
Vibration Sensing System

The function of an AFM vibration sensing system is to convert a time dependent force sensing response of a cantilever interacting with a surface into information fed to a controller that adjusts the tip to sample distance. The output of the vibration sensing system is an AC signal with a frequency that matches the resonant frequency of the cantilever. It can be noted that a multiresonant oscillator used in an embodiment of the disclosed invention accomplish force sensing in two multiple mutually orthogonal directions. This implies that for a multiresonant oscillator there will be two output signals with frequencies that match the resonant frequencies of the multiresonant oscillator.

An embodiment of the Caliper AFM consists of a vibration sensing system responsible for monitoring the response of the oscillators as they interact with the surface of the sample or as their tips interact to each other. There are numerous ways to accomplish the vibration sensing task for a Caliper AFM. Few examples are outlined.

In one example, there are two vibration sensing systems, one for each oscillator, and in another example there is a single vibration sensing system for both oscillators. In one example, two vibration sensing systems monitor two resonances of a single multiresonant oscillator and in another example there is a single vibration sensing system for both oscillators resonances.

In one example, the vibration sensing system is a laser-bounce based sensing system in which a focused laser beam pointed towards the oscillator and where a detector monitors the vibration of a reflected laser beam. In another example, the vibration sensing system is an interferometric system.

For a Caliper AFM embodiment with stationary probes and scanned sample the vibration sensing system consists of two separate vibration sensing systems, one for each oscillator. The vibration sensing system of this embodiment is a laser-bounce based sensing system where the laser source is fixed with respect to the oscillator and the detector is a position sensitive detector (PSD) or a continuous PSD.

In one Caliper AFM embodiment with scanned probes and stationary sample, the vibration sensing system consists of two separate vibration sensing systems, one for each oscillator. In this vibration sensing system the use of a fixed focused laser source is not applicable for vibration sensing of a scanned oscillator because the focused laser spot could fall off the oscillator as it is scanned in X and Y and could de-focus as the oscillator is displaced in the Z direction. Two possible approaches to accommodate vibration sensing of a scanned oscillator include (a) a focused laser source that scans together with the oscillator or (b) to use a fiducial mark on the surface of the oscillator and a fixed collimated laser beam to monitor the vibration of the oscillator as it scans. The first approach is self-explanatory and will not be discussed. The second approach will be discussed.

Fiducial Marks for Vibration Sensing

Figure 15:
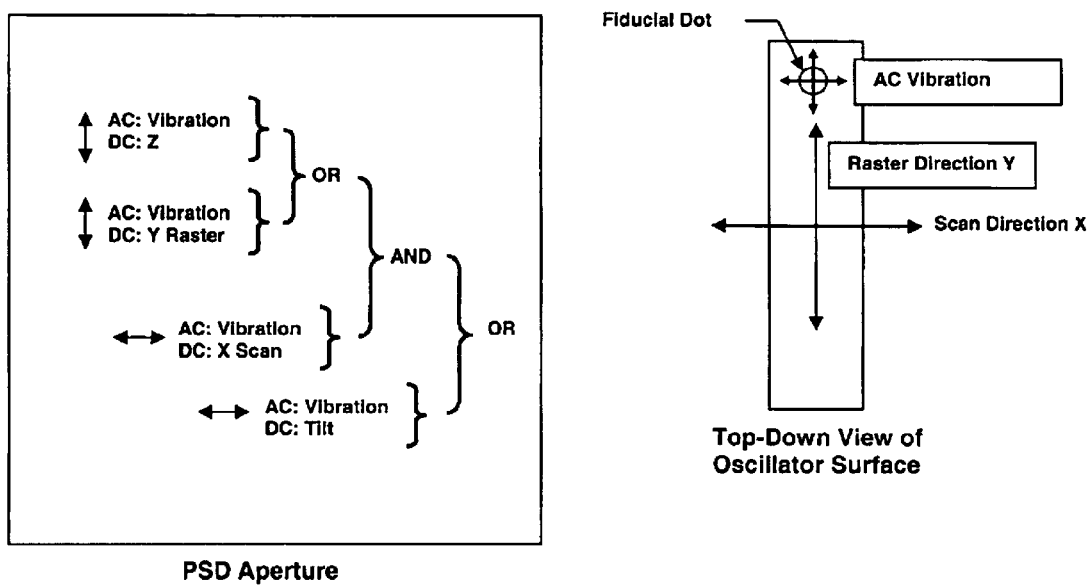
FIG. 15 shows a logic of utilizing a reflective fiducial mark for sensing the AC and DC position of a caliper AFM probe, in accordance with an embodiment of the present invention.
Figure 16:
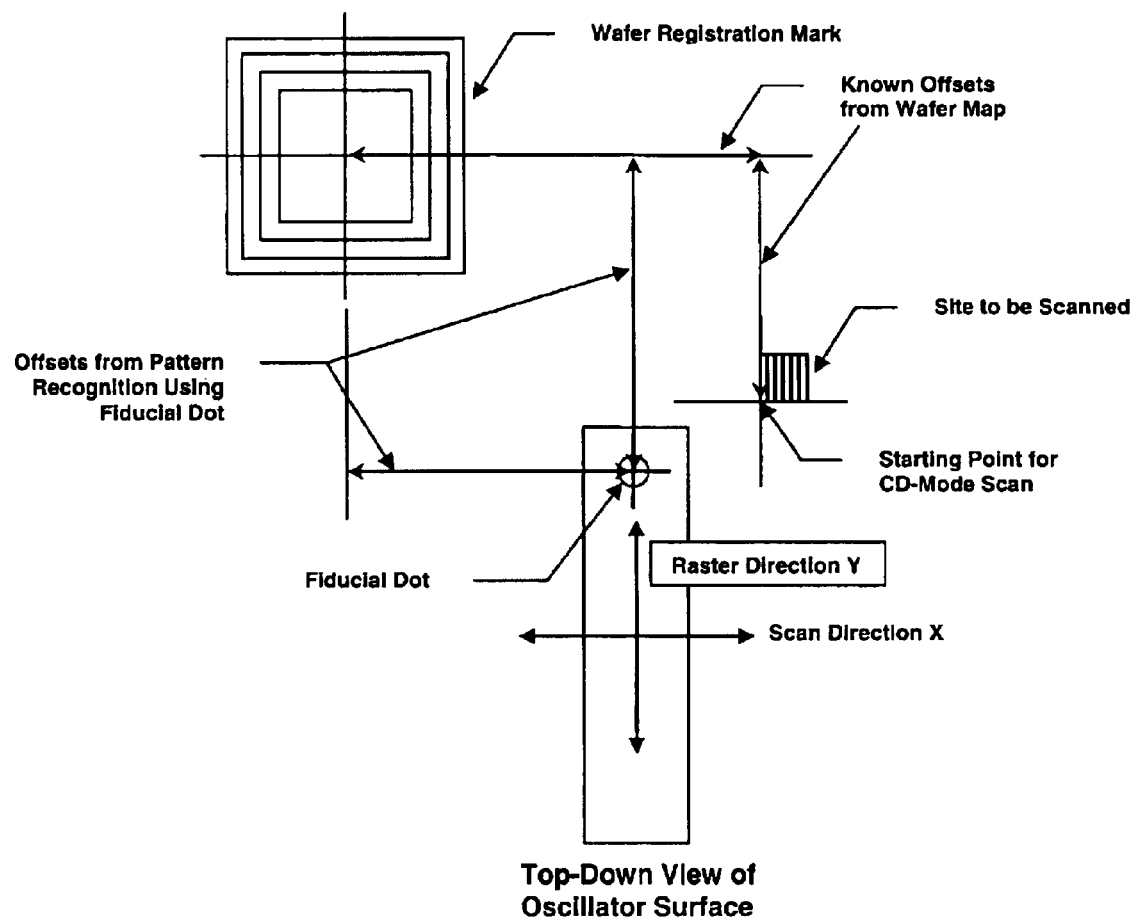
FIG. 16 shows use of a reflective fiducial mark for navigating the caliper AFM probe to a target location on a wafer, in accordance with an embodiment of the present invention.

In one embodiment of the Caliper AFM, illustrated in FIGS. 15 and 16, the use of a fiducial mark for vibration sensing eliminates the need for a focused light beam. One implementation of the fiducial mark is a reflective mark surrounded by a non-reflective region of the oscillator surface. A collimated incident beam generates a reflection from the fiducial mark. This reflected beam is incident on the aperture of a position sensitive detector (PSD). Vibrations of the oscillator will correspond to vibrations of the fiducial mark that can easily be captured by the PSD regardless of the X, Y, Z alignment of the oscillator with respect to the collimated beam as long as the fiducial mark is inside the area of the collimated beam.

Vibration Sensing of Multiresonant Oscillators

In another embodiment of the Caliper AFM there is a single vibration sensing system for both oscillators' resonances. Regardless of the way the reflected light beam is generated, for example, from a fiducial or with a focused laser beam, the method of detecting multiple resonances from a multiresonant oscillator with a single PSD is the same. The vibration sensor signal is an AC signal that depends on the amplitude of the laser spot anywhere on the aperture of the PSD, and it may be proportional to the vibration of the oscillator. Any number of resonances can be monitored with a single PSD by frequency demodulating the AC signal from the PSD. Detecting multiple oscillator resonances with a single PSD is feasible.

Stage-Independent Position Sensing

Direct measurement of the tip-to-tip differential distance is another independent way to remove uncertainties in a linewidth measurement with scanned dual probes. One solution to the problem is to come as close to measuring the actual tip position as possible. In this solution, the XYZ position of the probe is obtained from the scanning stage sensors and an assumption is made that there are no other relative displacements between the stage and the probe. The stage position is then used to infer the probe position and, with that, the sample topography.

Another solution is to directly measure the tip-to-tip distance. In one Caliper AFM embodiment there is a single vibration sensing system for both oscillators. This caliper AFM embodiment is suitable for direct tip-to-tip measurement to eliminate mechanical loop uncertainties.

Direct detection of the oscillator itself removes the sensing requirement from the scanning stage and makes it a responsibility of the scanning sensor. Direct measurement of the differential oscillator-to-oscillator distance can provide the differential tip-to-tip distance. Referring to Equations (4) and (5) we can substitute the stage position measurements with tip position measurements to obtain the linewidth measurement:

$$w_{differential} = K[(y_{tip} - x_{tip}) - (y_{Rtip} - x_{Rtip})] \qquad (8)$$

$$w_{differential} = K[\Delta_{tip} - \Delta_{Rtip}] \qquad (9)$$

where K is a scaling factor. Reliance on the stage measurements with respect to a reference structure assumes that there are no vibrations or drifts in the mechanical chain from the stage to the tip. The stages may be able to guarantee that the measurements y and x are stable, but there is no guarantee that the stage-to-tip distances are stable. On the other hand, the position of each fiducial, $y_{tip}$ and $x_{tip}$, is as close to the tip as possible and can be considered very stable and insensitive to vibration or drift. Use of a single detector to monitor the differential measurement $y_{tip} - x_{tip}$ addresses mechanical instabilities between two separate detectors.

Stage-Independent Position Sensing with Fiducial Marks

Another embodiment of the Caliper AFM employs fiducial marks for implementing stage independent position sensing of the scanned probes. Fiducial marks attached to the free ends of the respective oscillators can be used to detect the in-plane (XY) and out-of-plane (Z) position of the oscillators themselves, without relying on the scanning stage sensor for that information. Change of the XYZ position of the oscillator, and with it the fiducial, can cause traversing of the reflected light beam on the aperture of the PSD that is proportional to the XYZ position of the oscillator. By locking any of the two axes the third one can be directly detected. Position change of the fiducials can manifest itself as a change of the DC output of the PSD. For linewidth measurements, Z and Y may be locked as to produce a DC signal that is proportional to the position of the oscillator in X direction.

Stage-Independent Position Sensing with Focused Light Beam

Another embodiment of the Caliper AFM employs fixed focused laser source for implementing stage independent position sensing of the scanned probes. In this embodiment the reflected light beams from two oscillators (from the Caliper AFM) is directed with the help of mirrors, and collimators if needed, towards the aperture of a single detector. It is preferred if the detector is a continuous PSD detector. The principle of detecting the relative position of two laser spots on a single aperture was described before.

Vibration and Position Sensing of Two Scanned Probes with a Single PSD

The decision to use vibration and position sensing of two scanned probes with a single PSD is used in another Caliper AFM embodiment, illustrated in FIG. 4. Use of fiducial marks for position sensing poses the potential of using the same fiducial mark for vibration sensing. Electronic signal processing can be implemented to simultaneously monitor oscillator vibration (AC) and position (DC). The AC component of the signal will be proportional to the vibration of the oscillator and the DC component of the signal will be proportional to the in-plane position of the oscillators. The AC signal may be further processed and sent via a feedback signal to the scanning stages to maintain constant tip-sample distance. The DC signal can be used to monitor the position of the oscillators with respect to their initial positions. Simultaneously monitoring vibration and position of a laser beam with a single PSD is feasible. In some implementations, the signal-to-noise ratio of this signal processing may be poor. Two oscillators could produce two reflected laser beams that hit the aperture of a single PSD. Using light intensity multiplexing, a single PSD can simultaneously process two independent laser beams that correspond to two oscillators. Each reflected beam carries within itself the vibration and position information of the respective oscillator. After they are separated by demodulating the incoming signal, the AC (vibration) and DC (position) components of each signal can be processed in a manner consistent with above described signal processing requirements. The relative difference of the DC component of each signal will be proportional to the oscillator-to-oscillator (tip-to-tip) distance.

Sensing System for a Caliper AFM

In a specific example, illustrated in FIG. 4, we describe how a sensing system works for a Caliper AFM embodiment. Collimated light from a wide-beam laser is pointed towards the two probes. Typically a collimated laser beam is 1 mm in diameter while scan areas may vary from 2 $\mu$m×2 $\mu$m to 100 $\mu$m×100 $\mu$m. However, the diameter of the beam is limited only by power. The fiducial marks are reflective surfaces on a non-reflective background. Therefore, illumination by a collimated beam will produce a collimated reflective beam. The use of fiducial marks eliminates the need to use a focused laser beam that tracks the oscillators so as to keep its focal point within a region on the oscillator surface. For a dual-probe design there will be two reflected beams, each pointing opposite of each other, consistent with the spatial orientation of the oscillators. A set of fixed mirrors can be used to point the reflected laser beams into the aperture of the PSD. Although ideally collimated, these reflected beams may be slightly diverging. Therefore, the optical paths from the fiducials to the PSD should be kept as short as possible, e.g., in a cm range. The preferred position sensitive detector is a continuous type of position detector. Using a signal processing technique the PSD will process two input signals simultaneously. The AC components of the signal will be proportional to the vibration of the oscillator and the DC components of the signal will be proportional to the in-plane positions of the oscillators. The AC signal is further processed and sent via a feedback signal to the scanning stages to maintain constant tip-sample distance. The main bending resonance will provide most of the sensitivity required for horizontal scanning and the torsional resonance will provide most of the sensitivity required for vertical scanning. The DC signal will be used to directly monitor the positions of the oscillators with respect to their initial locations. The relative position of the two oscillators with respect to each other will provide a scaled measure of the oscillator-to-oscillator (tip-to-tip) distance. By contrast, the positions of the scanning stages will also provide information about the oscillator-to-oscillator distance, but indirectly. This contrast of different types of differential distance measurement is discussed elsewhere in detail.

Stage-Independent Position and Tilt Sensing with Fiducial Marks

Another embodiment of the Caliper AFM employs fiducial marks for implementing vibration sensing as well as stage independent position and tilt sensing of the scanned probes. An example of a measured tilt is the variable Tilt 1 or the compact angular stage as described elsewhere in this invention. In this embodiment the sensing system is using scanned oscillators with fiducial marks to determine their in-plane position and out-of-plane tilt during scanning. The size of the collimated beam has to be at least the size of the scanned area. Typically a collimated laser beam is 1 mm in diameter while scan areas may vary from $2\mu \times 2\mu$ to $100\mu \times 100\mu$.

The stage-independent scan sensing and its simultaneous use with the tilt and vibration sensor can be achieved with the use of a sensing logic. This innovative method assumes use of a fiducial mark and a single PSD for the entire sensing operation. Any other combination of fiducial marks, focused laser, single or dual detectors is also applicable for the disclosed method. The vibration sensor signal is an AC signal that depends on the amplitude of the laser spot anywhere on the aperture of the PSD, and it is proportional to the vibration of the oscillator. Any number of oscillator resonances can be monitored with a single PSD by frequency demodulating the AC signal from the PSD. The tilt sensor signal is a DC signal that depends on the position of the laser spot on the aperture of the PSD, and it is proportional to the tilt of the oscillator. The scan sensor signal is a DC signal that depends on the position of the laser spot on the aperture of the PSD, and it is proportional to the XYZ position of the oscillator. By strategically positioning the PSD with respect to the reflected light from the fiducial one can achieve the desired signal distribution. There are five unknowns; X, Y, Z, tilt position, vibration amplitude, and only 2 outputs from the PSD, Xpsd and Ypsd. To make up for lack of information the method uses, at the same time, only enough signals as we can resolve, any two positions and a vibration. For example, during scanning, X and tilt are fixed and we monitor Z, Y, and vibration. During rastering, Z and tilt are fixed and X and Y are monitored. Therefore, it is possible to use combinations 1 or 2 or 4 with 3.

Redundancy of the measurements can be obtained, if necessary, by adding an extra fiducial mark, an extra focused laser beam, or an extra collimated beam. However, this addition increases the complexity and size of the scanned AFM head.

Caliper AFM Navigation

Another embodiment of the Caliper AFM employs use of the fiducial mark to simplify the site navigation and improve the coarse positioning to precisely determine the starting point of the AFM scan. This embodiment offers significant improvement in throughput due to improvements of the navigation process.

In this embodiment the fiducial mark on the oscillator is used as a registration mark that can be used with optical pattern recognition technology to greatly improve site navigation. In another embodiment, the same fiducial mark that is used for navigation can also be used for vibration, position, and tilt sensing. The fiducial mark is a very distinguishable feature on the oscillator that is not ambiguous, as is recognition based on an edge of an oscillator. With this approach, prior knowledge of the IC design and a registration mark on the wafer are used to determine relative positioning of the fiducial mark with respect to the wafer, and therefore the tip of the probe, even if the sample is fully occluded by the oscillator. This independent sensing and positioning capability in lieu of coarse-mode pre-scanning to find the starting point of the measurement can be achieved with nanometer precision. With the help of the in-plane stage-independent sensing capability, one can control the oscillator's XY position with nanometer precision within the range of the scanning stages. With the help of the vibration, position, and tilt sensing method described elsewhere, the tilt and the Z displacements of the oscillator need to be kept fixed when the oscillator moves in the XY plane. If Z displacement is needed, the XY position can be fixed and the Z position of the oscillator can be sensed. Again, one needs prior knowledge of the IC design and a registration mark on the wafer to position the fiducial mark with respect to the wafer registration mark. If some pre-scanning is still needed it will be extremely minimal.

Another embodiment of the Caliper AFM employs use of the fiducial mark to simplify the site navigation and improve the coarse positioning to precisely determine the starting point of the AFM scan, wherein the fiducial mark is located on the mounting chip itself or a feature of the mounting chip, such as its bevel, may be used as a fiducial. In this approach the fiducial is no longer tied to the oscillator and cannot be used for force sensing.

Another embodiment of the Caliper AFM employs use of angular tilt of the oscillators to remove the occlusion of the sample by the oscillator and to use that view to navigate the oscillators to a position ready for scanning. In this approach the oscillator is tilted through angles that are large enough to enable observation of the probe tip from a top down view but not as much tilt as to crash the probe to the sample. Since the typical half-width of an oscillator is $15\mu$ and a typical tip can be $15\mu$ long, one needs about a 45° tilt to achieve this goal.

Control
Controller

An embodiment of the caliper AFM includes at least one controller that controls the tip of each probe with respect to the sample, and each probe with respect to the other. In one example, the controller is a conventional PID feedback controller. In another example, the controller is a multiple-input-multiple-output (MIMO) feedback controller. In another example, the controller is a real-time controller. In another example, the controller is a digital controller. In another example, there are two controllers, one for each probe. In another example, there are two controllers, one for each resonant mode of a single oscillator. In another example, the sample stage also has a controller. In another example, there is a logic that connects the multiple controllers.

In one embodiment of the Caliper AFM the controller is a real-time, digital, multiple-input-multiple-output (MIMO) feedback controller, one for each probe, and a logic that coordinates the two MIMO controllers. A MIMO controller is better than two or more PID controllers since it integrates the function of two PID controllers and takes into account any cross-talks. The MIMO controller of a single probe is responsible for scanning the probe in 2-D, on a horizontal surface (vertical scanning) and on a vertical surface (lateral scanning). The inputs to the MIMO feedback controller for each probe are responses of two selected resonant frequencies of an oscillator. These responses correspond to the two selected modes, which respond so as to move the tip in two primarily orthogonal directions as the tip interacts with the surface. The outputs of the MIMO controller for each probe provide signals to the XYZ scanning stage which keeps the tip-to-sample distance fixed (measured along an effective tip-to-surface normal) in vertical and horizontal direction. Coordination between the two individual MIMO controllers may be needed. Each MIMO controller benefits from being aware about the situation of the other MIMO controller so as to coordinate the scanning and so as not to damage the sample or run the oscillators into each other. Although each MIMO controller would be dedicated to an individual oscillator in this embodiment, a delay and trigger loop in the MIMO controller can ensure that one MIMO controller does not take action without first checking with the other MIMO controller. Software logic can furnish this checking capability. A digital controller would benefit implementation of the MIMO controller, since it can handle a more complex algorithm than an analog controller. LabView based hardware and software are candidates for this task, for example.

In another embodiment of the controller, two integrated MIMO feedback controllers can provide tip-to-tip feedback control. Coordination between the two MIMO controllers may be integrated in the feedback. One MIMO controller (the "leader") scans one oscillator in response to the disturbance from the surface. The second MIMO controller (the "follower") scans the second oscillator in response the disturbance from the surface and the relative distance to the other oscillator. More complex MIMO control can accomplish this task. Non-linear responses may have to be accounted for.

Method of Operation of Caliper AFM
Measurement Using a Caliper AFM

Figure 17:
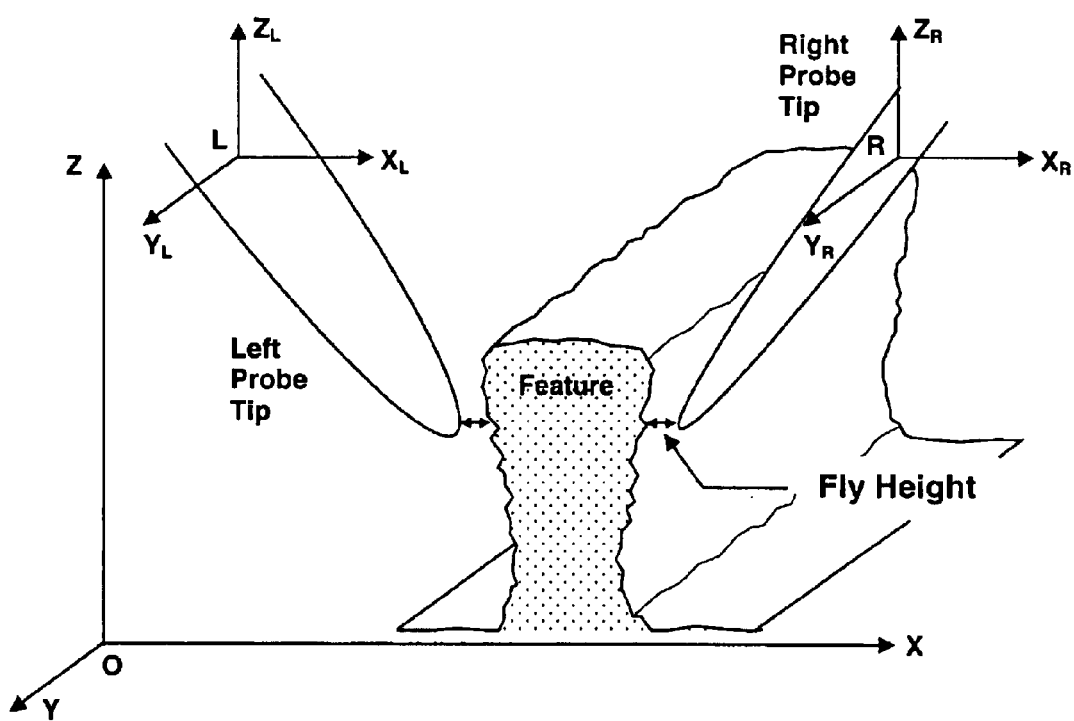
FIG. 17 Non contact mode measurement

The method of measurement using a caliper AFM is illustrated in FIG. 17. The tips of left and right AFM probes are positioned on the surface of a feature. In this illustration, the feature is stationary relative to a tool-fixed reference frame, XYZ. Probe-fixed reference frames $X_L Y_L Z_L$ and $X_R Y_R Z_R$ are attached to the left and right probes respectively, and move with the respective probes. Points L and R are the origins of the respective reference frames. In general, the probe tips may have different shapes and sizes.

Figure 18:
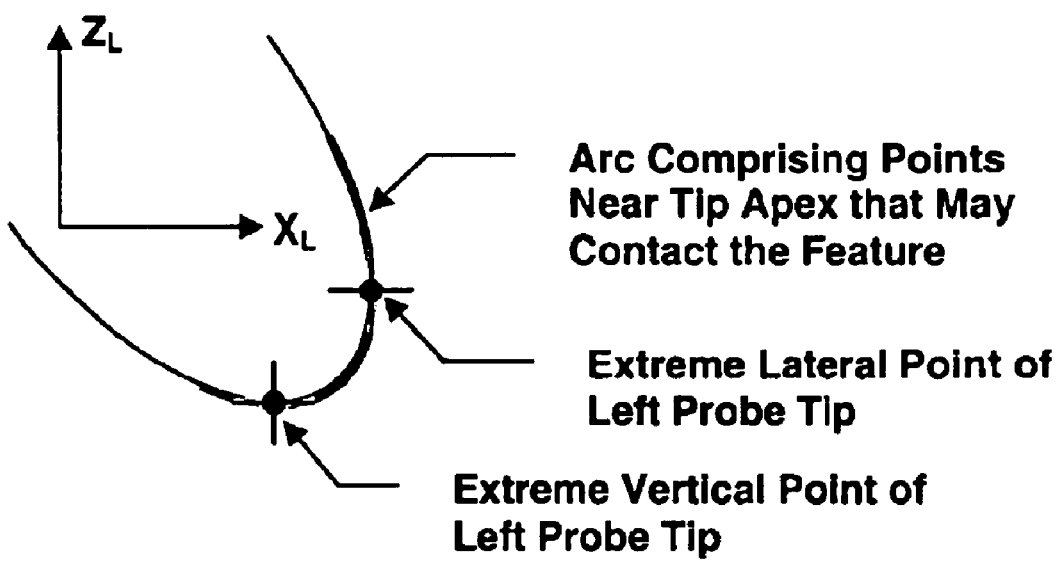
FIG. 18—Extreme lateral and vertical points of left probe tip (Illustrated in two dimensions)

A region near the apex of the left probe tip is illustrated in FIG. 18. If the feature sidewall is vertical, then only the extreme lateral point of the left probe tip contacts the sidewall. Similarly, if the feature top is horizontal, then only the extreme vertical point of the left probe tip contacts the top. In a more general situation, the feature surface presents a range of angles to the tip, and any point within an arc near the tip apex may come into contact with the left sidewall and top of the feature as the position of the left probe changes with respect to the feature. In a three-dimensional representation, the lateral and vertical extreme points and the arc are located on the surface of the tip by specifying their three coordinates $X_L Y_L Z_L$.

A relative measurement occurs when the probes are positioned with respect to the feature in a coordinated manner and a sensing system is used to assign values to coordinates that specify the position and orientation of one probe relative to the other probe. Sensing the position and orientation of one probe relative to the other while the probe tips are in contact with the feature surface, together with knowing the locations of the respective arcs, in the probe-fixed reference frames, provides the information needed to determine a dimension of the feature.

Figure 19:
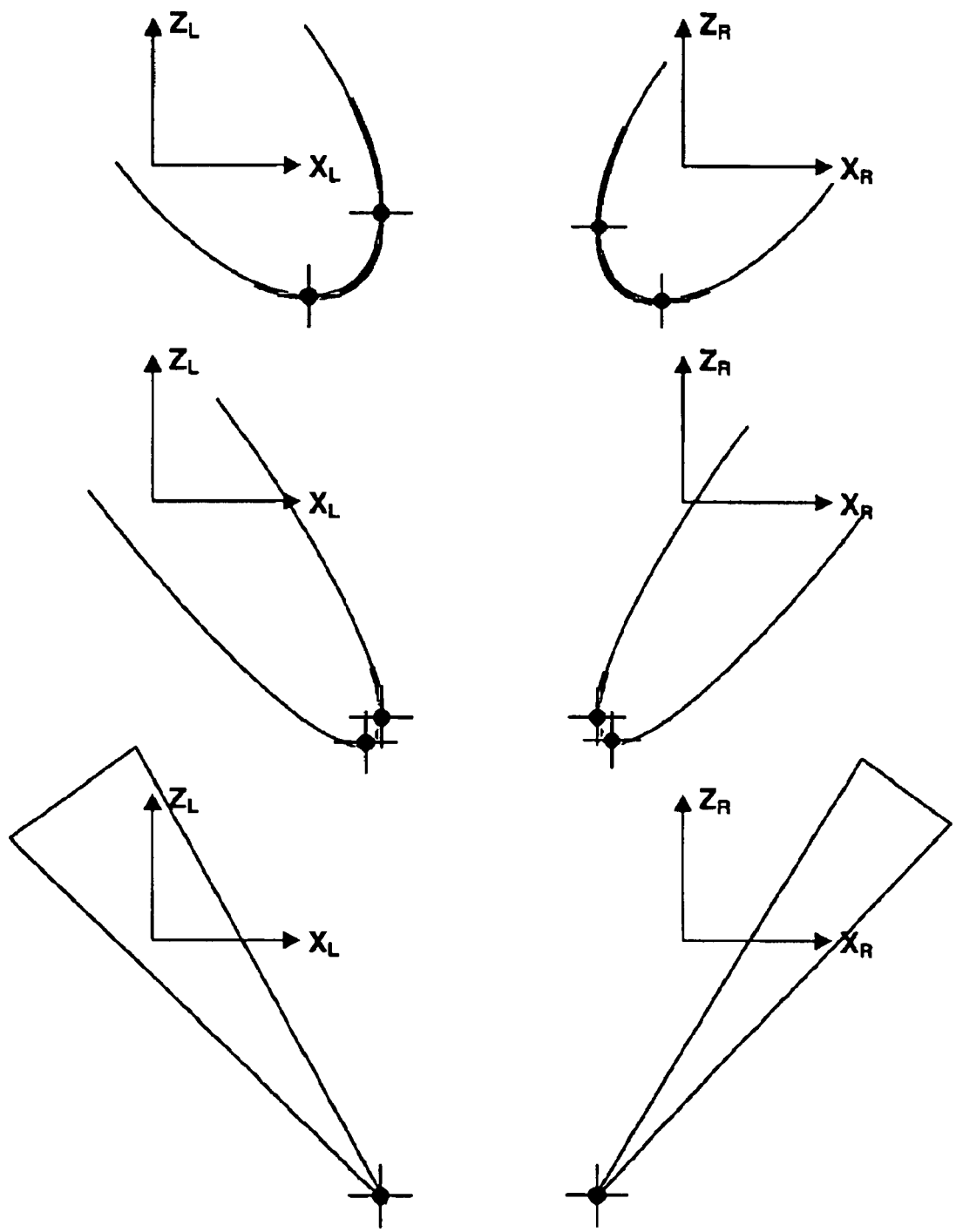
FIG. 19—Illustration showing how sharper tips can shrink the required arcs to arbitrarily small sizes in the case of a Caliper AFM FIGS. 20-A and 20-B show a reference linewidth measurement and a linewidth measurement using a caliper AFM, in accordance with an embodiment of the present invention.

If the arcs can be replaced by extreme lateral points, as in the case of vertical feature walls for example, the feature dimension can be determined by straightforward arithmetic computations. If finite size arcs may contact the feature during the measurement, then a deconvolution procedure is required to remove the effect of probe shape and recover the feature dimension. However, even if a deconvolution procedure is needed, the caliper architecture confines the required arc to a relatively small region near the apex of the tip, rather than requiring it to extend over the entire tip, as when a single probe with fixed orientation is used to contact both sides of a feature. In the case of a caliper AFM, using sharper tips can shrink the required arcs to arbitrarily small sizes, as illustrated in FIG. 19, without requiring reorientation of a probe through a large angle so as to allow it to access both sides of the feature during scanning. In the case of a single probe AFM, however, using a sharper tip can only shrink the required arc to an arbitrarily small size if the single probe is reoriented through a large angle during scanning so as to allow it to access both sides of the feature. Reorienting an AFM probe through a large angle during scanning is typically not done because it requires considerable effort to design and build a system that prevents the accompanying rotational motion from coupling into the linear motion and thereby corrupting the measurement data.

A globally referenced measurement occurs when one of the probes is positioned with respect to the feature and a sensing system is used to assign values to coordinates that specify its position and orientation in relation to the tool-fixed frame XYZ. For example, sensing the position and orientation of the left probe-fixed frame $X_L Y_L Z_L$ with respect to XYZ, together with knowing the location of the arc in the left probe-fixed frame, provides the information needed to determine the location of a point in contact with the left side or top of the feature in relation to XYZ. Similarly, the right probe can be used to make a globally referenced measurement of a point in contact with the right side or top of the feature in relation to XYZ. Combining two such globally referenced data sets resulting from measurements made at multiple points can produce an image of the feature, i.e., a representation of its size and shape in relation to the tool-fixed frame.

Using a caliper AFM also enables combination of a globally referenced measurement with a relative measurement so as to both create an image of the feature and determine its size. For example, the left probe can be used to generate an image of the left side and top of the feature with respect to XYZ, as described above, while the right probe is coordinated so as to make measurements on the other side of the feature while its position and orientation are being sensed with respect to the left probe.

Using a caliper AFM also enables combination of two globally referenced measurements so as to both create an image of the feature and determine its size. For example, the left probe can be used to generate an image of the left side and top of the feature with respect to XYZ, as described above, while the right probe is coordinated so as to generate an image of the right side and top of the feature with respect to XYZ. A straightforward numerical computation performed on the two globally referenced measurement data sets can provide information about the size of the feature, e.g., its width at given values of Z.

Both transverse and longitudinal scans can be made using a caliper AFM. Any type of scanning path, including transverse and longitudinal scans, can be used to make either relatively referenced measurements or globally referenced measurements or a combination of globally and relatively referenced measurements.

A non-contact mode measurement can be made using a caliper AFM by coordinating the probes so that they each attempt to maintain a preset tip-sample distance, which may be called the fly height. This can be accomplished, for example, by sensing an interaction force (e.g., the van der Waals force) between the tip and the sample and using the sensed interaction to control the fly height.

The left and right caliper AFM probes can be coordinated so that they make either relatively or globally referenced measurements at approximately the same time, or at different times. If measurements are made at different times, then the resulting data sets can be recorded at the time they are generated and later combined to generate images and feature sizes.

Fixing at least one of the coordinates XYZ during scanning, and then incrementing that coordinate prior to executing a subsequent scan results in a type of scan called a raster scan. Fixing Y, for example, results in a transverse raster scan.

Calibration of a Caliper AFM

Figure 20:
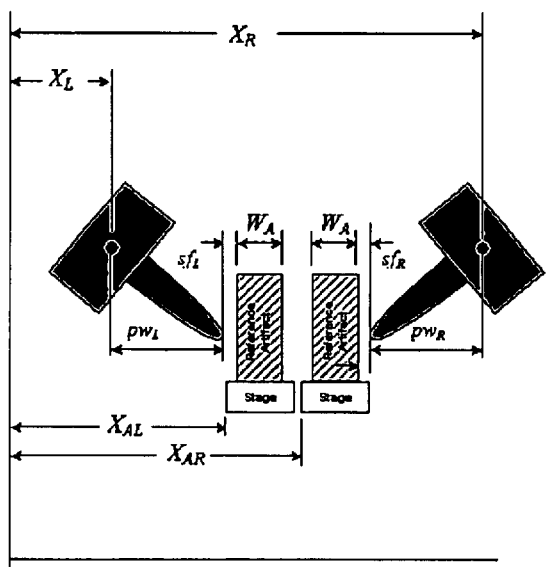
Figure 20:
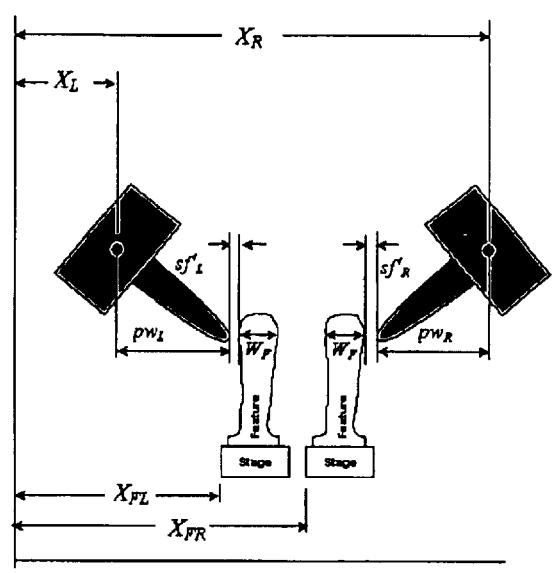

A caliper AFM can be calibrated using an artifact having a known dimension, as illustrated in FIG. 20 For example, a globally referenced image of the artifact (i.e., with respect to XYZ) can be generated by making measurements as the left probe scans the artifact. The known dimensions of the artifact can then be used to deconvolve the shape of the artifact from the measurement data. This results in a determination of the shape of the left probe tip. The $X_L Y_L Z_L$ coordinates of the arc comprising points near the left tip apex that contact the artifact can then be adjusted. A similar calibration procedure can be performed with the right probe tip.

Figure 21:
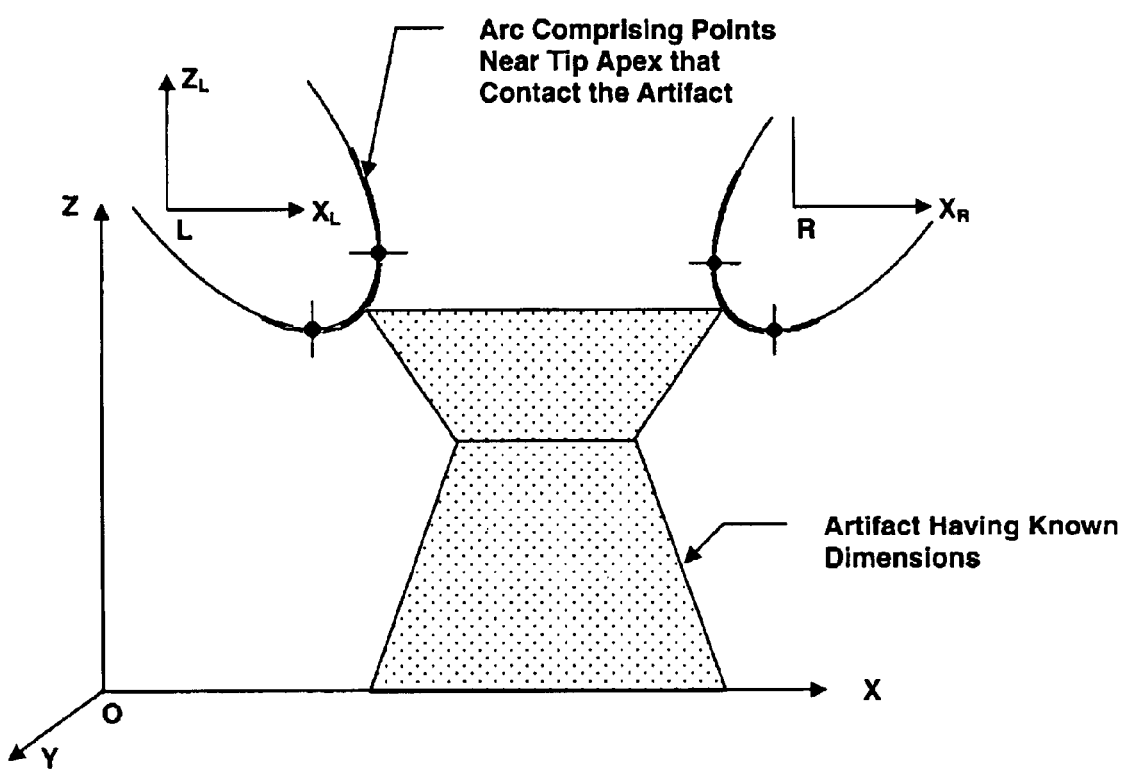
FIG. 21—Calibration of a caliper AFM using an artifact having known dimensions

Alternatively, a caliper AFM can be calibrated using, a relatively referenced measurement of an artifact (e.g., a measurement made with respect to $X_L Y_L Z_L$). The known dimensions of the artifact can then be used to establish a relationship between the $X_L Y_L Z_L$ coordinates of the arc comprising points on the left probe tip that contact the artifact and the $X_R Y_R Z_R$ coordinates of the arc comprising points on the right probe tip that contact the artifact, as illustrated in FIG. 21. A calibration using, a relatively referenced measurement of an artifact can be used to remove the effect of probe shape from relatively referenced measurement data so as to recover dimensions of a feature (e.g., its width).

Figure 22:
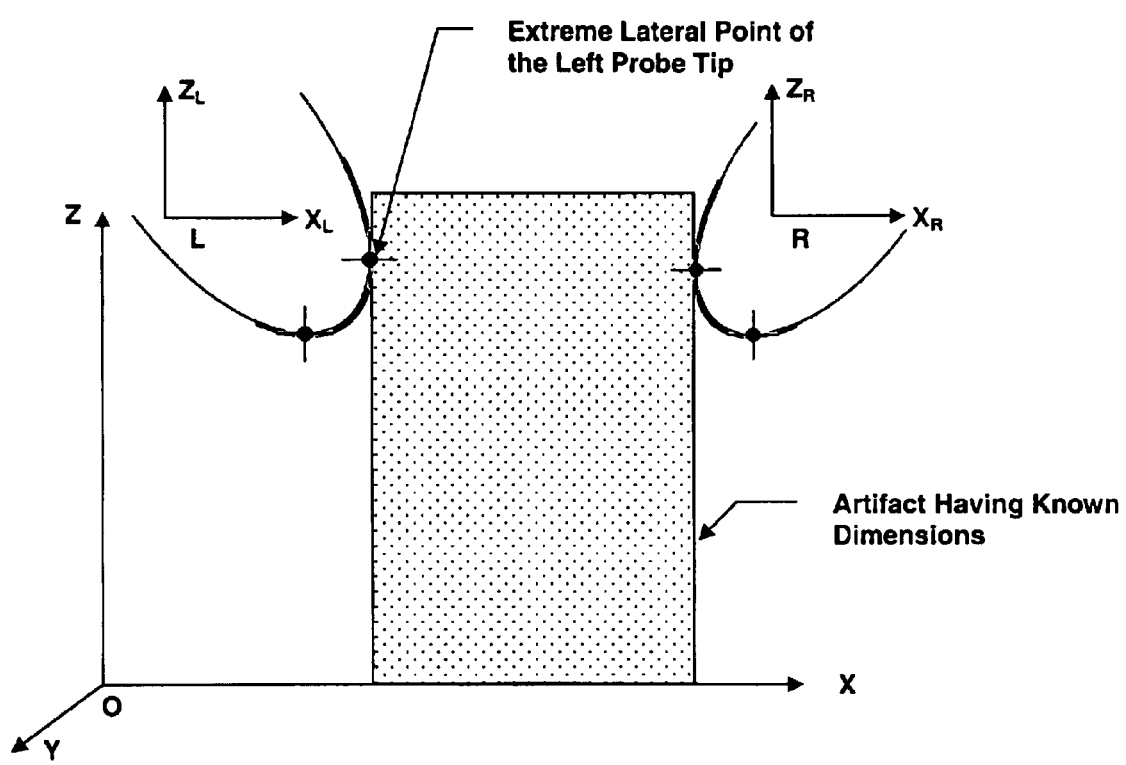
FIG. 22—Calibration of a caliper AFM using the lateral extreme points of the tips FIG. 23—Calibration of a caliper AFM using the vertical extreme vertical points of the tips FIG. 24—Non-contact mode calibration of a caliper AFM using an artifact having known dimensions FIG. 25—Example of calibration with extreme lateral points at a known tip-to-tip distance FIG. 26—Contact mode calibration of a caliper AFM FIG. 27—Example illustrating characterization of left tip by right tip.
Figure 23:
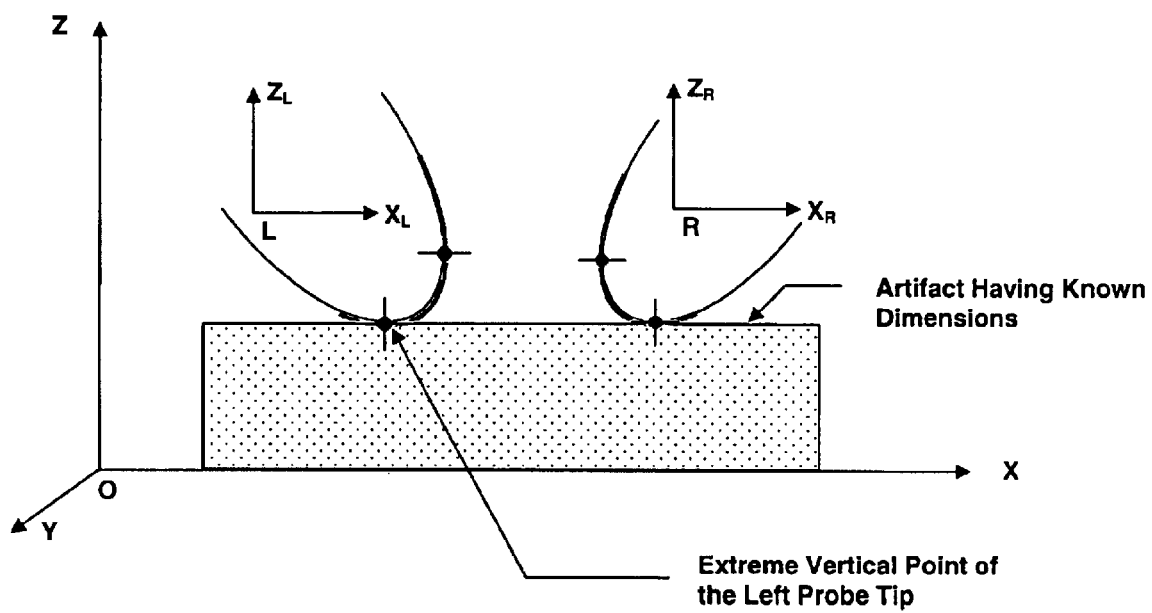

A caliper AFM can be calibrated using the lateral extreme points of the tips by using an artifact with vertical side walls, as illustrated in FIG. 22. Alternatively, A caliper AFM can be calibrated using the extreme vertical points of the tips by using an artifact with a horizontal surface, as illustrated in FIG. 23.

Figure 24:
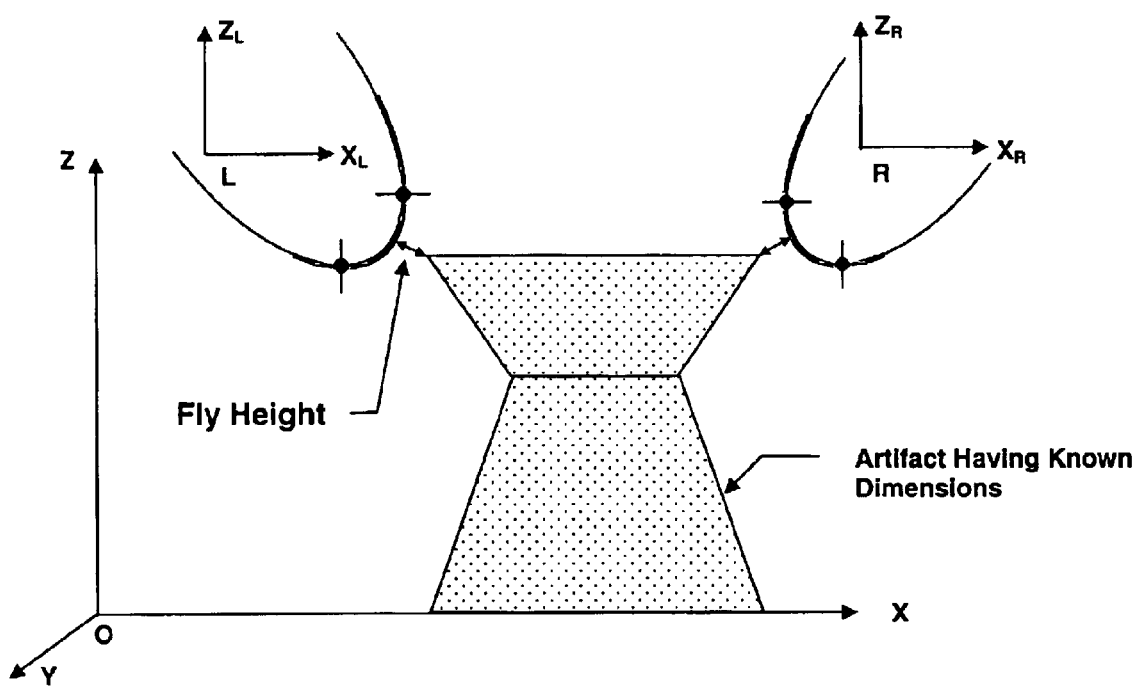

A caliper AFM can be calibrated using an artifact having a known dimension, while the tips are not in contact with the artifact, as illustrated in FIG. 24. The measurement of the artifact requires knowledge of the fly height associated with an interaction force (e.g., the van der Waals force) between the tip and the sample.

A caliper AFM can alternatively be calibrated using the lateral extreme points of the tips by using an artifact with vertical side walls, while the tips are not in contact with the artifact.

A caliper AFM can alternatively be calibrated using the vertical extreme points of the tips by using an artifact with a horizontal surface, while the tips are not in contact with the artifact.

Calibration of a Caliper AFM Using Tip-to-Tip Interaction

Figure 25:
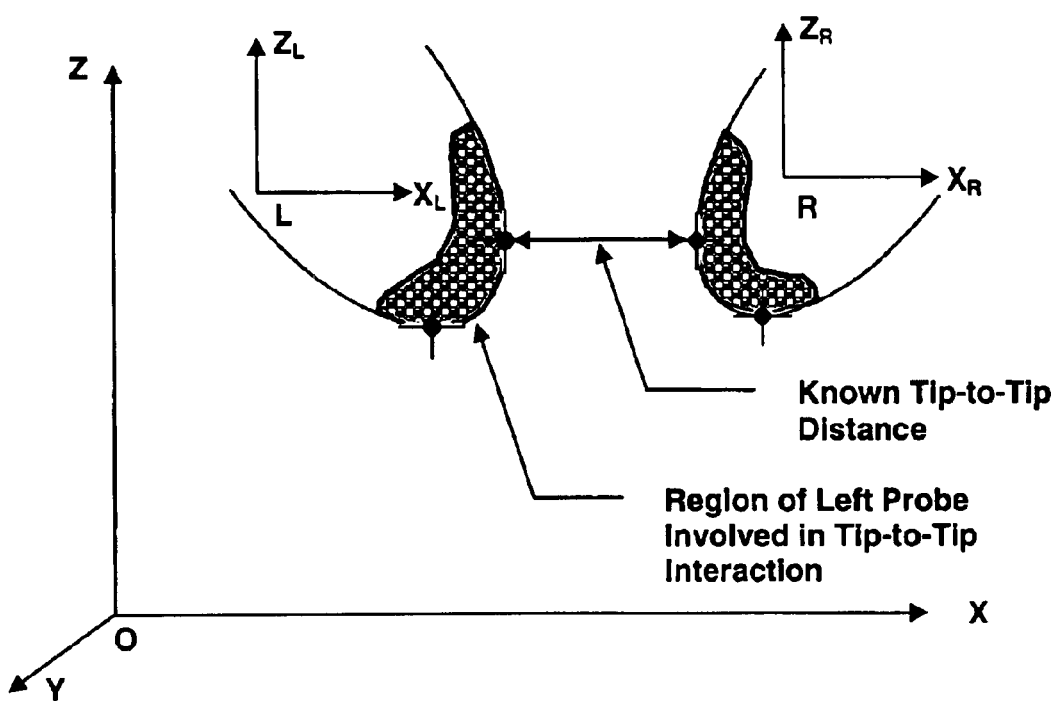

A caliper AFM can be calibrated by positioning the tips such that they are at a known tip-to-tip distance for which they have a known interaction, as illustrated in FIG. 25. The known tip-to-tip distance may, for example, be associated with a particular value of an interaction force (e.g., the van der Walls force) between the tips. A relatively referenced measurement is made of the known tip-to-tip distance (e.g., a measurement made with respect to $X_L Y_L Z_L$). The known tip-to-tip distance can then be used to establish a relationship between the $X_L Y_L Z_L$ coordinates of a region of the left probe tip that is involved in the tip-to-tip interaction and the $X_R Y_R Z_R$ coordinates of region of the right probe tip that is involved in the tip-to-tip interaction. A calibration using, a known tip-to-tip distance for which the tips have a known interaction can be used to remove the effect of probe shape from relatively referenced measurement data so as to recover dimensions of a feature (e.g., its width).

Figure 26:
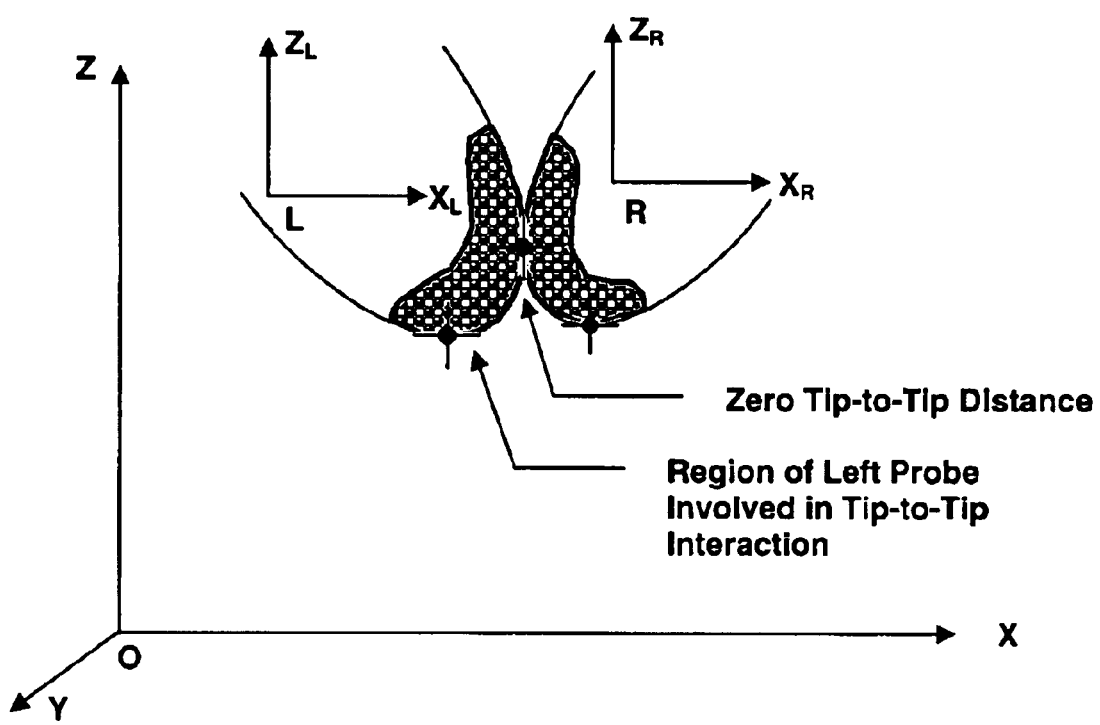

A caliper AFM can be calibrated by positioning the tips such that their extreme lateral points are at a known tip-to-tip distance for which they have an known interaction; and measuring a measured interaction of the extreme lateral points of the tips. This type of calibration can occur for a situation in which the tips are coordinated so as to make the tip-to-tip distance between the extreme lateral points zero. This can be accomplished, for example, by operating the tips with respect to each other in contact mode, as illustrated in FIG. 26. Alternatively, the tip-to-tip distance between the extreme lateral points may be a known non-zero value.

Figure 27:
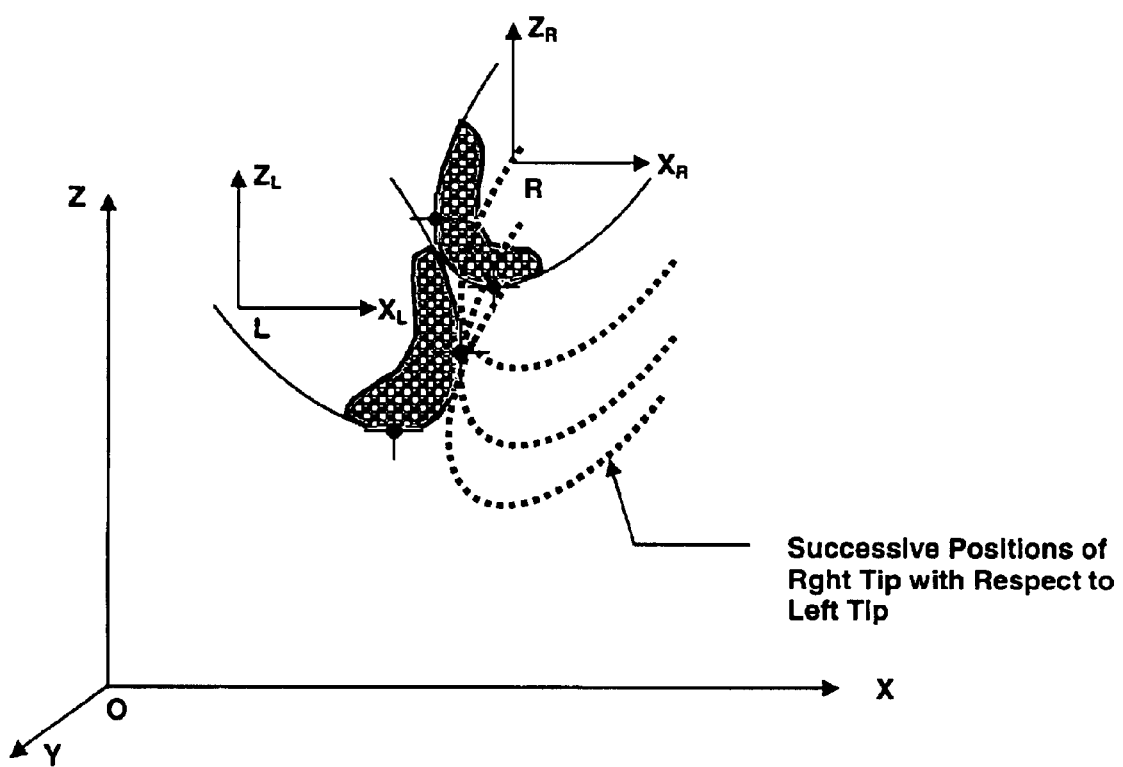
Figure 28:
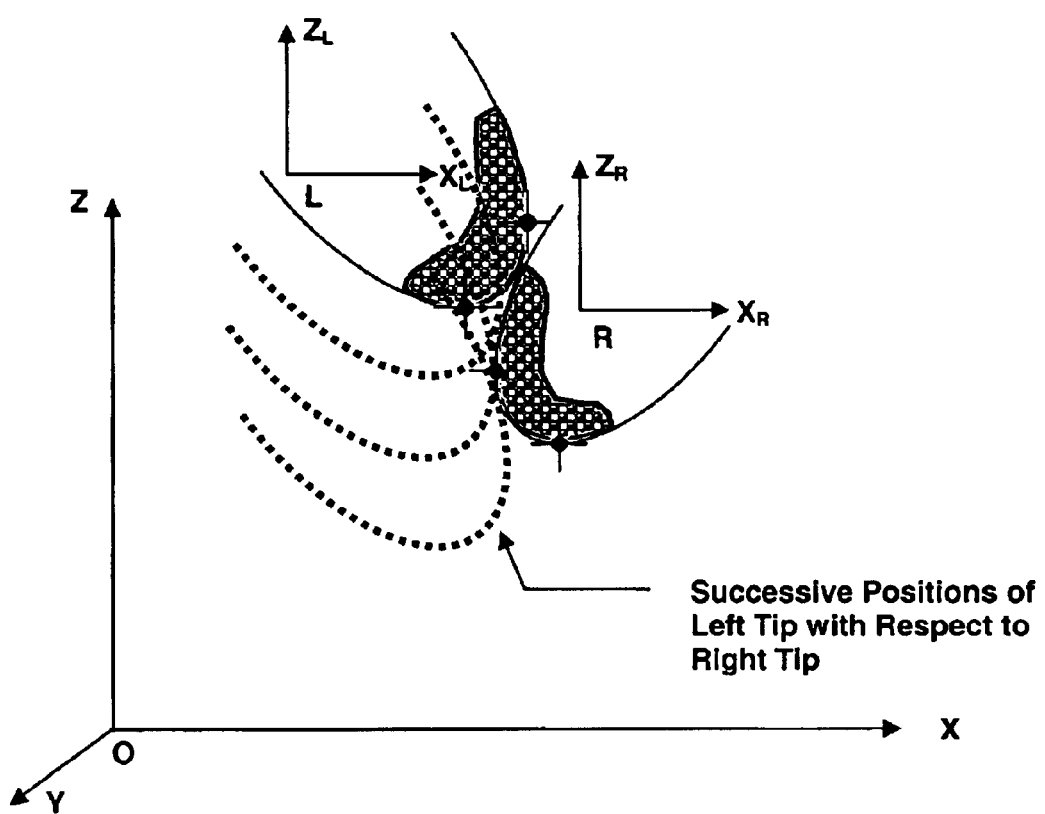
FIG. 28—Example illustrating characterization of right tip by left tip.

A caliper AFM can be calibrated by characterizing each apex with the other apex. This can be accomplished, for example, by fixing the left tip with respect to XYZ and making a relatively referenced measurement by scanning the right tip over the left tip, as illustrated in FIG. 27. A contact mode scan can be used to scan each apex with the other apex. Alternatively, a non-contact mode scan can be used if a there is a known tip-to-tip distance, for example, the fly height associated with a particular value of an interaction force (e.g., the van der Waals force) between the tips. Alternatively, the left tip can be used to characterize the right tip, as illustrated in FIG. 28. In lieu of fixing either tip with respect to XYZ, both tips can be scanned with respect to each other to generate a relatively referenced data set. Once obtained, the relatively referenced data set resulting from characterizing each tip with the other tip apex can then be used to establish a relationship between the $X_L Y_L Z_L$ coordinates of the region of the left probe tip that is involved in the tip-to-tip interaction and the $X_R Y_R Z_R$ coordinates of region of the right probe tip that is involved in the tip-to-tip interaction. This relationship can be used to remove the effect of probe shape from relatively referenced measurement data so as to recover dimensions of a feature (e.g., its width).

In-Line Calibration of a Caliper AFM

Calibration of a caliper AFM can be performed repeatedly before, during and after measurements are made with the caliper AFM. Calibration methods, such as a tip-to-tip calibration method, that do not require use of an artifact, are available with a caliper AFM and are particularly useful when there is a need to perform in-line calibration during a production process. For example, the presence of tip wear may cause excessive error buildup while a sequence of feature measurements are being made to control production. Calibration steps performed between measurements can reveal the presence of such error build up. Also, the size of the required calibration adjustments can be monitored and this observed trend can be used to increase (or decrease) the frequency of calibration. Alternatively, repeated calibrations with an artifact can be made between measurements.

Traceable Calibration of a Caliper AFM

Traceable calibration of a caliper AFM can be accomplished by (1) making a measurement for which the result is known in a way that can be traced to an absolute dimensional standard, such as, for example, a wavelength of light, or a number of crystal lattice intervals and (2) adjusting the scale of the caliper AFM so that its reading corresponds to the known, traceable dimension.

Traceable Measurement Using a Caliper AFM

One way to arrive a traceable measurement of feature size is to first traceably calibrate the caliper AFM, and then generate two data sets associated with the left and right AFM probes as relative coordinates of each tip with respect to the other. In making these measurements, the positioning of each probe must be traceable. This can be accomplished by using a sensor to ascertain the probe positions that is, itself, calibrated over the required range in a traceable manner. In this case, both data sets contain the same information. The extent of the feature is provided directly by the data set. Another way is to make a traceable measurement is to first traceably calibrate the caliper AFM, then generate two data sets as absolute coordinates of each tip with respect to the tool frame, and finally take the difference between recorded values so as to derive the extent of the feature. In making these measurements, the positioning of each probe must be traceable. This second way generates both the image of the feature (i.e., its shape with respect to a tool-fixed frame) and its extent.

Roughness Measurement

Figure 29:
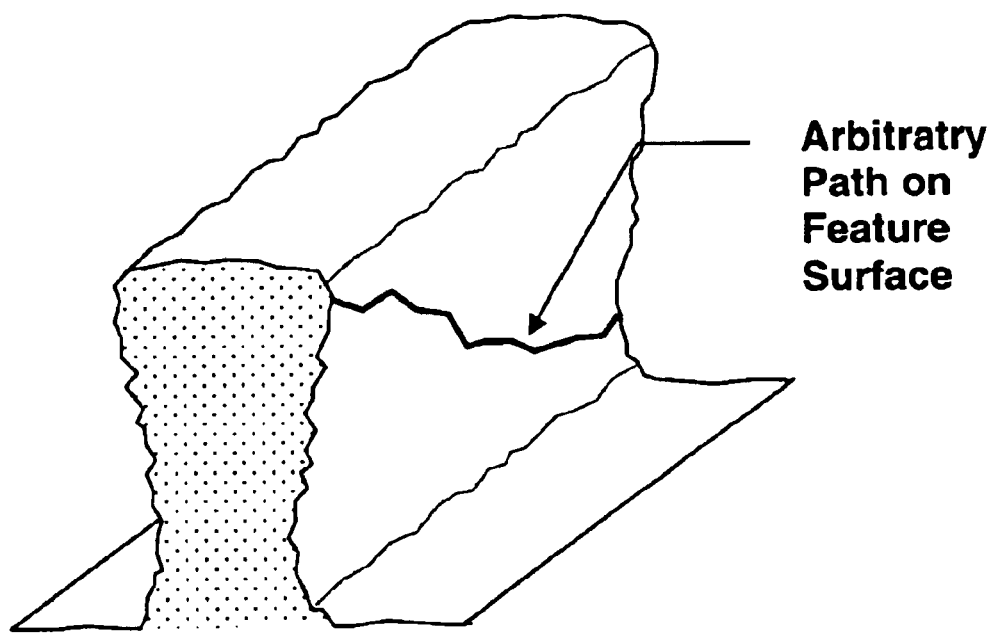
FIG. 29—Line roughness (LR) measurement along an arbitrary path on the surface of a feature FIG. 30—Sidewall roughness (SWR) measurement made in a region of interest on the feature surface FIG. 31—Line roughness measurements made to determine linewidth roughness FIG. 32—Line edge roughness (LER) measurement made along a path that traverses the edge of a feature FIG. 33—Three-dimensional linewidth roughness (3DLWR) measurement
Figure 30:
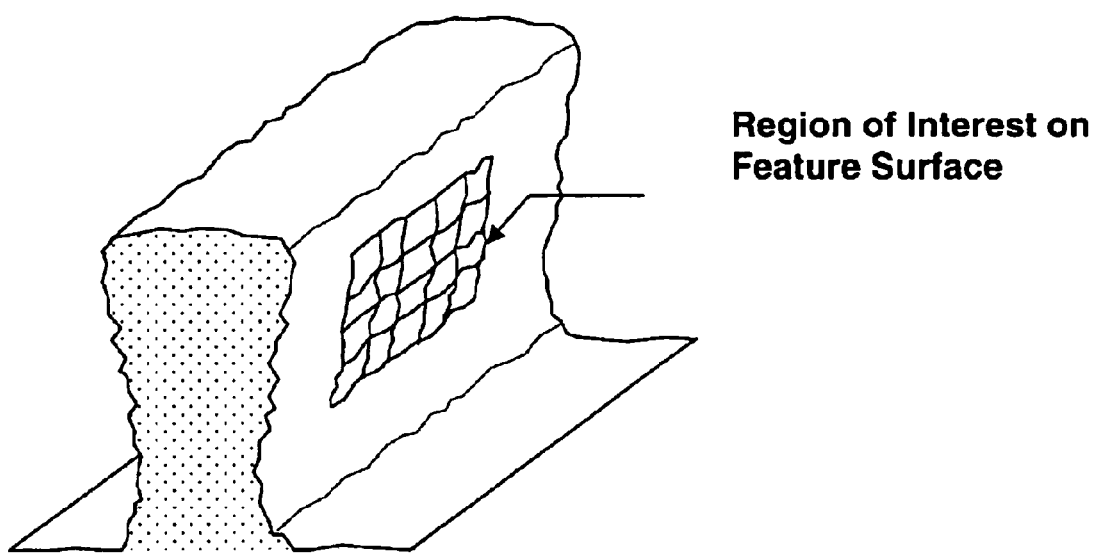
Figure 31:
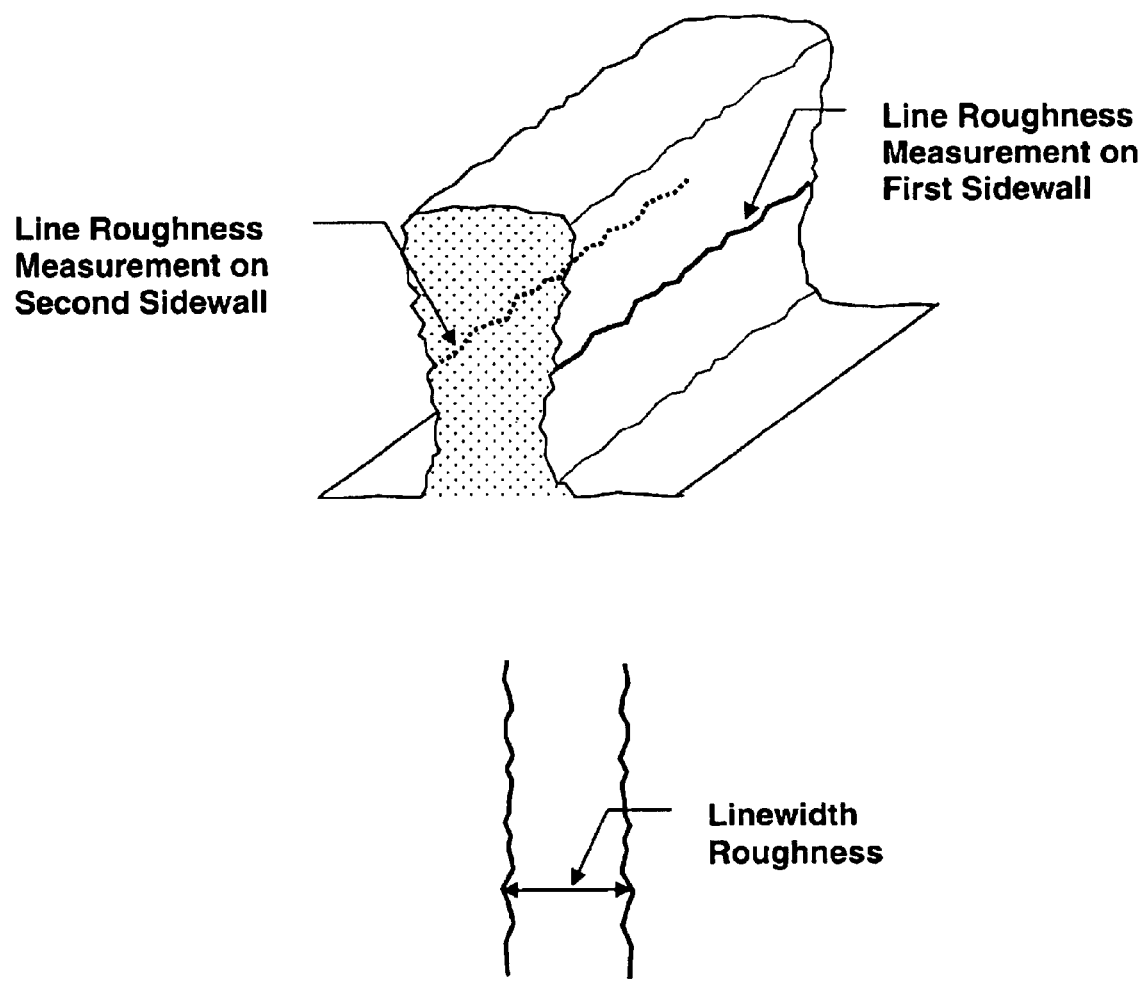
Figure 32:
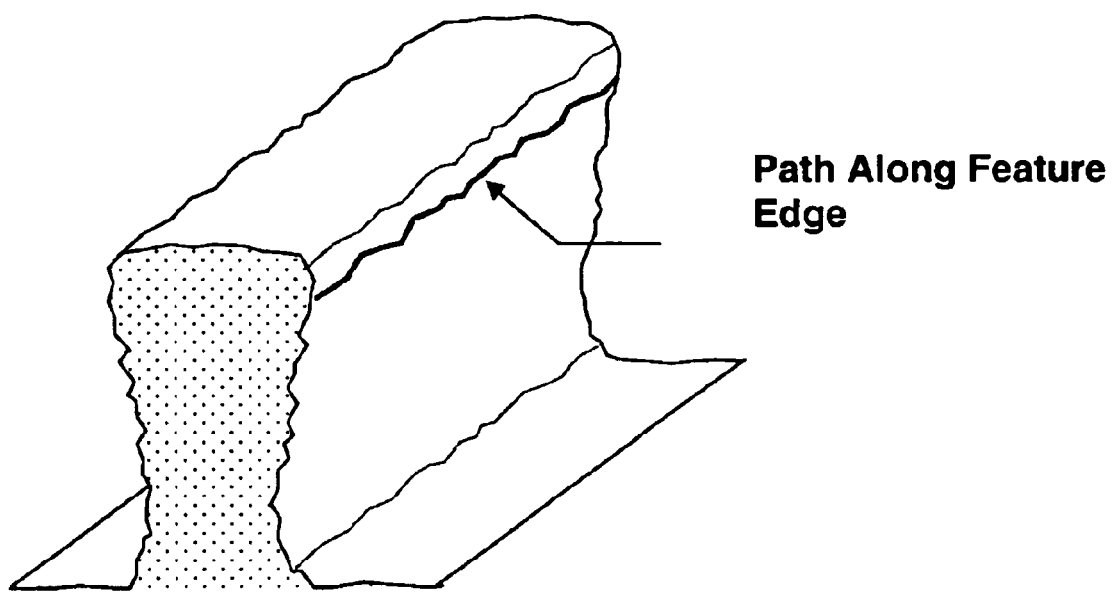

The points included in a line roughness (LR) measurement on an arbitrary path along which the measurement is taken contain information about the roughness of the feature on the path, as illustrated in FIGS. 29–31. The path along the edge of the feature is defined by the projection of the feature onto a horizontal plane, as illustrated in FIG. 32 It represents the edge of the feature as it would appear in a top-down image.

Figure 33:
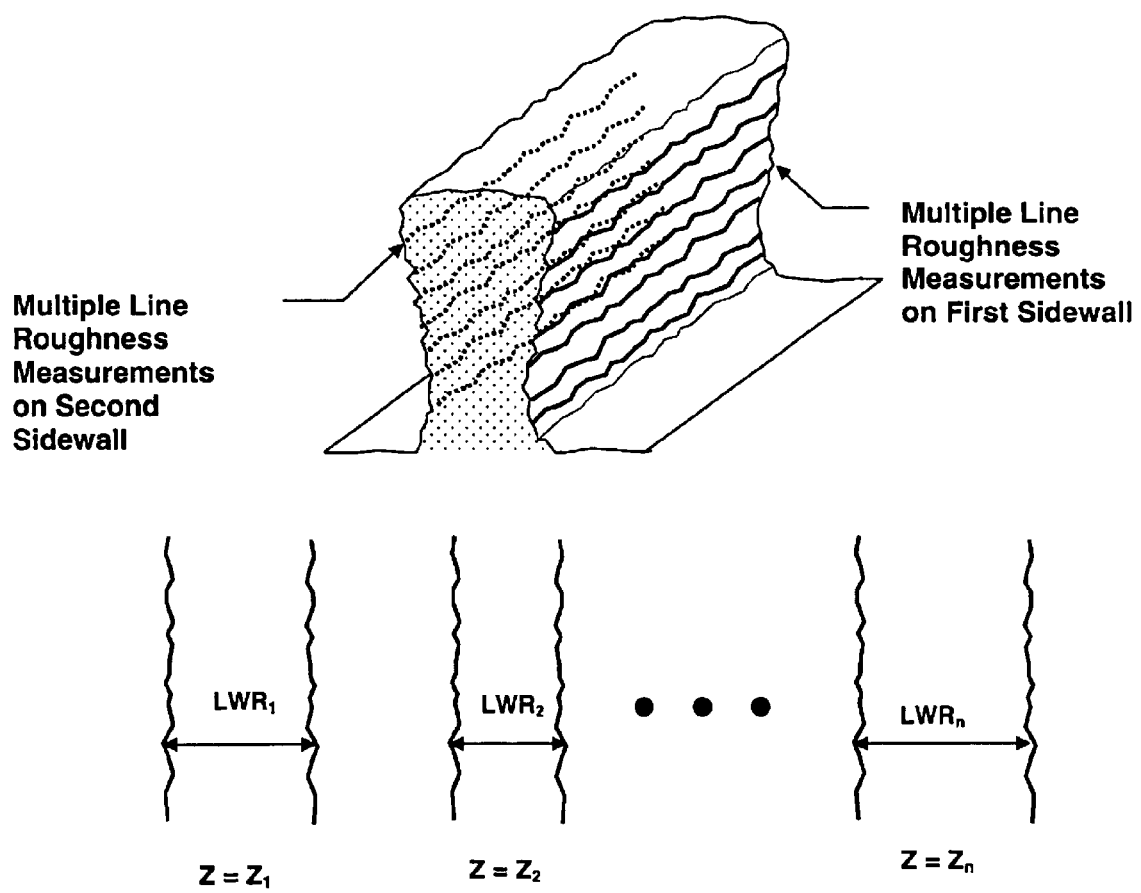

A three dimensional linewidth roughness (3DLWR) measurement is made by making multiple line roughness (LR) measurements. Multiple linewidth roughness (LWR) measurements are determined from corresponding pairs of LR measurements made at different heights, Z, as illustrated in FIG. 33. The multiple LWR measurements, taken together, comprise the three dimensional linewidth roughness.

Figure 34:
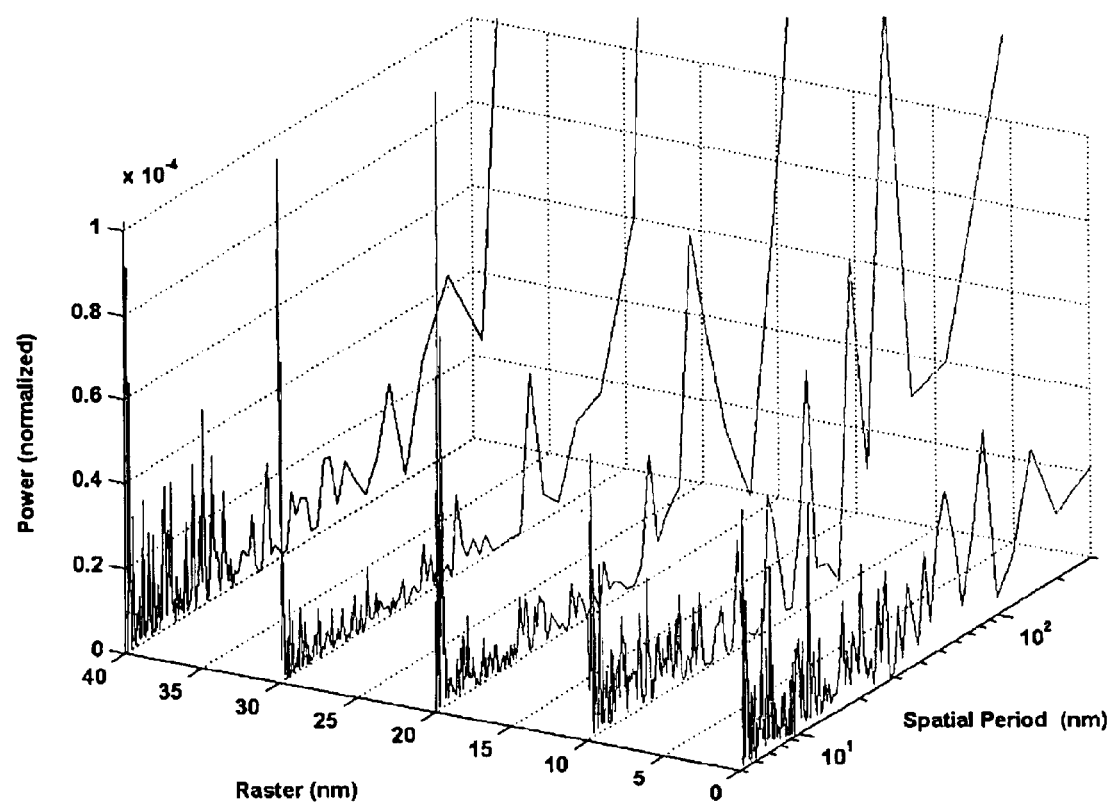
FIG. 34 shows a spatial spectrum of probe data, in accordance with an embodiment of the present invention.

Fourier transformation of LR data can be used to derive a line roughness spectrum S, which can be expressed in terms of spatial period, as illustrated in FIG. 34. Typically, sharpness of the probe tip and the dynamic range of the AFM control system limit the ability to measure line roughness spectrum at small spatial periods. The overall length of the path used to generate the LR data limits the ability to measure line roughness spectrum at large spatial periods. A similar analysis performed on LWR data instead of LR data can be used to derive a linewidth roughness spectrum (LWRS).

Scanned Stage Embodiment of Caliper AFM

In another embodiment of the dual-probe caliper AFM architecture, called the scanned-stage embodiment, the dual probes are fixed with respect to the tool frame and the stage carrying the feature is scanned in X and Z. The positions and orientations of the probes are adjustable prior to scanning. Adjustment can also occur during scanning, for example, to clear a feature bottom while the other probe is scanning it.

Figure 35:
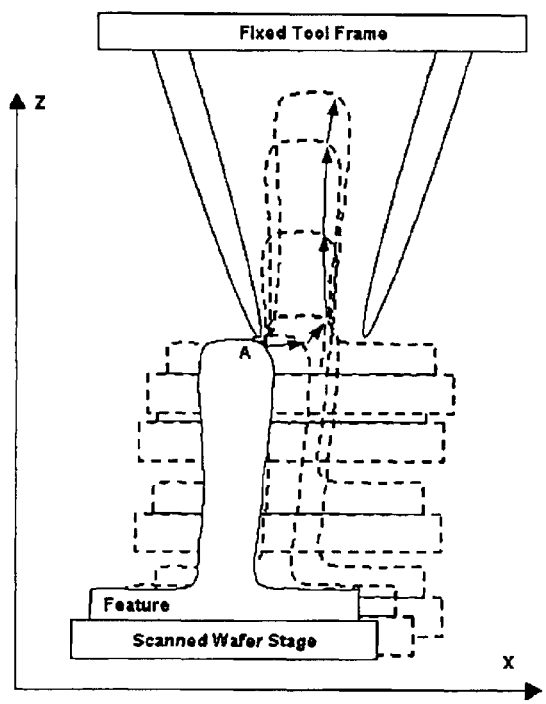
FIGS. 35-A and 35-B show the position of the test sample as it is scanned by a caliper AFM with stationary probes and scanned test sample, in accordance with an embodiment of the present invention.
Figure 35:
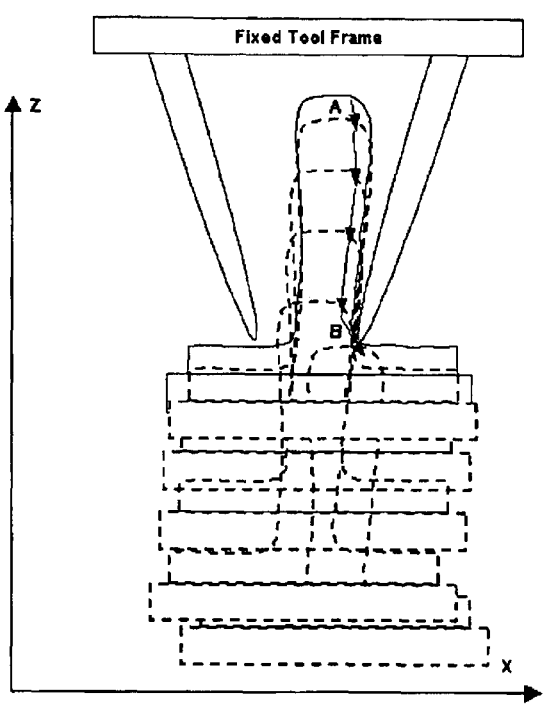

The feature first encounters the left probe at the top of the feature, as illustrated in FIG. 35-A. The left probe scans along the top of the feature as the stage is translated in X and then along its left side, as the stage is raised in Z. The left probe eventually reaches the trench at the left side of the feature. The stage is then traversed in X until the right probe first encounters the feature at the trench on its side of the feature, as illustrated in FIG. 35-B. The right probe then scans along the right side of the feature, as the stage is lowered in Z. The tilt of the probes enables them to access vertical and reentrant sidewalls. The feedback controller allows handoff between scanning of the left and right tips.

The scanned-stage embodiment, by the nature of its operation, removes the contribution of the probe width from of the line width measurement. The stage travel $(X_{AR}-X_{AL})$ is first measured as the distance between stage positions at which the left and right sides of a reference artifact encounter the left and right probes, respectively. The reference artifact is assumed to have a known width, $W_A$. The stage travel $(X_{AR}-X_{AL})$ in the case of the reference artifact measurement is given by $$(X_{AR}-X_{AL})=(X_R-pw_R-sf_R-W_A)-(X_L+pw_L+sf_L)$$

$$(X_{AR}-X_{AL})=(X_R-X_L)-(pw_R+pw_L)-(sf_R+sf_L)-W_A$$

$$(X_{AR}-X_{AL})=(X_R-X_L)-pw-(sf_R+sf_L)-W_A \quad (2)$$

A feature is then scanned using the dual probe AFM. The width, $W_F$, of the feature is given by:

$$W_F=(X_R-pw_R-sf'_R)-(X_{FR}-X_{FL})-(X_L+pw_L+sf'_L)$$

$$W_F=(X_R-X_L)-pw-(sf'_R+sf'_L)-(X_{FR}-X_{FL}) \quad (3)$$

where pw is effectively the probe width and $sf'_R$ and $sf'_L$ represent tip-surface distance contributions that may possibly vary from scan to scan, e.g., if non-contact scanning mode is used.

The terms $(X_R-X_L)$–pw are eliminated by substituting the stage traverse measurement, Equation (2) made using the reference artifact. This gives $$W_F=(X_{AR}-X_{AL})+(sf_R+sf_L)+W_A-(sf'_R+sf'_L)-(X_{FR}-X_{FL})$$

$$W_F=(X_{AR}-X_{AL})+[(sf_R+sf_L)-(sf'_R+sf'_L)]-(X_{FR}-X_{FL})+W_A \quad (4)$$

This procedure entirely eliminates the effective probe-width pw=$(pw_R+pw_L)$ of the dual tip AFM. It leaves only the residual difference in respective tip-surface offset distances, $[(sf_R+sf_L)-(sf'_R+sf'_L)]$, instead of the involving full magnitude tip-surface offset in the measurement, as in the case of the conventional single-tip technique.

The effective probe width of the scanned-stage embodiment is essentially absorbed into the left-right stage traverse determined while measuring a reference artifact. This embodiment therefore relies on the dimensional stability of the reference artifact for the integrity of critical dimension measurements, instead of relying on the characterized shape of a single-probe tip uses with a conventional AFM, which may possibly wear or become damaged during use.

Figure 36:
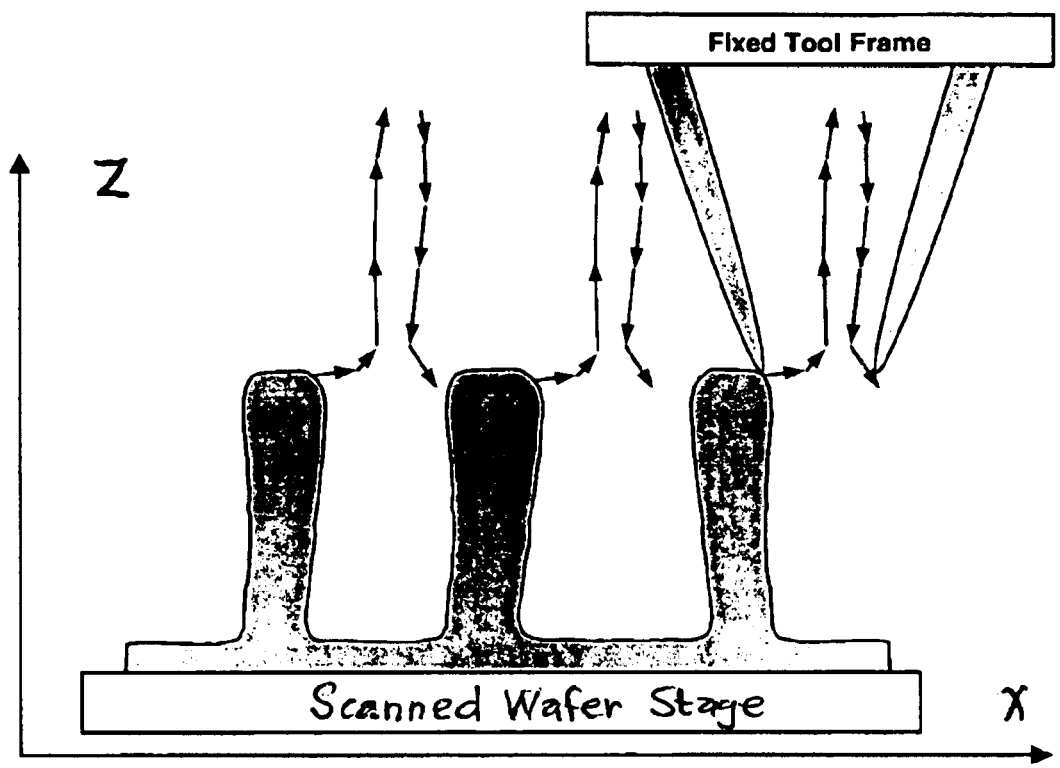
FIG. 36 shows the scanned path of the caliper AFM with stationary probes and scanned test sample, in accordance with an embodiment of the present invention.

The scanned-stage embodiment is useful for measuring both isolated and nested features. In general, nested features may have different widths, different sidewall shapes and even different pitch (feature-to-feature spacing), as illustrated in FIG. 36. Nested features can be scanned using a method that repeats the steps for scanning an isolated line. The left probe first encounters a point on the rightmost feature. The stage scans in X and Z so as to image the feature top and left sidewall. The scan controller then executes handoff to the right probe, and scans the right sidewall. The stage is then moved in X so as to clear the first feature and bring the left probe into contact with the second feature. The scanning process then repeats for subsequent features.

Unlike imaging of isolated lines, imaging of dense lines is quite intolerant of changes in tilt angle. For given feature geometries and given pitch there will be a constrained set of probe tilts which will allow both probes to access the trenches and the sidewalls of dense features. If the tilt angle is too small, the probe will not be able to access the sidewalls of reentrant features. Excessive tip tilt will crash the tip into adjacent features. The required tip tilt depends on the feature width and pitch of the features, on their aspect ratio, and the sharpness of the tip is to introduce a system with three tilts to enable the required dual-tilted-probe positioning. Rotating each probe around its long axis ["Tilt 1"] enables access to the feature sidewalls. Clearance with respect to the sample is required to avoid crashing of the probe's edges into the sample. The width of the probe and its mounting structure, together with tip length, control the degree of Tilt 1. Lowering of the oscillator tip down with respect to its base ["Tilt 2"] provides clearance for the probe mounting structure. Pivoting each probe around its tip axis ["Tilt 3"] and pivoting their mounting structures away from each other, together with beveling of the ends of the probe structure allows for side-to-side proximity without crashing the edges of the probes with respect to each other.

Multiple-Head Embodiment of Caliper AFM

Figure 37:
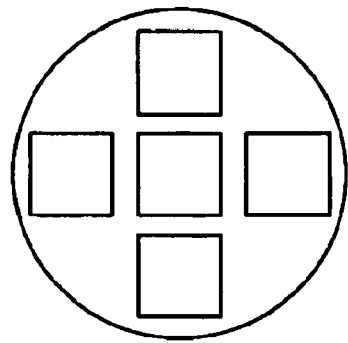
FIGS. 37-A and 37-B show two possible layouts for multiple-head caliper AFM systems, in accordance with an embodiment of the present invention.
Figure 37:
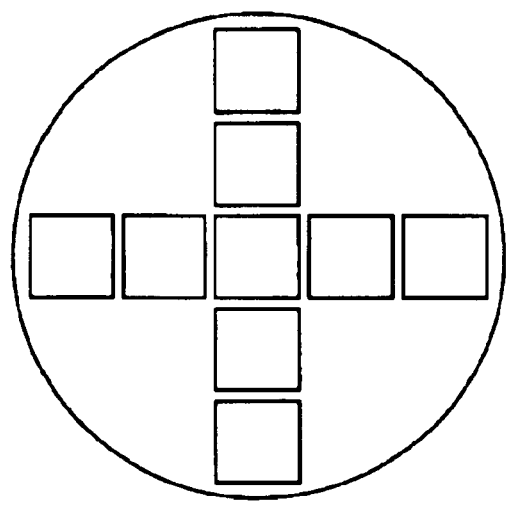

Another embodiment of the dual-probe caliper AFM architecture, called the multiple-head embodiment, uses multiple scanned-head caliper AFMs, as illustrated in FIGS. 37-A and 37-B. This embodiment has the advantage of achieving high throughput and increased sampling speed by enabling multiple measurement sites to be scanned simultaneously. Multiple heads can be made modular and re-positionable to accommodate arbitrarily placed measurement sites and different production process control requirements, which may call for sampling different numbers of sites. Having multiple heads available provides the flexibility to specify more, or fewer, measurement sites per wafer as process statistics change.

Quate et. al. have demonstrated feasibility of an array of AFM probes for imaging and scanning probe lithography. Unfortunately, this concept does not work for critical dimension measurements. This is because the probes do not have any lateral force sensitivity, and because they are unable to access vertical and reentrant sidewalls. The multiple-head embodiment of the present invention multiplexes dual-probe caliper AFMs with respect to entire measurement sites, rather than attempting to multiplex individual probes within a multiprobe array. This makes all of the advantages of the caliper AFM available at each site.

Using the scanned-head embodiment of the caliper AFM rather than the scanned-stage embodiment enables the tips of different caliper AFM heads to move in either the same direction or in opposing directions as necessary to accommodate simultaneous scanning of freatures at different locations.

A need for compactness stems from the requirement to fit multiple caliper AFM heads within a confined region adjacent to the sample. For example, 5 to 10 caliper AFM heads may be required to fit within the footprint of a single wafer.

This requirement for compactness imposes a limitation on the size of the caliper AFM head. For example each caliper AFM head may to be no more than about 2 in on a side. A side view illustrates a caliper AFM head designed to achieve the required compactness.

MEMS Embodiment of Caliper AFM

An alternative embodiment implements the caliper AFM using a microelectromechanical system (MEMS) design. For this embodiment, the two probes (the oscillator and the tips) together with the sensing and actuating systems are integrated and significantly reduced in size. In addition, the macro stages that are used to rotate the two probes with respect to each other are not needed with a MEMS caliper AFM. The integration, scaling, and the removal of macro stages make this MEMS caliper AFM less complex and less expensive to produce in mass quantities and more robust and reliable and more suitable for mass production. One application of the MEMS caliper AFM design is for critical dimension (CD) measurements.

The architecture of the MEMS caliper AFM of this embodiment includes two AFM oscillators microfabricated next to each other on a same chip with few microns of clearance to allow the oscillators to move with respect to each other in XYZ. The oscillators can be designed to be parallel to each other or to be pointed towards each other's end.

Figure 38:
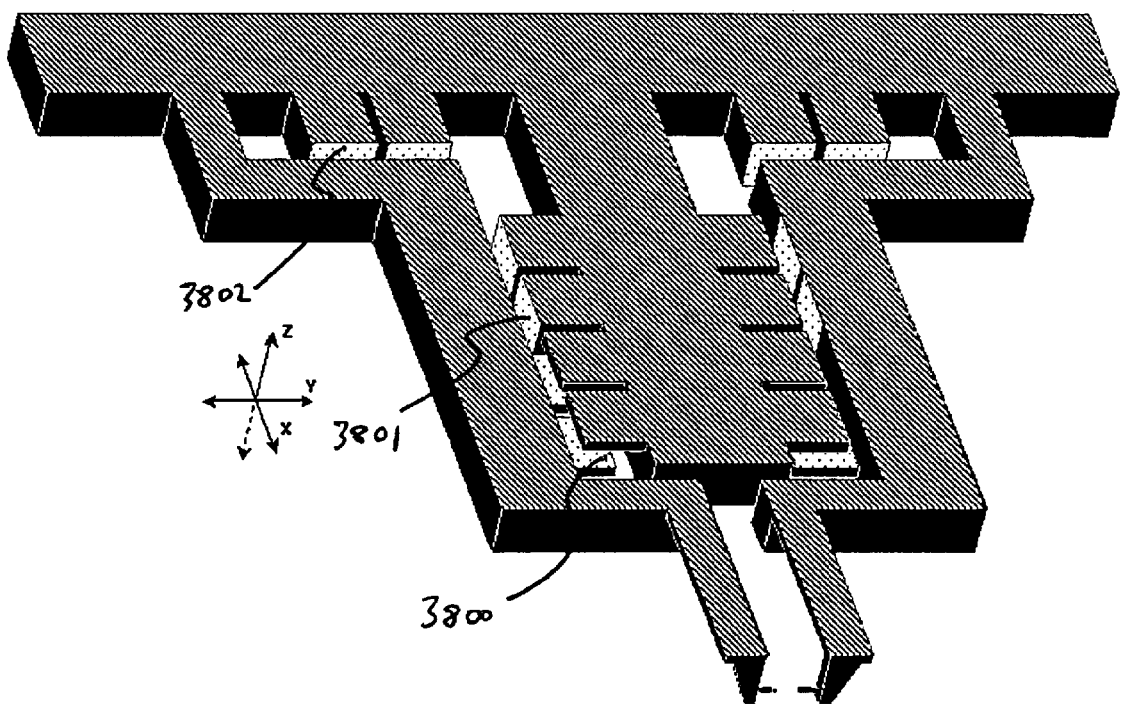
FIG. 38 shows a MEMS caliper embodiment of the present invention.
Figure 39:
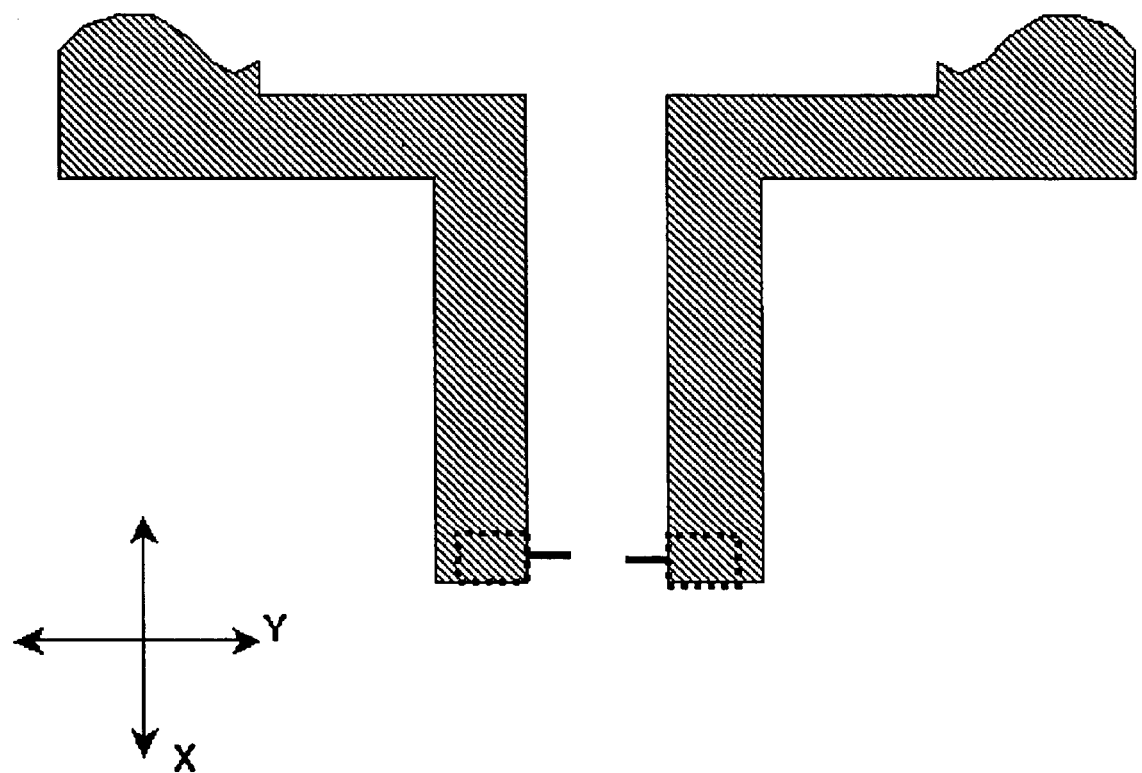
FIG. 39 shows a top view of MEMS cantilevers with probe tip structures attached
Figure 40:
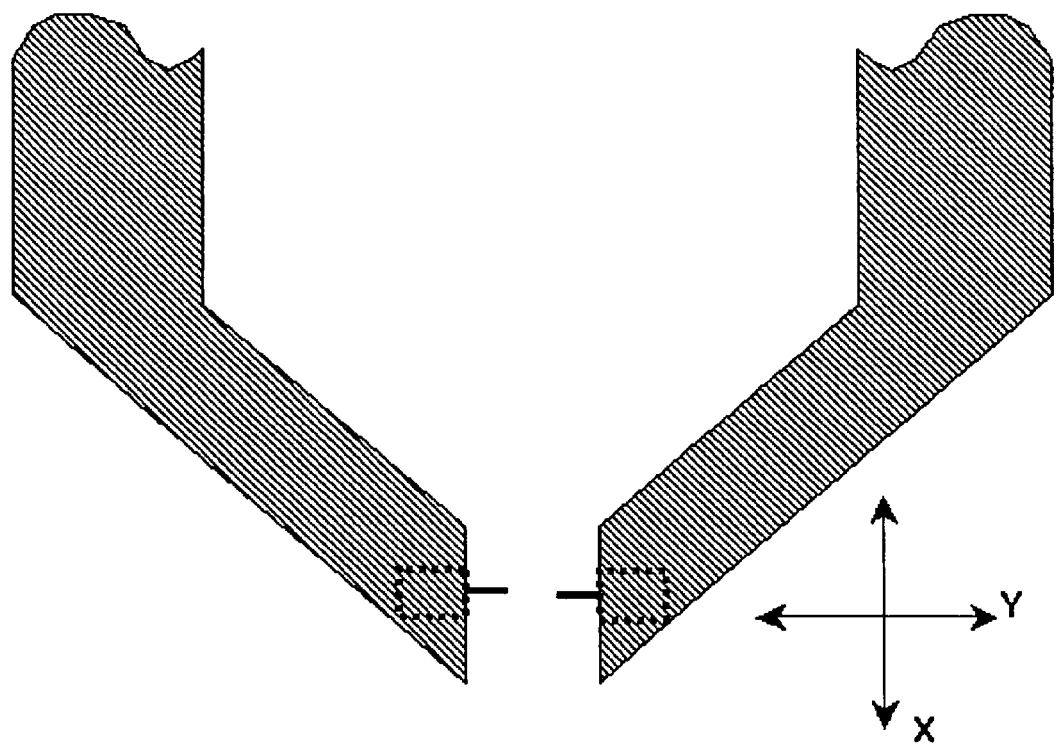
FIG. 40 shows a top view of MEMS slanted cantilevers with probe tip structures attached
Figure 41:
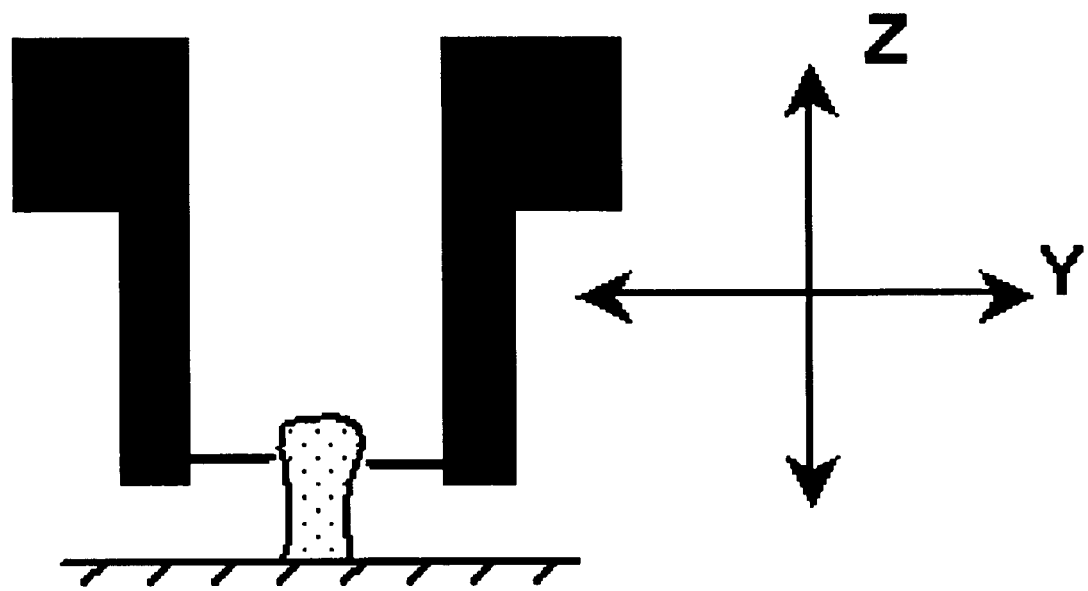
FIG. 41 shows an end view of MEMS probe tip structures with carbon nanotubes attached
Figure 42:
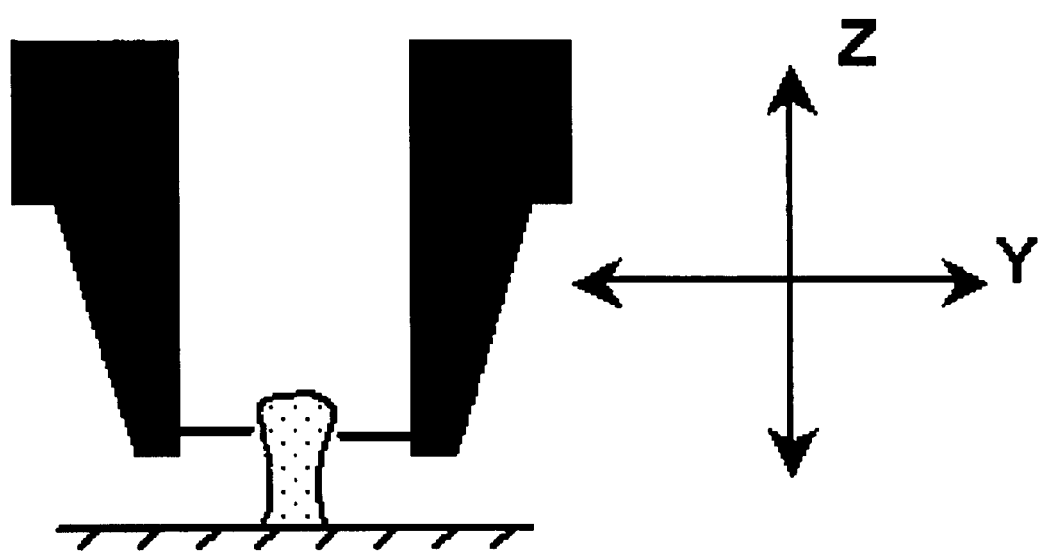
FIG. 42 shows an end view of MEMS probe tip structures with tips mounted near inner sides of cantilevers

An integrated sensing and actuation system is used in another embodiment of the MEMS caliper AFM design, as illustrated in FIG. 38. One possible sensor and actuator design is an electrostatic sensor and an actuator. In one example, a comb drive type (an array of parallel plate capacitors, 3800, 3801, 3802) sensor and actuator can be utilized. In this design a movable arm comb structure engages the fixed comb structure on each side of the fixed structure. The arm structure is attached to the substrate via flexible links that allow three degrees of freedom XYZ displacement. The caliper oscillators extend from the arm structure. The comb actuator is capable of vibrating the two oscillators at their resonant frequencies (multi resonances for each oscillator) and moving the arm in XYZ directions via electrostatic actuation. A separate comb structure or simpler plate capacitor may be implemented as a readout sensor for the vibration of the oscillators and the DC displacement of the oscillators during scanning. Alternatively, the sample may be scanned with a combination of a macro stage that carries the sample.

The above described electrostatic actuator and sensor system may be utilized in any other applications where sensing and actuating in 3-D are required. With some minimal electronic control logic the pitch and tilt degrees of freedom may also be achieved with the same electrostatic actuator and sensor system.

A suitable flex link for the arm structure is an L-bracket connected to the substrate at one end and connected to the arm structure on the other end. The fabrication process will produce a single piece of structure that includes the substrate, the flex link, the arm, the oscillator, and the tips. The L-bracket allows displacement in XYZ by flexing in the given direction.

To function as a caliper, the tips of the MEMS caliper AFM may be able to touch each other's apexes. There are several designs that may achieve this function. These tip designs are also applicable as a single tip AFM and as a macro AFM. In one preference each MEMS oscillator has a vertical tip from which end a horizontal tip is fabricated as illustrated in FIGS. 39–42. In one tip design, the vertical tip can be a cylindrical tip, or sharp conical or sharp pyramidal tip, and the horizontal tip can be a horizontally protruding nanotube. Preferably, the nanotube is a carbon nanotube. Preferably, the horizontal carbon nanotube tip is grown directly on the vertical tip. In this tip design, the horizontal tips need to be long enough to touch each other before the edges of the two oscillators collide with each other. For this reason, it is desired that the vertical tip be fabricated as close as possible to the side of the oscillator proximate to the other oscillator. To minimize the horizontal tip-to-tip distance it is desired that the inner sides of the tips (one looking towards the other tip) be vertical whereas the outer side of the tips can have any shape as required by the process.

Figure 43:
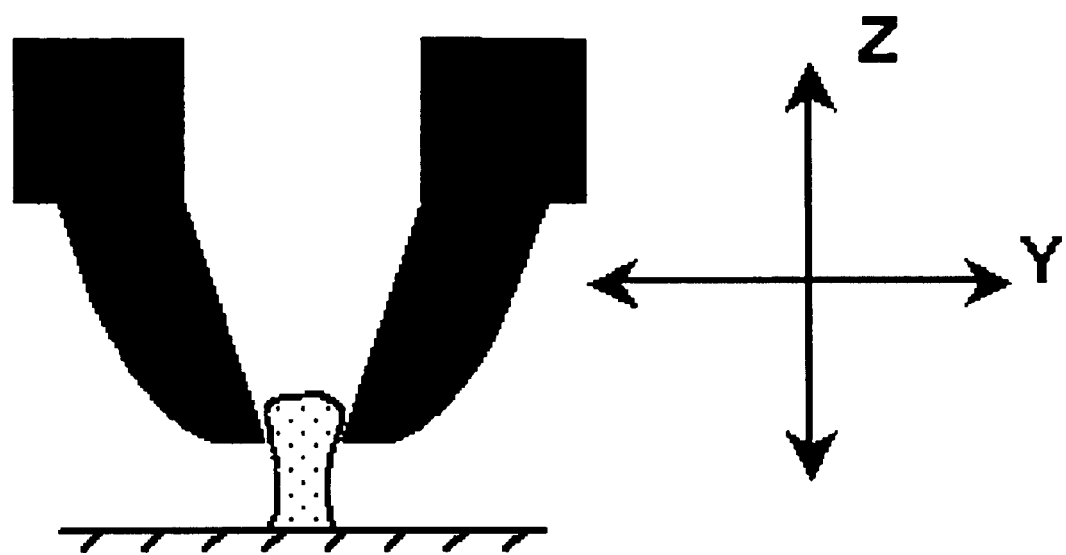
FIG. 43 shows an end view of MEMS probe tip structures slanted inward to facilitate imaging of a feature

A further alternative tip is one where the inner side is tilted so that the apexes are the closest points between the two tips and the roots of the top (opposite of the apex) are further apart, as illustrated in FIG. 43. With this tilted tip design there is not necessarily a need for horizontal tips since the tilted tip includes the vertical and the horizontal attributes of the tip.

Figure 44:
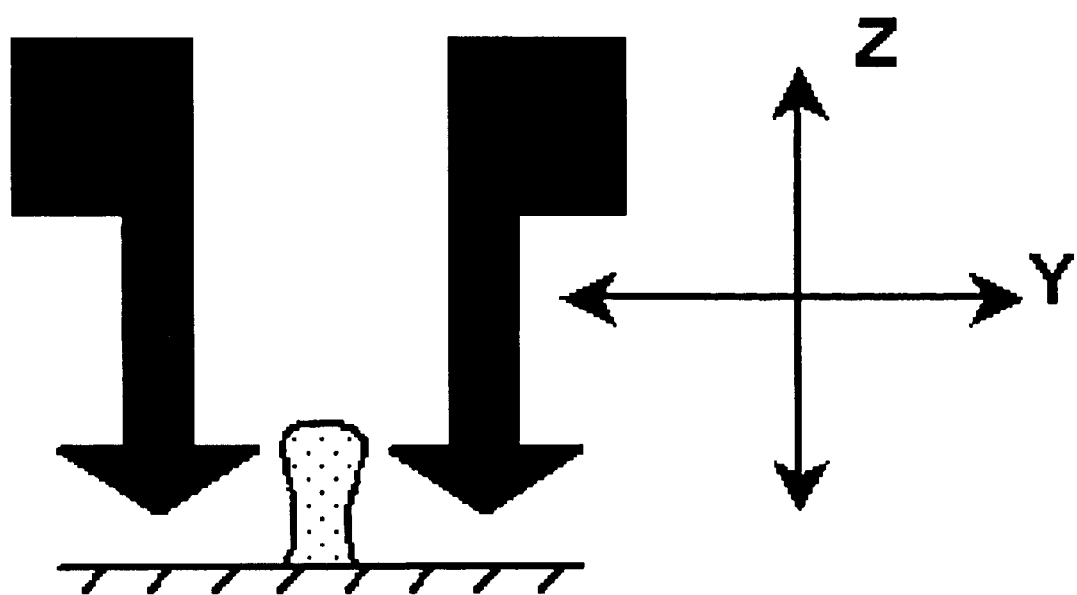
FIG. 44 shows an end view of MEMS probe tip structures with inverted umbrella shaped probe tips

Alternatively, the tip can be fabricated in the shape of an arrow (a mushroom or an umbrella) so as to have a sharp apex and a rim edge that extends radially beyond the stem of the tip, as illustrated in FIG. 44. This design is different than the "boot-shaped" or "flared" tip of a previous art design because the disclosed design includes a sharp conical apex. With this design, the two tips will touch each other with their rim edges. This design is specially suited for imaging of deep vias and holes and other radially symmetrical features. A previous art "boot-shaped" or "flared" tip would also work with the disclosed MEMS caliper AFM. The extreme lateral points of the tips can easily be detected by first bringing them in lateral proximity and then scanning up and down until the maximum tip distance is detected. The maximum tip distance indicates that the extreme lateral points of the tips are against each other.

Figure 45:
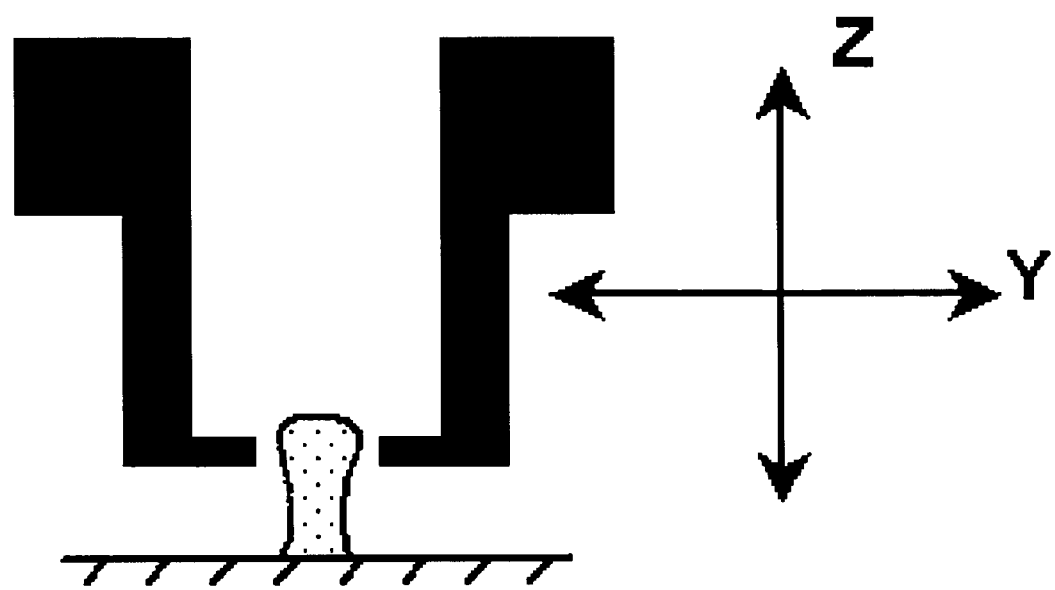
FIG. 45 shows an end view of MEMS probe tip structures with pointed shapes pointing inward toward the feature
Figure 46:
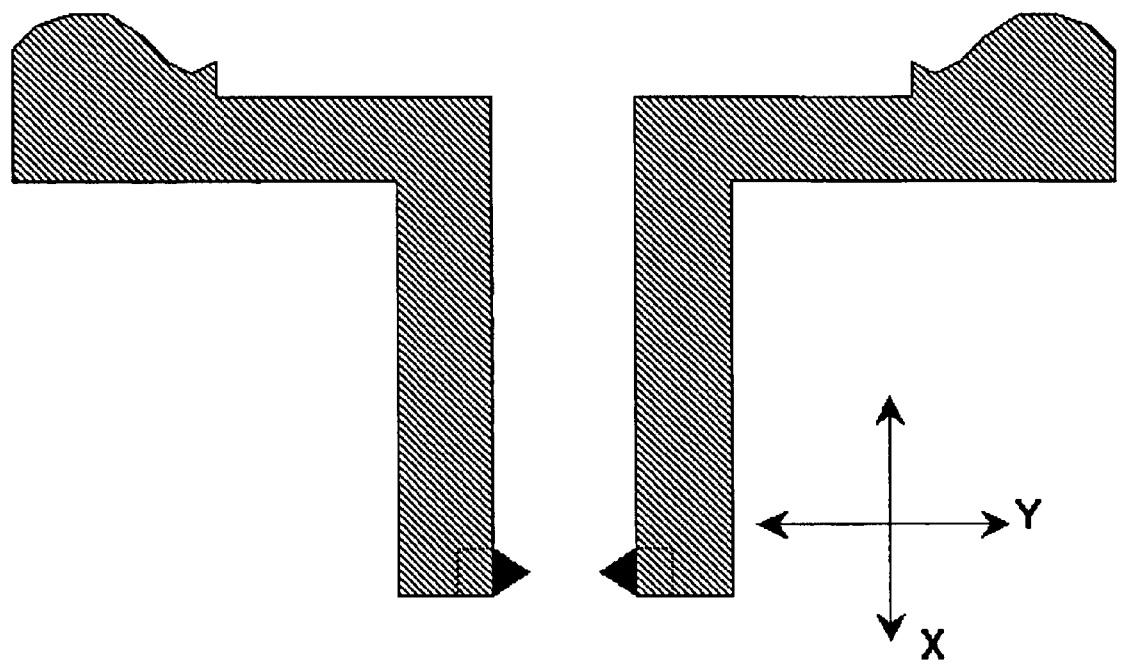
FIG. 46 shows an top view of MEMS probe tip structures with pointed shapes pointing inward toward the feature

Alternatively, the horizontal tip can be a silicon tip fabricated at the end of a vertical tip, as illustrated in FIGS. 45 and 46. Due to the 2-D nature of the MEMS processing the horizontal tip is preferably flat (in the same plane as the oscillator) and with a sharp apex. The advantage of this design is that the sharp apex can be fabricated by masking and patterning. In the prior art the sharpness of the vertical tips is achieved with the help of etching a vertical structure to a sharp point.

This horizontal tip design removes the need for the oscillators to be tilted with respect to each other in three axes in order the touch each other's extreme lateral points. The required clearances between the oscillators can be integrated into the fabrication process. Since there is no need for tilting mechanisms, the entire MEMS caliper AFM design is free of macro or micro mechanical stages, making it less complex and more reliable.

One disadvantage of the existing AFM probes is that the tips are located right under the micron-sized oscillator and there is no way of observing their navigation and sample imaging from a top-down vision system. The design of the caliper AFM has horizontally protruding tips that allow them to be suitable for inserting a vision apparatus that will help with the viewing of the sample under test and for navigation of the tips with respect to the sample. Suitable vision systems are optical systems and scanning electron microscopes. The integrated sensing system allows a high numerical aperture lens to be positioned right above the tips. The integrated sensing system also allows an electronic lens with mm-sized clearance above the sample to be utilized.

Any standard MEMS fabrication process is suitable for fabrication of the sensor/actuator system, the oscillators, and the tips. Some processes can also be done with the help of ion milling. The shape and the layout of the sensor and actuator comb structures and the oscillators can be done with the help of selective patterning and etching of silicon. The arm structures need to be etched underneath to allow them to move freely in space. Effectively, the arm structures are cantilevered structures. The flexible links described above will keep the arm attached to the substrate.

Actuation and sensing in the X direction can be achieved, for example, with electrostatic plates that are parallel in the Y direction. Actuation and sensing in the Y direction are achieved, for example, with electrostatic plates that are parallel in the X direction. Out-of-plane actuation and sensing is can be achieved, for example, with electrostatic plates that are parallel in the Z direction. The sensor and actuator structures need to be made of conductive material and need to be connected to electrodes to function as an electrostatic device. At least, the electrodes for the electrostatic sensor and actuator need to be deposited on each arm and on each side of the fixed structure, doubled for each direction of freedom, in-plane and out-of-plane. The six sets of electrodes need to be electrically insulated from each other so that a particular powering of an electrode set may produce the desired displacement or sensing. A combination of doped conductive silicon and deposited metal can be used to construct the electrical layout of the actuator and the sensor. Standard metal deposition processes used commonly in MEMS processing are applicable for accomplishing these tasks.

The fabrication process needs to take into account that the oscillators are thin structures compared to the actuator and sensing structures. Therefore additional patterning, doping, and etching may be required to produce two silicon structures with much different thickness. As an illustration, the thickness (the height) of the comb structures is 20 microns and the thickness of the oscillator is 2 microns. On the other hand, the width of both the comb structure and the oscillator are in the same range, about 20 microns. The silicon substrate under the oscillator and the tip has to be completely removed so as to enable access of the tips to a test structure underneath.

Fabrication of the tips adds additional process steps. The vertical silicon tips have comparable height with the vertical comb structures, lay in the same plane and may be processed together. The horizontal silicon tips, the horizontal comb structures, and the oscillator lay in the same plane and may be processed together. Fabrication of the carbon nanotube tips requires yet another process that includes at least the steps of, preparation of the substrate and growth of the carbon nanotube tips. In one fabrication method the two oscillators and the two tips may be fabricated as separate units. In another fabrication method the oscillators and the tips may be fabricated together as one unit and than separated into two branches (effectively cutting the oscillator and the tip in two) by subsequent etching or ion milling. The fabrication of the tilted tips may be done by over-etching the vertical tips or by ion milling them. The fabrication of the arrow tips may be accomplished by etching the vertical tips in two etch steps where one produces the vertical tips and the other produces the stem. The stem and the arrow may also be fabricated by etching the vertical tip with two different etching rates, where while the stem is etched away, the arrow is protected from etching and vice versa. Clearly, MEMS embodiments include a very great variety of features.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provision of 35 U.S.C. § 112, ¶ 6.

It should be apparent from the foregoing that an invention having significant advantages has been provided. While the invention is shown in only a few of its forms, it is not just limited to those forms but is susceptible to various changes and modifications without departing from the spirit thereof.

What is claimed is:

1. A caliper AFM comprising:
   a first atomic force microscope (AFM) probe having a first tip;
   a second AFM probe having a second tip;
   wherein the caliper AFM is configured such that the first tip and the second tip are moved in a coordinated way with respect to each other in more than one direction; and
   wherein the first tip and the second tip can measure a test sample.

2. The caliper AFM of claim 1, wherein at least one of the tips is moved in a coordinated way relative to the test sample.

3. The caliper AFM of claim 1, wherein the first tip moves, the second tip moves, and the test sample is stationary.

4. The caliper AFM of claim 1, wherein the first tip moves, the second tip moves, and the test sample moves.

5. The caliper AFM of claim 1, wherein the first tip moves in at least one direction.

6. The caliper AFM of claim 1, wherein the shape of the first tip is boot, cylindrical, carbon nanotube, or spherical, and wherein the shape of the second tip is boot, cylindrical, carbon nanotube, or spherical.

7. The caliper AFM of claim 1,
   wherein the first AFM probe includes a first multiresonant oscillator on which the first tip is mounted; and
   wherein the second AFM probe includes a second multiresonant oscillator on which the second tip is mounted.

8. A caliper AFM system, comprising a plurality of caliper AFMs of claim 1.

9. The caliper AFM system of claim 8, wherein the plurality of caliper AFMs are configured to measure the test sample in a coordinated manner.

10. The caliper AFM of claim 1, wherein the directions are orthogonal to each other.

11. The caliper AFM of claim 1, wherein the first tip moves in first direction, and the second tip moves in second direction.

12. The caliper AFM of claim 1, wherein at least one of the tips extends from its AFM probe at a non-orthogonal angle.

13. A caliper AFM comprising:
    a first atomic force microscope (AFM) probe having a first tip;
    a second AFM probe having a second tip;
    wherein the caliper AFM is configured such that the first tip and the second tip can be coordinated with respect to each other in more than one direction; and
    wherein one of the tips is stationary.

14. A caliper AFM comprising:
    a first atomic force microscope (AFM) probe having a first tip;
    a second AFM probe having a second tip;
    wherein the caliper AFM is configured such that the first tip and the second tip can measure a test sample in a coordinated manner; and wherein the first AFM probe is configured to tilt on a first axis to enable the first tip to move close to the second tip.

15. A caliper AFM comprising:
a first atomic force microscope (AFM) probe having a first tip;
a second AFM probe having a second tip;
wherein the caliper AFM is configured such that the first tip and the second tip can measure a test sample in a coordinated manner; and
wherein the first AFM probe is not configured to tilt, and the first tip is tilted to enable the first tip to move close to the second tip.

16. A caliper AFM comprising:
a first atomic force microscope (AFM) probe having a first tip;
a second AFM probe having a second tip;
wherein the caliper AFM is configured such that the first tip and the second tip can measure a test sample in a coordinated manner;
wherein the first AFM probe includes a first oscillator on which the first tip is mounted; and
wherein the first oscillator is beveled to allow the first tip to move close to the second tip without contacting the second AFM probe.

17. A caliper AFM comprising:
a first atomic force microscope (AFM) probe having a first tip;
a second AFM probe having a second tip;
wherein the caliper AFM is configured such that the first tip and the second tip are moved in a coordinated way with respect to each other in at least one direction;
wherein said one direction lies in a plane parallel to the sample plane; and
wherein the first tip and the second tip can measure a test sample.

18. The caliper AFM of claim 17, wherein the first tip is stationary.

19. The caliper AFM of claim 17, wherein the shape of the first tip is conical, pyramidal, boot, cylindrical, carbon nanotube, or spherical, and wherein the shape of the second tip is conical, pyramidal, boot, cylindrical, carbon nanotube, or spherical.

20. A caliper AFM comprising:
a first atomic force microscope (AFM) probe having a first tip;
a second AFM probe having a second tip;
wherein the caliper AFM is configured such that the first tip and the second tip are independently moved in a coordinated way with respect to a test sample in more than one direction; and
wherein the first tip and the second tip can measure the test sample.

21. A caliper AFM comprising:
a first atomic force microscope (AFM) probe having a first tip;
a second AFM probe having a second tip;
wherein the caliper AFM is configured such that the first tip and the second tip are moved in a coordinated way with respect to each other in more than one direction;
wherein the caliper AFM is configured such that the first tip and the second tip are independently moved in a coordinated way with respect to a test sample in more than one direction; and
wherein the first tip and the second tip can measure the test sample.

22. A caliper AFM comprising:
a first atomic force microscope (AFM) probe having a first tip;
a second AFM probe having a second tip;
wherein the caliper AFM is configured such that the first tip and the second tip are moved in a coordinated way with respect to each other in a first direction;
wherein the caliper AFM is configured such that the first tip and the second tip are independently moved in coordinated way with respect to a test sample in a second direction; and
wherein the first tip and the second tip can measure the test sample.

23. The caliper AFM of claim 22, wherein at least one of the tips is stationary, and the test sample can move.

24. A caliper AFM comprising:
a first atomic force microscope (AFM) probe having a first tip;
a second AFM probe having a second tip;
wherein the caliper AFM is configured such that the first tip is moved in a coordinated way with respect to a test sample in more than one direction;
wherein the caliper AFM is configured such that the second tip is moved in a coordinated way with respect the first tip in more than one direction; and
wherein the first tip and the second tip can measure the test sample.

25. A caliper AFM comprising:
a first atomic force microscope (AFM) probe having a first tip;
a second AFM probe having a second tip;
wherein the caliper AFM is configured such that the first tip and the second tip are moved in a coordinated way with respect to each other in at least one direction; and
wherein the shape of the first tip is carbon nanotube or spherical, and wherein the shape of the second tip is carbon nanotube or spherical.

26. A caliper AFM comprising:
a first atomic force microscope (AFM) probe having a first tip;
a second AFM probe having a second tip;
wherein the caliper AFM is configured such that the first tip and the second tip are moved in a coordinated way with respect to each other in at least one direction;
wherein the shape of the first tip is conical, pyramidal, boot, cylindrical, carbon nanotube, or spherical, and wherein the shape of the second tip is conical, pyramidal, boot, cylindrical, carbon nanotube, or spherical; and
wherein the shape of the first tip is same as the shape the second tip.

27. A caliper AFM comprising:
a first atomic force microscope (AFM) probe having a first tip;
a second AFM probe having a second tip;
wherein the apexes of the tips are the closest points between the fist and the second probe; and
wherein the caliper AFM is configured such that the first tip and the second tip are moved in a coordinated way with respect to each other in at least one direction.

* * * * *